US012447195B2

(12) United States Patent
Wang et al.

(10) Patent No.: US 12,447,195 B2
(45) Date of Patent: *Oct. 21, 2025

(54) ENGINEERED SIRPα VARIANTS AND METHODS OF USE THEREOF

(71) Applicant: FBD Biologics Limited, Hong Kong (CN)

(72) Inventors: Jiin-Tarng Wang, Taichung (TW); Han-Fang Teng, New Taipei (TW); Pan-Hsien Kuo, Taoyuan (TW); Chi-Ling Tseng, Taipei (TW); Zong Sean Juo, New Taipei (TW)

(73) Assignee: FBD Biologics Limited, Kowloon (HK)

(*) Notice: Subject to any disclaimer, the term of this patent is extended or adjusted under 35 U.S.C. 154(b) by 0 days.

This patent is subject to a terminal disclaimer.

(21) Appl. No.: 18/498,843

(22) Filed: Oct. 31, 2023

(65) Prior Publication Data

US 2024/0083960 A1 Mar. 14, 2024

Related U.S. Application Data

(63) Continuation of application No. PCT/US2022/052373, filed on Dec. 9, 2022.

(60) Provisional application No. 63/292,267, filed on Dec. 21, 2021.

(51) Int. Cl.
| | |
|---|---|
| *A61K 38/17* | (2006.01) |
| *A61P 35/00* | (2006.01) |
| *C07K 14/435* | (2006.01) |
| *C07K 14/47* | (2006.01) |
| *A61K 38/00* | (2006.01) |

(52) U.S. Cl.
CPC .......... *A61K 38/1709* (2013.01); *A61P 35/00* (2018.01); *C07K 14/473* (2013.01); *A61K 38/00* (2013.01); *C07K 2319/30* (2013.01)

(58) Field of Classification Search
None
See application file for complete search history.

(56) References Cited

U.S. PATENT DOCUMENTS

| | | | |
|---|---|---|---|
| 9,944,911 B2 | 4/2018 | Ring et al. | |
| 9,969,789 B2 | 5/2018 | Uger et al. | |
| 10,259,859 B2 | 4/2019 | Pons et al. | |
| 10,696,730 B2 | 6/2020 | Pons et al. | |
| 10,800,821 B2 | 10/2020 | Tian et al. | |
| 10,906,954 B2 | 2/2021 | Uger et al. | |
| 11,208,459 B2 | 12/2021 | Pons et al. | |
| 11,208,481 B2 | 12/2021 | Ring et al. | |
| 2006/0115832 A1* | 6/2006 | Hoon | C12Q 1/6886 435/6.16 |
| 2006/0275844 A1* | 12/2006 | Linke | G16H 70/60 702/19 |
| 2008/0280297 A1* | 11/2008 | Dalla-Favera | G01N 33/57426 435/6.16 |
| 2011/0190157 A1* | 8/2011 | Kipps | C12Q 1/6809 506/17 |
| 2012/0178111 A1* | 7/2012 | Diamandis | G01N 33/57423 435/7.1 |

FOREIGN PATENT DOCUMENTS

| | | |
|---|---|---|
| AU | 2013362789 B2 | 3/2018 |
| AU | 2016210755 B2 | 5/2021 |
| CN | 104136037 B | 2/2018 |
| CN | 108350048 A | 7/2018 |
| CN | 106146670 B | 1/2019 |
| CN | 105073780 B | 4/2019 |
| EP | 3287470 A1 | 2/2018 |
| EP | 3331902 | 6/2018 |
| EP | 2931752 B1 | 8/2019 |
| EP | 2804617 B1 | 6/2020 |
| EP | 3128005 B1 | 4/2021 |
| EP | 3575326 B1 | 4/2022 |
| WO | WO 2008/077546 | 7/2008 |
| WO | WO 2013/109752 | 7/2013 |
| WO | WO 2014/094122 | 6/2014 |
| WO | WO 2016/023040 | 2/2016 |
| WO | WO 2016/169261 A1 | 10/2016 |
| WO | WO 2017/027422 | 2/2017 |
| WO | WO 2019/084692 A1 | 5/2019 |
| WO | WO 2022/063316 | 3/2022 |

OTHER PUBLICATIONS

Baxevanis (Expert Opinion: Drug Discovery, vol. 3, No. 4, p. 441-452, 2008) (Year: 2008).*
Huang (Computation and Structural Biotechnology Journal, vol. 19, p. 5494-5503, 2021) (Year: 2021).*
Dhanda et al., "Development of a strategy and computational application to select candidate protein analogues with reduced HLA binding and immunogenicity," Immunology, Jan. 2018, 153(1):118-32.
GenBank Acession No. NP_542970.1, "tyrosine-protein phosphatase non-receptor type substrate 1 isoform 1 precursor [*Homo sapiens*]," dated Dec. 13, 2020, 6 pages.
Jiang et al., "Targeting CD47 for cancer immunotherapy," Journal of Hematology & Oncology, Dec. 2021, 14(1), 18 pages.
PCT International Search Report and Written Opinion in International Appln. No. PCT/US2022/052373, mailed on Jun. 15, 2023, 15 pages.
Seiffert et al., "Signal-regulatory protein α (SIRPα) but not SIRPβ is involved in T-cell activation, binds to CD47 with high affinity, and is expressed on immature CD34+ CD38-hematopoietic cells," Blood, The Journal of the American Society of Hematology, May 2001, 97(9):2741-9.
Sikic et al., "First-in-human, first-in-class phase I trial of the anti-CD47 antibody Hu5F9-G4 in patients with advanced cancers," Journal of Clinical Oncology, Apr. 2019, 37(12):946, 11 pages.
UniProt ID No. P78324, "Tyrosine-protein phosphatase non-receptor type substrate 1," Mar. 28, 2003, 13 pages.

(Continued)

*Primary Examiner* — Michael Allen
(74) *Attorney, Agent, or Firm* — Fish & Richardson P.C.

(57) ABSTRACT

This disclosure relates to engineered SIRPα variants, and methods of use thereof.

4 Claims, 61 Drawing Sheets

Specification includes a Sequence Listing.

(56) References Cited

OTHER PUBLICATIONS

Wang et al., "HCB101: A safe and effective ligand trap therapeutic targeting the CD47-SIRPa signaling pathway for cancer treatment," Abstract, Journal of Immunotherapy, Nov. 2022, 10(2):A1-595, 1 page.
Weiskopf et al., "Engineered SIRPα variants as immunotherapeutic adjuvants to anticancer antibodies," Science. Jul. 2013, 341(6141):88, 13 pages.
Yanagita et al. "Anti-SIRPα antibodies as a potential new tool for cancer immunotherapy," JCI Insight, Jan. 2017, 2(1), 16 pages.
EP Partial Supplementary European Search Report in European Appln. No. 22912284.1, mailed on Mar. 31, 2025, 21 pages.

* cited by examiner

```
                                          BC loop
                                            31
EEELQIIQPDKSVSVAAGESAILHCTVTSLIPVGPIQWFRGAGPARELIYNQKEGHFPRV
 DE loop                                              C'D loop
                                                       54 56
TTVSESTKRENMDFSISISNITPADAGTYYCVKFRKGSPDTEEFKSGAGTELSVRAKPS
 66 67
```

FIG. 2

| | Sequencing name | | Expression (OD) | Blocking (OD) | Blocking ability (%) | hCD47 binding (OD) | hCD47 binding (B/E) | mCD47 binding (OD) |
|---|---|---|---|---|---|---|---|---|
| 1 | S-1 | 4RP13-3-5D | 0.993 | 0.215 | 100.79 | 1.791 | 1.8 | 0.249 |
| 2 | S-2 | 4RP13-3-11A | 1.092 | 0.319 | 93.3 | 1.668 | 1.53 | 0.348 |
| 3 | S-3 | 4RP13-1-3D | 0.885 | 0.174 | 97.88 | 1.927 | 2.18 | 0.329 |
| 4 | S-4 | 4RP13-4-2D | 1.396 | 0.215 | 96 | 1.875 | 1.34 | 0.458 |
| 5 | S-5 | 4RP13-1-2G | 0.851 | 0.194 | 96.87 | 1.935 | 2.27 | 0.412 |
| 6 | S-6 | 4RP13-1-6C | 0.955 | 0.214 | 95.98 | 1.75 | 1.83 | 0.344 |
| 7 | S-7 | 2RP-1-3E | 1.07 | 0.131 | 99.94 | 1.719 | 1.61 | 0.113 |
| 8 | S-8 | 4RP13-1-2A | 0.662 | 0.828 | 64.87 | 1.87 | 2.82 | 0.42 |
| 9 | S-9 | 4RP13-1-7E | 0.977 | 0.198 | 96.97 | 2.014 | 2.06 | 0.312 |
| 10 | S-10 | 4RP13-1-3F | 0.901 | 0.192 | 99.78 | 1.899 | 2.11 | 0.396 |
| 11 | S-11 | 4RP13-3-4D | 1.056 | 0.229 | 93.03 | 1.79 | 1.7 | 0.173 |
| 12 | S-12 | 4RP6-1-10C | 1.189 | 0.27 | 95.61 | 1.89 | 1.59 | 0.325 |
| 13 | S-13 | 4RP13-1-4G | 0.901 | 0.219 | 97.68 | 1.846 | 2.05 | 0.307 |
| 14 | S-14 | 4RP13-1-2D | 0.777 | 0.178 | 96.01 | 1.939 | 2.5 | 0.396 |
| 15 | S-15 | 4RP13-1-4E | 1.077 | 0.211 | 80.13 | 1.998 | 1.86 | 0.461 |
| 16 | S-16 | 4RP13-1-10A | 0.648 | 0.45 | 95.91 | 1.872 | 2.89 | 0.41 |
| 17 | S-17 | 4RP13-1-1C | 0.87 | 0.213 | 94.65 | 1.778 | 2.04 | 0.364 |
| 18 | S-18 | 4RP13-1-8F | 0.996 | 0.238 | 95.81 | 2.131 | 2.14 | 0.317 |
| 19 | S-19 | 4RP13-1-7A | 0.777 | 0.215 | 96.26 | 1.896 | 2.44 | 0.293 |
| 20 | S-20 | 4RP13-1-7H | 0.776 | 0.215 | 96.33 | 1.91 | 2.46 | 0.315 |
| 21 | S-21 | 4RP13-4-5C | 1.128 | 0.215 | 92.78 | 1.865 | 1.65 | 0.116 |
| 22 | S-22 | 4RP13-5-4D | 1.115 | 0.215 | 48.48 | 1.637 | 1.47 | 0.414 |
| 23 | S-23 | 4RP13-5-9G | 1.347 | 0.215 | 84.1 | 1.603 | 1.19 | 0.457 |
| 24 | S-24 | 4RP6-1-1B | 0.8 | 0.215 | 84.22 | 1.766 | 2.21 | 0.482 |
| 25 | S-25 | 4RP6-1-1F | 0.894 | 0.215 | 94.74 | 1.952 | 2.18 | 0.404 |
| 26 | S-26 | 4RP13-3-10B | 1.244 | 0.215 | 83.46 | 1.652 | 1.33 | 0.17 |
| 27 | S-27 | 4RP6-1-2E | 0.813 | 0.215 | 92.37 | 1.91 | 2.35 | 0.455 |
| 28 | S-28 | 4RP13-3-7B | 1.195 | | | 1.494 | 1.25 | 0.152 |
| | | 41BBL | | | | | | |
| | | wt | 1.178 | 1.6 | 18.11 | 1.214 | 1.03 | 0.097 |

FIG. 4A

| | | | SIRPA screening | | | | |
|---|---|---|---|---|---|---|---|
| ranking | clone | expression (OD) | Blocking (OD) | Blocking ability (%) | hCD47 binding (OD) | hCD47 binding (B/E) | mCD47 binding (OD) |
| 29 | 4RP13-3-7B | 1.195 | 0.332 | 92.37 | 1.494 | 1.25 | 0.152 |
| 30 | 4RP13-4-5G | 1.422 | 0.3 | 90.33 | 1.854 | 1.30 | 0.207 |
| 31 | 4RP13-1-9C | 1.146 | 0.336 | 89.70 | 2.028 | 1.77 | 0.414 |
| 32 | 4RP13-4-2A | 1.309 | 0.305 | 89.99 | 1.701 | 1.30 | 0.438 |
| 33 | 4RP13-4-3B | 1.193 | 0.334 | 88.06 | 1.821 | 1.53 | 0.448 |
| 34 | 4RP13-4-11B | 1.257 | 0.339 | 87.73 | 1.737 | 1.38 | 0.457 |
| 35 | 4RP13-4-12C | 1.357 | 0.342 | 87.53 | 1.731 | 1.28 | 0.456 |
| 36 | 4RP13-5-1G | 1.308 | 0.85 | 61.09 | 1.599 | 1.22 | 0.591 |
| 37 | 4RP13-5-3G | 1.3 | 0.367 | 88.77 | 1.603 | 1.23 | 0.566 |
| 38 | 4RP13-5-3H | 1.167 | 0.364 | 88.94 | 1.675 | 1.44 | 0.403 |
| 39 | 4RP13-5-9G | 1.347 | 1.07 | 48.48 | 1.603 | 1.19 | 0.457 |
| 40 | 4RP13-1-1B | 0.838 | 0.294 | 91.82 | 1.758 | 2.10 | 0.475 |
| 41 | 4RP13-1-1H | 0.729 | 0.332 | 89.90 | 1.73 | 2.37 | 0.456 |
| 42 | 4RP13-1-2A | 0.662 | 0.828 | 64.87 | 1.87 | 2.82 | 0.42 |
| 43 | 4RP13-1-12B | 0.745 | 0.347 | 89.15 | 1.743 | 2.34 | 0.381 |
| 44 | 4RP13-1-11H | 0.756 | nd | nd | 1.88 | 2.49 | 0.424 |
| 45 | 4RP6-1-1B | 0.8 | 0.382 | 84.10 | 1.766 | 2.21 | 0.482 |
| 46 | 4RP6-1-1C | 0.851 | 0.294 | 89.25 | 1.801 | 2.12 | 0.481 |
| 47 | 4RP6-1-1F | 0.894 | 0.38 | 84.22 | 1.952 | 2.18 | 0.404 |
| 48 | 4RP6-1-2E | 0.813 | 0.393 | 83.46 | 1.91 | 2.35 | 0.455 |
| 49 | 4RP6-1-10A | 0.648 | 0.45 | 80.13 | 1.872 | 2.89 | 0.41 |
| 50 | 4RP13-4-9F | 1.453 | 0.315 | 89.33 | 1.702 | 1.17 | 0.095 |
| 51 | 4RP13-5-6G | 1.628 | 1.108 | 46.30 | 1.647 | 1.01 | 0.149 |
| 52 | 2R-1-12G | 1.262 | 1.349 | 28.44 | 0.819 | 0.65 | 0.089 |
| 53 | 2R-1-4B | 1.236 | 1.357 | 27.95 | 0.946 | 0.77 | 0.082 |
| 54 | 2R-1-10B | 1.103 | 1.369 | 27.21 | 0.51 | 0.46 | 0.086 |
| 55 | 2R-1-7B | 0.883 | 1.433 | 23.26 | 0.687 | 0.78 | 0.087 |
| 56 | 2R-1-6A | 1.206 | 1.459 | 21.65 | 0.937 | 0.78 | 0.088 |
| | SIRPA wt | 1.178 | 1.6 | 18.11 | 1.214 | 1.03 | 0.097 |
| | biotin-SIRPA His | | 1.935 | | | | |

FIG. 4B

| Residue number in SIRPα | | 24 | 25 | 26 | 27 | 28 | 29 | 30 | 31 | 32 | 33 | 54 | 55 | 56 | 66 | 67 | 68 | 69 | 70 | 71 | 72 | 73 |
|---|---|---|---|---|---|---|---|---|---|---|---|---|---|---|---|---|---|---|---|---|---|---|
| | | BC loop (10 a.a.) | | | | | | | | | | C'D loop (3 a.a.) | | | DE loop (8 a.a.) | | | | | | | |
| | | H | C | T | V | T | S | L | I | P | V | E | G | H | S | T | K | R | E | N | M | D |
| Final clone name | Phage clone name | CAC | TGC | ACT | GTG | ACC | TCC | CTG | ATC | CCT | GTG | GAA | GGC | CAC | TCC | ACA | AAG | AGA | GAA | AAC | ATG | GAC |
| hSIRPα-mt3 | 4RP13-3-11A | | | | | | | | W | | | A | W | P | | | | | | | | |
| hSIRPα-mt4 | 4RP13-1-2G | R | | | | | | | W | | | A | F | I | | | | | G | | | |
| hSIRPα-mt5 | 4RP13-4-5C | N | | | | | | | | | | H | Q | T | Q | | | | | | R | |
| hSIRPα-mt6 | 2R-1-10B | | | | | | | | | | | N | L | I | G | | | | | | | |
| hSIRPα-mt7 | 2R-1-7B | | | | I | | | | | | | I | L | T | | | | | | | Y | |
| hSIRPα-mt8 | 4RP13-1-7A | | | | | | | | K | | | R | D | T | | | | | | | R | |
| hSIRPα-mt9 | 2RP-1-3E | T | | | | | | | W | | | G | Q | N | | | | | F | | | |
| hSIRPα-mt10 | 4RP13-3-7B | T | | | | | | | Y | | | R | Q | T | | | | | F | | | |
| hSIRPα-mt11 | 4RP13-3-4D | | | | | | | | L | | | S | K | V | | | | | R | | | |
| hSIRPα-mt12 | 4RP13-3-10B | | | | | | | | Y | | | G | R | R | | | | | A | | | |
| hSIRPα-mt13 | 4RP6-1-10A | | | | | | | | L | | | D | F | L | | | | | | | R | |
| hSIRPα-mt14 | 2R-1-4B | | | | | | | | A | | | L | D | S | | | | | | S | | |
| hSIRPα-mt15 | 4RP13-5-6G | R | | | | | | | T | | | A | K | Q | | | | | | | | I |
| hSIRPα-mt16 | 2RP1-2C | T | | | | | | | | | | R | A | P | | | | | | | | |
| hSIRPα-mt17 | 1RP-1-7H | | | | | | | | | | | S | P | P | | | | | L | | | |
| hSIRPα-mt18 | 4RP-4-5H | T | | | | | | | W | | | S | | P | | | | | R | | | |
| hSIRPα-mt19 | 4RP-4-8H | | | | | | | | W | | | R | A | G | | | | | T | | | |
| hSIRPα-mt20 | 1RP-1-1A | | | | | Q | | | | | | H | R | T | N | | | | | | | |
| hSIRPα-mt21 | 4RP-1-1D | | | | | | | | | | | S | P | R | | | | | L | | | |
| hSIRPα-mt22 | 4RP-1-3G | | | | L | | | | | | | | D | R | | | | | | | R | |
| hSIRPα-mt23 | 4RP-1-1H | | | | L | | | | T | | | | | P | | | | | G | | | |
| hSIRPα-mt31 | | T | | | | | | | Y | | | R | Q | T | | | | | | | | |
| hSIRPα-mt32 | | T | | | | | | | N | | | R | Q | T | | | | | | | | |
| hSIRPα-mt33 | | R | | | | | | | Y | | | A | K | Q | | | | | | | | |
| hSIRPα-mt34 | | R | | | | | | | N | | | A | K | Q | | | | | | | | |
| hSIRPα-mt35 | | R | | | | | | | | | | A | K | Q | | | | | | | | |

FIG. 6

| Samples | Molecular weight (KDa) | Factor | pI | HPLC-SEC | | |
|---|---|---|---|---|---|---|
| | | | | HMW% | Main% | LMW% |
| hSIRPaG4_mt3 | 77.332 | 0.69 | 6.15 | 0.81 | 99.19 | 0 |
| hSIRPaG4_mt4 | 77.179 | 0.76 | 6.63 | 0 | 100 | 0 |
| hSIRPaG4_mt6 | 77.069 | 0.86 | 6.15 | 0.39 | 99.61 | 0 |
| hSIRPaG4_mt8 | 77.301 | 0.86 | 6.71 | - | - | - |
| hSIRPaG4_mt9 | 77.185 | 0.76 | 6.30 | 0.58 | 99.42 | 0 |
| hSIRPaG4_mt10 | 77.311 | 0.84 | 6.63 | 0 | 100 | 0 |
| hSIRPaG4_mt11 | 77.159 | 0.86 | 7.23 | - | - | - |
| hSIRPaG4_mt12 | 77.199 | 0.84 | 7.23 | 0 | 100 | 0 |
| hSIRPaG4_mt13 | 77.277 | 0.86 | 6.15 | 0.50 | 99.50 | 0 |
| hSIRPaG4_mt14 | 76.969 | 0.86 | 5.96 | 0.76 | 99.24 | 0 |
| hSIRPaG4_mt15 | 77.141 | 0.86 | 7.19 | 0 | 100 | 0 |

FIG. 7

| Loading items | SET1 | | | | Compared to SiRPa wt in IgG4 |
|---|---|---|---|---|---|
| | Sample | KD (M) | kon(1/Ms) | kdis(1/s) | Fold |
| CD47-ECD-His | hSIRPa-Fc | 4.0E-09 | 1.06E+06 | 4.26E-03 | 1.00 |
| | hSIRPa_mt4 | 8.36E-11 | 1.19E+06 | 9.95E-05 | 48.21 |
| | hSIRPa_mt6 | 5.1E-09 | 1.66E+06 | 8.40E-03 | 0.79 |
| | hSIRPa_mt8 | 2.01E-10 | 1.11E+06 | 2.22E-04 | 20.05 |
| | hSIRPa_mt9 | 1.65E-10 | 1.04E+06 | 1.44E-04 | 23.93 |
| | hSIRPa_mt10 | 3.25E-10 | 1.05E+06 | 3.40E-04 | 12.40 |
| | Hu5F9-G4 | 1.00E-10 | 1.45E+06 | 1.57E-04 | 35.02 |

| Loading items | SET2 | | | | Compared to SiRPa wt in IgG4 |
|---|---|---|---|---|---|
| | Sample | KD (M) | kon(1/Ms) | kdis(1/s) | Fold |
| CD47-ECD-His | hSIRPa-Fc | 5.15E-09 | 9.00E+05 | 4.64E-03 | 1.00 |
| | hSIRPa_mt11 | 1.35E-09 | 4.63E+05 | 6.24E-04 | 3.81 |
| | hSIRPa_mt12 | 6.65E-10 | 9.32E+05 | 6.20E-04 | 7.74 |
| | hSIRPa_mt13 | 3.87E-10 | 9.42E+05 | 3.65E-04 | 13.31 |
| | hSIRPa_mt14 | 4.37E-09 | 1.01E+06 | 3.65E-03 | 1.18 |
| | hSIRPa_mt15 | 5.01E-10 | 1.15E+06 | 5.74E-04 | 10.28 |
| | Hu5F9-G4 | 1.51E-10 | 1.22E+06 | 1.84E-04 | 34.01 |

FIG. 8 mt4 > Hu5F9-G4 > mt8,mt9 > mt10,mt13,mt15 > mt12 > mt11 > hSIRPa-Fc,mt14 > mt6

CD47 tf CHO-S cell binding ability:
mt4 = mt8 = mt10 = mt11 = mt12 = mt13 = mt15 = Hu5F9-G4 > WT = mt14 > mt6

RBC Binding ability:
Hu5F9-G4> mt10 > mt15 = mt16 = mt21 > mt23 > WT

Platelet binding ability:
Mt4 = Mt10 = Mt8 = Mt11 = Mt12 > Mt13 > Mt15 = Hu5F9 >> Mt14 > WT = Mt6

FIG. 22

| SIRPα IgV domain | Amino acid sequence |
|---|---|
| Wild-type (WT) (SEQ ID NO: 1) | EEELQVIQPD KSVSVAAGES AILHCTVTSL IPVGPIQWFR GAGPARELIY NQKEGHFPRVTTVSESTKRE NMDFSISISN ITPADAGTYY CVKFRKGSPD TEFKSGAGTE LSVRAKPS |
| Mutant 3 (mt3) (SEQ ID NO: 2) | EEELQVIQPD KSVSVAAGES AILHCTVTSL WPVGPIQWFR GAGPARELIY NQKAWPFPRV TTVSESTKRE NMDFSISISN ITPADAGTYY CVKFRKGSPD TEFKSGAGTE LSVRAKPS |
| Mutant 4 (mt4) (SEQ ID NO: 3) | EEELQVIQPD KSVSVAAGES AILRCTVTSL WPVGPIQWFR GAGPARELIY NQKAFIFPRV TTVSESTKRG NMDFSISISN ITPADAGTYY CVKFRKGSPD TEFKSGAGTE LSVRAKPS |
| Mutant 5 (mt5) (SEQ ID NO: 4) | EEELQVIQPD KSVSVAAGES AILNCTVTSL IPVGPIQWFR GAGPARELIY NQKHQTFPRV TTVSEQTKRE NRDFSISISN ITPADAGTYY CVKFRKGSPD TEFKSGAGTE LSVRAKPS |
| Mutant 6 (mt6) (SEQ ID NO: 5) | EEELQVIQPD KSVSVAAGES AILHCTVTSL IPVGPIQWFR GAGPARELIY NQKNLIFPRV TTVSESGKRE NMDFSISISN ITPADAGTYY CVKFRKGSPD TEFKSGAGTE LSVRAKPS |
| Mutant 7 (mt7) (SEQ ID NO: 6) | EEELQVIQPD KSVSVAAGES AILHCIVTSL IPVGPIQWFR GAGPARELIY NQKILTFPRV TTVSESTKRE NYDFSISISN ITPADAGTYY CVKFRKGSPD TEFKSGAGTE LSVRAKPS |
| Mutant 8 (mt8) (SEQ ID NO: 7) | EEELQVIQPD KSVSVAAGES AILHCTVTSL KPVGPIQWFR GAGPARELIY NQKRDTFPRV TTVSESTKRE NRDFSISISN ITPADAGTYY CVKFRKGSPD TEFKSGAGTE LSVRAKPS |
| Mutant 9 (mt9) (SEQ ID NO: 8) | EEELQVIQPD KSVSVAAGES AILTCTVTSL WPVGPIQWFR GAGPARELIY NQKGQNFPRV TTVSESTKRF NMDFSISISN ITPADAGTYY CVKFRKGSPD TEFKSGAGTE LSVRAKPS |
| Mutant 10 (mt10) (SEQ ID NO: 9) | EEELQVIQPD KSVSVAAGES AILTCTVTSL YPVGPIQWFR GAGPARELIY NQKRQTFPRV TTVSESTKRF NMDFSISISN ITPADAGTYY CVKFRKGSPD TEFKSGAGTE LSVRAKPS |
| Mutant 11 (mt11) (SEQ ID NO: 10) | EEELQVIQPD KSVSVAAGES AILHCTVTSL LPVGPIQWFR GAGPARELIY NQKSKVFPRV TTVSESTKRR NMDFSISISN ITPADAGTYY CVKFRKGSPD TEFKSGAGTE LSVRAKPS |
| Mutant 12 (mt12) (SEQ ID NO: 11) | EEELQVIQPD KSVSVAAGES AILHCTVTSL YPVGPIQWFR GAGPARELIY NQKGRRFPRV TTVSESTKRA NMDFSISISN ITPADAGTYY CVKFRKGSPD TEFKSGAGTE LSVRAKPS |
| Mutant 13 (mt13) (SEQ ID NO: 12) | EEELQVIQPD KSVSVAAGES AILHCTVTSL LPVGPIQWFR GAGPARELIY NQKDFLFPRV TTVSESTKRE NRDFSISISN ITPADAGTYY CVKFRKGSPD TEFKSGAGTE LSVRAKPS |
| Mutant 14 (mt14) (SEQ ID NO: 13) | EEELQVIQPD KSVSVAAGES AILHCTVTSL APVGPIQWFR GAGPARELIY NQKLDSFPRV TTVSESTKRE SMDFSISISN ITPADAGTYY CVKFRKGSPD TEFKSGAGTE LSVRAKPS |
| Mutant 15 (mt15) (SEQ ID NO: 14) | EEELQVIQPD KSVSVAAGES AILRCTVTSL TPVGPIQWFR GAGPARELIY NQKAKQFPRV TTVSESTKRE NMIFSISISN ITPADAGTYY CVKFRKGSPD TEFKSGAGTE LSVRAKPS |

FIG. 22 (Continued)

| Mutant 16 (mt16) (SEQ ID NO: 33) | EEELQVIQPD KSVSVAAGES AILTCTVTSL IPVGPIQWFR GAGPARELIY NQKRAPFPRV TTVSESTKRE NMDFSISISN ITPADAGTYY CVKFRKGSPD TEFKSGAGTE LSVRAKPS |
|---|---|
| Mutant 17 (mt17) (SEQ ID NO: 34) | EEELQVIQPD KSVSVAAGES AILHCTVTSL IPVGPIQWFR GAGPARELIY NQKSPPFPRV TTVSESTKRL NMDFSISISN ITPADAGTYY CVKFRKGSPD TEFKSGAGTE LSVRAKPS |
| Mutant 18 (mt18) (SEQ ID NO: 35) | EEELQVIQPD KSVSVAAGES AILTCTVTSL WPVGPIQWFR GAGPARELIY NQKSGPFPRV TTVSESTKRR NMDFSISISN ITPADAGTYY CVKFRKGSPD TEFKSGAGTE LSVRAKPS |
| Mutant 19 (mt19) (SEQ ID NO: 36) | EEELQVIQPD KSVSVAAGES AILHCTVTSL WPVGPIQWFR GAGPARELIY NQKRAGFPRV TTVSESTKRT NMDFSISISN ITPADAGTYY CVKFRKGSPD TEFKSGAGTE LSVRAKPS |
| Mutant 20 (mt20) (SEQ ID NO: 37) | EEELQVIQPD KSVSVAAGES AILHCTVTQL IPVGPIQWFR GAGPARELIY NQKHRTFPRV TTVSENTKRE NMDFSISISN ITPADAGTYY CVKFRKGSPD TEFKSGAGTE LSVRAKPS |
| Mutant 21 (mt21) (SEQ ID NO: 38) | EEELQVIQPD KSVSVAAGES AILHCTVTSL IPVGPIQWFR GAGPARELIY NQKSPRFPRV TTVSESTKRL NMDFSISISN ITPADAGTYY CVKFRKGSPD TEFKSGAGTE LSVRAKPS |
| Mutant 22 (mt22) (SEQ ID NO: 39) | EEELQVIQPD KSVSVAAGES AILHCTLTSL IPVGPIQWFR GAGPARELIY NQKEDRFPRV TTVSESTKRE NRDFSISISN ITPADAGTYY CVKFRKGSPD TEFKSGAGTE LSVRAKPS |
| Mutant 23 (mt23) (SEQ ID NO: 40) | EEELQVIQPD KSVSVAAGES AILHCTLTSL TPVGPIQWFR GAGPARELIY NQKEGPFPRV TTVSESTKRG NMDFSISISN ITPADAGTYY CVKFRKGSPD TEFKSGAGTE LSVRAKPS |
| Mutant 31 (mt31) (SEQ ID NO: 41) | EEELQVIQPD KSVSVAAGES AILTCTVTSL YPVGPIQWFR GAGPARELIY NQKRQTFPRV TTVSESTKRE NMDFSISISN ITPADAGTYY CVKFRKGSPD TEFKSGAGTE LSVRAKPS |
| Mutant 32 (mt32) (SEQ ID NO: 42) | EEELQVIQPD KSVSVAAGES AILTCTVTSL NPVGPIQWFR GAGPARELIY NQKRQTFPRV TTVSESTKRE NMDFSISISN ITPADAGTYY CVKFRKGSPD TEFKSGAGTE LSVRAKPS |
| Mutant 33 (mt33) (SEQ ID NO: 43) | EEELQVIQPD KSVSVAAGES AILRCTVTSL YPVGPIQWFR GAGPARELIY NQKAKQFPRV TTVSESTKRE NMDFSISISN ITPADAGTYY CVKFRKGSPD TEFKSGAGTE LSVRAKPS |
| Mutant 34 (mt34) (SEQ ID NO: 44) | EEELQVIQPD KSVSVAAGES AILRCTVTSL NPVGPIQWFR GAGPARELIY NQKAKQFPRV TTVSESTKRE NMDFSISISN ITPADAGTYY CVKFRKGSPD TEFKSGAGTE LSVRAKPS |
| Mutant 35 (mt35) (SEQ ID NO: 45) | EEELQVIQPD KSVSVAAGES AILRCTVTSL IPVGPIQWFR GAGPARELIY NQKAKQFPRV TTVSESTKRE NMDFSISISN ITPADAGTYY CVKFRKGSPD TEFKSGAGTE LSVRAKPS |

FIG. 23

```
hSIRPα-Fc-wt amino acid sequence(SEQ ID NO: 15)
EEELQVIQPDKSVSVAAGESAILHCTVTSLIPVGPIQWFRGAGPARELIYNQKEGHFPRVTTVSESTKRE
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt3 amino acid sequence(SEQ ID NO: 16)
EEELQVIQPDKSVSVAAGESAILHCTVTSLWPVGPIQWFRGAGPARELIYNQKAWPFPRVTTVSESTKRE
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt4 amino acid sequence(SEQ ID NO: 17)
EEELQVIQPDKSVSVAAGESAILRCTVTSLWPVGPIQWFRGAGPARELIYNQKAFIFPRVTTVSESTKRG
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt5 amino acid sequence(SEQ ID NO: 18)
EEELQVIQPDKSVSVAAGESAILNCTVTSLIPVGPIQWFRGAGPARELIYNQKHQTFPRVTTVSEQTKRE
NRDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt6 amino acid sequence(SEQ ID NO: 19)
EEELQVIQPDKSVSVAAGESAILHCTVTSLIPVGPIQWFRGAGPARELIYNQKNLIFPRVTTVSESGKRE
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt7 amino acid sequence(SEQ ID NO: 20)
EEELQVIQPDKSVSVAAGESAILHCIVTSLIPVGPIQWFRGAGPARELIYNQKILTFPRVTTVSESTKRE
NYDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt8 amino acid sequence(SEQ ID NO: 21)
EEELQVIQPDKSVSVAAGESAILHCTVTSLKPVGPIQWFRGAGPARELIYNQKRDTFPRVTTVSESTKRE
NRDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK
```

FIG. 23 (Continued)

hSIRPα-Fc-mt9 amino acid sequence(SEQ ID NO: 22)
EEELQVIQPDKSVSVAAGESAILTCTVTSLWPVGPIQWFRGAGPARELIYNQKGQNFPRVTTVSESTKRF
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt10 amino acid sequence(SEQ ID NO: 23)
EEELQVIQPDKSVSVAAGESAILTCTVTSLYPVGPIQWFRGAGPARELIYNQKRQTFPRVTTVSESTKRF
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt11 amino acid sequence(SEQ ID NO: 24)
EEELQVIQPDKSVSVAAGESAILHCTVTSLLPVGPIQWFRGAGPARELIYNQKSKVFPRVTTVSESTKRR
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt12 amino acid sequence(SEQ ID NO: 25)
EEELQVIQPDKSVSVAAGESAILHCTVTSLYPVGPIQWFRGAGPARELIYNQKGRRFPRVTTVSESTKRA
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt13 amino acid sequence(SEQ ID NO: 26)
EEELQVIQPDKSVSVAAGESAILHCTVTSLLPVGPIQWFRGAGPARELIYNQKDFLPRVTTVSESTKRE
NRDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt14 amino acid sequence(SEQ ID NO: 27)
EEELQVIQPDKSVSVAAGESAILHCTVTSLAPVGPIQWFRGAGPARELIYNQKLDSFPRVTTVSESTKRE
SMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt15 amino acid sequence(SEQ ID NO: 28)
EEELQVIQPDKSVSVAAGESAILRCTVTSLTPVGPIQWFRGAGPARELIYNQKAKQFPRVTTVSESTKRE
NMIFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK Human IgG4 hinge region and Fc region (IgG4 S228P) (SEQ ID NO: 29)
eskygppcppcpapeflggpsvflfppkpkdtlmisrtpevtcvvvdvsqedpevqfnwyvdgvevhnak
tkpreeqfnstyrvvsvltvlhqdwlngkeykckvsnkglpssiektiskakgqprepqvytlppsqeem

FIG. 23 (Continued)

tknqvsltclvkgfypsdiavewesngqpennykttppvldsdgsfflysrltvdksrwqegnvfscsvm
healhnhytqkslslslgk Human SIRPα amino acid sequence CAA71403.1 (SEQ ID NO: 30)
MEPAGPAPGRLGPLLCLLLAASCAWSGVAGEEELQVIQPDKSVSVAAGESAILHCTVTSLIPVGPIQWFR
GAGPARELIYNQKEGHFPRVTTVSESTKRENMDFSISISNITPADAGTYYCVKFRKGSPDTEFKSGAGTE
LSVRAKPSAPVVSGPAARATPQHTVSFTCESHGFSPRDITLKWFKNGNELSDFQTNVDPVGESVSYSIHS
TAKVVLTREDVHSQVICEVAHVTLQGDPLRGTANLSETIRVPPTLEVTQQPVRAENQVNVTCQVRKFYPQ
RLQLTWLENGNVSRTETASTVTENKDGTYNWMSWLLVNVSAHRDDVKLTCQVEHDGQPAVSKSHDLKVSA
HPKEQGSNTAAENTGSNERNIYIVVGVVCTLLVALLMAALYLVRIRQKKAQGSTSSTRLHEPEKNAREIT
QDTNDITYADLNLPKGKKPAPQAAEPNNHTEYASIQTSPQPASEDTLTYADLDMVHLNRTPKQPAPKPEP
SFSEYASVQVPRK Human SIRPα amino acid sequence NP_542970.1 (SEQ ID NO: 31)
MEPAGPAPGRLGPLLCLLLAASCAWSGVAGEEELQVIQPDKSVLVAAGETATLRCTATSLIPVGPIQWFR
GAGPGRELIYNQKEGHFPRVTTVSDLTKRNNMDFSIRIGNITPADAGTYYCVKFRKGSPDDVEFKSGAGT
ELSVRAKPSAPVVSGPAARATPQHTVSFTCESHGFSPRDITLKWFKNGNELSDFQTNVDPVGESVSYSIH
STAKVVLTREDVHSQVICEVAHVTLQGDPLRGTANLSETIRVPPTLEVTQQPVRAENQVNVTCQVRKFYP
QRLQLTWLENGNVSRTETASTVTENKDGTYNWMSWLLVNVSAHRDDVKLTCQVEHDGQPAVSKSHDLKVS
AHPKEQGSNTAAENTGSNERNIYIVVGVVCTLLVALLMAALYLVRIRQKKAQGSTSSTRLHEPEKNAREI
TQDTNDITYADLNLPKGKKPAPQAAEPNNHTEYASIQTSPQPASEDTLTYADLDMVHLNRTPKQPAPKPE
PSFSEYASVQVPRK Human SIRPα amino acid sequence AAH26692.1 (SEQ ID NO: 32)
MEPAGPAPGRLGPLLCLLLAASCAWSGVAGEEELQVIQPDKSVSVAAGESAILHCTVTSLIPVGPIQWFR
GAGPARELIYNQKEGHFPRVTTVSESTKRENMDFSISISNITPADAGTYYCVKFRKGSPDTEFKSGAGTE
LSVRAKPSAPVVSGPAARATPQHTVSFTCESHGFSPRDITLKWFKNGNELSDFQTNVDPVGESVSYSIHS
TAKVVLTREDVHSQVICEVAHVTLQGDPLRGTANLSETIRVPPTLEVTQQPVRAENQVNVTCQVRKFYPQ
RLQLTWLENGNVSRTETASTVTENKDGTYNWMSWLLVNVSAHRDDVKLTCQVEHDGQPAVSKSHDLKVSA
HPKEQGSNTAAENTGSNERNIYIVVGVVCTLLVALLMAALYLVRIRQKKAQGSTSSTRLHEPEKNAREIT
QVQSLDTNDITYADLNLPKGKKPAPQAAEPNNHTEYASIQTSPQPASEDTLTYADLDMVHLNRTPKQPAP
KPEPSFSEYASVQVPRK hSIRPα-Fc-mt16 amino acid sequence (SEQ ID NO: 46)
EEELQVIQPDKSVSVAAGESAILTCTVTSLIPVGPIQWFRGAGPARELIYNQKRAPFPRVTTVSESTKRE
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt17 amino acid sequence (SEQ ID NO: 47)
EEELQVIQPDKSVSVAAGESAILHCTVTSLIPVGPIQWFRGAGPARELIYNQKSPPFPRVTTVSESTKRL
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt18 amino acid sequence (SEQ ID NO: 48)
EEELQVIQPDKSVSVAAGESAILTCTVTSLWPVGPIQWFRGAGPARELIYNQKSGPFPRVTTVSESTKRR
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH

FIG. 23 (Continued)

QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt19 amino acid sequence(SEQ ID NO: 49)
EEELQVIQPDKSVSVAAGESAILHCTVTSLWPVGPIQWFRGAGPARELIYNQKRAGFPRVTTVSESTKRT
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt20 amino acid sequence(SEQ ID NO: 50)
EEELQVIQPDKSVSVAAGESAILHCTVTQLIPVGPIQWFRGAGPARELIYNQKHRTFPRVTTVSENTKRE
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt21 amino acid sequence(SEQ ID NO: 51)
EEELQVIQPDKSVSVAAGESAILHCTVTSLIPVGPIQWFRGAGPARELIYNQKSPRFPRVTTVSESTKRL
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt22 amino acid sequence(SEQ ID NO: 52)
EEELQVIQPDKSVSVAAGESAILHCTLTSLIPVGPIQWFRGAGPARELIYNQKEDRFPRVTTVSESTKRE
NRDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt23 amino acid sequence(SEQ ID NO: 53)
EEELQVIQPDKSVSVAAGESAILHCTLTSLTPVGPIQWFRGAGPARELIYNQKEGPFPRVTTVSESTKRG
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt31 amino acid sequence(SEQ ID NO: 54)
EEELQVIQPDKSVSVAAGESAILTCTVTSLYPVGPIQWFRGAGPARELIYNQKRQTFPRVTTVSESTKRE
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt32 amino acid sequence(SEQ ID NO: 55)
EEELQVIQPDKSVSVAAGESAILTCTVTSLNPVGPIQWFRGAGPARELIYNQKRQTFPRVTTVSESTKRE
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK

FIG. 23 (Continued)

```
hSIRPα-Fc-mt33 amino acid sequence(SEQ ID NO: 56)
EEELQVIQPDKSVSVAAGESAILRCTVTSLYPVGPIQWFRGAGPARELIYNQKAKQFPRVTTVSESTKRE
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt34 amino acid sequence(SEQ ID NO: 57)
EEELQVIQPDKSVSVAAGESAILRCTVTSLNPVGPIQWFRGAGPARELIYNQKAKQFPRVTTVSESTKRE
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK hSIRPα-Fc-mt35 amino acid sequence(SEQ ID NO: 58)
EEELQVIQPDKSVSVAAGESAILRCTVTSLIPVGPIQWFRGAGPARELIYNQKAKQFPRVTTVSESTKRE
NMDFSISISNITPADAGTYYCVKFRKGSPDTEFKSGAGTELSVRAKPSESKYGPPCPPCPAPEFLGGPSV
FLFPPKPKDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHYTQKSLSLSLGK
```

ENGINEERED SIRPα VARIANTS AND METHODS OF USE THEREOF

CROSS-REFERENCE TO RELATED APPLICATION

This application is a continuation application of and claims priority to International Application No. PCT/US2022/052373, filed on Dec. 9, 2022, which claims priority to and benefit of U.S. Provisional Patent Application Ser. No. 63/292,267, filed Dec. 21, 2021. The entire contents of the forgoing applications are incorporated herein by reference.

SEQUENCE LISTING

This application contains a Sequence Listing that has been submitted electronically as an XML file named 52246-0004001_SL_ST26.xml. The XML file, created on Apr. 29, 2024, is 68,618 bytes in size. The material in the XML file is hereby incorporated by reference in its entirety.

TECHNICAL FIELD

This disclosure relates to engineered SIRPα variants, and methods of use thereof.

BACKGROUND

Signal regulatory protein a (SIRPa) is a regulatory membrane glycoprotein from SIRP family. It is mainly expressed by myeloid cells and also by stem cells or neurons. SIRPα acts as inhibitory receptor and interacts with a broadly expressed transmembrane protein CD47. This interaction negatively controls effector function of innate immune cells such as host cell phagocytosis. SIRPα diffuses laterally on the macrophage membrane and accumulates at a phagocytic synapse to bind CD47, which inhibits the cytoskeleton-intensive process of phagocytosis by the macrophage.

CD47 provides a "do not eat" signal by binding to the N-terminus of signal regulatory protein alpha (SIRPα). It has been found to be overexpressed in many different tumor cells. Targeting CD47 and/or SIRPα can be useful for cancer immunotherapy. However, the interaction between CD47 and SIRPα is required to protect red blood cells, platelets, and lymphocytes from rapid elimination by splenic macrophage. There is a need to develop cancer therapies targeting CD47/SIRPα pathway with limited toxicities.

SUMMARY

This disclosure relates to engineered SIRPα variants, and methods of use thereof.

In one aspect, the disclosure is related to an engineered SIRPα polypeptide comprising an amino acid sequence that is at least 80% identical to SEQ ID NO: 1, in some embodiments, the engineered SIRPα polypeptide comprises one or more amino acid mutations at BC loop, C'D loop, and/or DE loop. In some embodiments, the engineered SIRPα polypeptide described herein comprises one or more of the following: (a) the amino acid that corresponds to E54 of SEQ ID NO: 1 is A, H, N, I, R, G, S, D, or L; (b) the amino acid that corresponds to G55 of SEQ ID NO: 1 is W, F, Q, L, D, K, R, A, or P; and (c) the amino acid that corresponds to H56 of SEQ ID NO: 1 is P, I, T, N, V, R, L, S, G, or Q.

In some embodiments, the amino acid that corresponds to H56 of SEQ ID NO: 1 is I, T, N, V, L, S, G, or Q. In some embodiments, the amino acid that corresponds to 131 of SEQ ID NO: 1 is W, K, Y, L, A, N, or T. In some embodiments, the amino acid that corresponds to 131 of SEQ ID NO: 1 is W, K, Y, L, A, or N. In some embodiments, the engineered SIRPα polypeptide described herein comprises one or more of the following: (a) the amino acid that corresponds to S66 of SEQ ID NO: 1 is Q or N; and (b) the amino acid that corresponds to T67 of SEQ ID NO: 1 is G.

In some embodiments, the engineered SIRPα polypeptide described herein comprises one or more of the following: (a) the amino acid that corresponds to H24 of SEQ ID NO: 1 is N or T; (b) the amino acid that corresponds to T26 of SEQ ID NO: 1 is I.

In some embodiments, the engineered SIRPα polypeptide described herein comprises one or more of the following: (a) the amino acid that corresponds to E70 of SEQ ID NO: 1 is G, F, R, A, L, or T; (b) the amino acid that corresponds to M72 of SEQ ID NO: 1 is R or Y; and (c) the amino acid that corresponds to D73 of SEQ ID NO: 1 is I.

In some embodiments, the amino acid that corresponds to K53 of SEQ ID NO: 1 is R. In some embodiments, the amino acid that corresponds to K53 of SEQ ID NO: 1 is not R.

In some embodiments, the engineered SIRPα polypeptide described herein comprises one or more of the following: (a) the amino acid that corresponds to position 27 of SEQ ID NO: 1 is V or L; (b) the amino acid that corresponds to position 63 of SEQ ID NO: 1 is V; and (c) the amino acid that corresponds to position 68 of SEQ ID NO: 1 is K.

In some embodiments, the engineered SIRPα polypeptide described herein comprises an amino acid sequence that is at least 85%, 90%, 95%, or 100% identical to SEQ ID NO: 2, 3, 4, 5, 6,7, 8,9, 10, 11, 12, 13, 14, 33, 34, 35, 36, 37, 38, 39, 40, 41, 42, 43, 44, or 45.

In one aspect, the disclosure is related to an engineered SIRPα polypeptide comprising an amino acid sequence that is at least 80% identical to SEQ ID NO: 1 or SEQ ID NO: 2, in some embodiments, the polypeptide comprises one or more of the following: (a) the amino acid that corresponds to 131 of SEQ ID NO: 1 is W; (b) the amino acid that corresponds to E54 of SEQ ID NO: 1 is A; (c) the amino acid that corresponds to G55 of SEQ ID NO: 1 is W; and (d) the amino acid that corresponds to H56 of SEQ ID NO: 1 is P. In some embodiments, the engineered SIRPα polypeptide described herein comprises an amino acid sequence that is at least 90% identical to SEQ ID NO: 2.

In one aspect, the disclosure is related to an engineered SIRPα polypeptide comprising an amino acid sequence that is at least 80% identical to SEQ ID NO: 1 or SEQ ID NO: 3, in some embodiments, the polypeptide comprises one or more of the following: (a) the amino acid that corresponds to H24 of SEQ ID NO: 1 is R; (b) the amino acid that corresponds to 131 of SEQ ID NO: 1 is W; (c) the amino acid that corresponds to E54 of SEQ ID NO: 1 is A; (d) the amino acid that corresponds to G55 of SEQ ID NO: 1 is F; (e) the amino acid that corresponds to H56 of SEQ ID NO: 1 is I; and (f) the amino acid that corresponds to E70 of SEQ ID NO: 1 is G. In some embodiments, the engineered SIRPα polypeptide described herein comprises an amino acid sequence that is at least 90% identical to SEQ ID NO: 3.

In one aspect, the disclosure is related to an engineered SIRPα polypeptide comprising an amino acid sequence that is at least 80% identical to SEQ ID NO: 1 or SEQ ID NO: 4, in some embodiments, the polypeptide comprises one or more of the following: (a) the amino acid that corresponds to H24 of SEQ ID NO: 1 is N; (b) the amino acid that corresponds to E54 of SEQ ID NO: 1 is H; (c) the amino acid that corresponds to G55 of SEQ ID NO: 1 is Q; (d) the amino acid that corresponds to H56 of SEQ ID NO: 1 is T; (e) the amino acid that corresponds to S66 of SEQ ID NO: 1 is Q; and (f) the amino acid that corresponds to M72 of SEQ ID NO: 1 is R. In some embodiments, the engineered SIRPα polypeptide described herein comprises an amino acid sequence that is at least 90% identical to SEQ ID NO: 4.

In one aspect, the disclosure is related to an engineered SIRPα polypeptide comprising an amino acid sequence that is at least 80% identical to SEQ ID NO: 1 or SEQ ID NO: 5, in some embodiments, the polypeptide comprises one or more of the following: (a) the amino acid that corresponds to E54 of SEQ ID NO: 1 is N; (b) the amino acid that corresponds to G55 of SEQ ID NO: 1 is L; (c) the amino acid that corresponds to H56 of SEQ ID NO: 1 is I; and (d) the amino acid that corresponds to T67 of SEQ ID NO: 1 is G. In some embodiments, the engineered SIRPα polypeptide described herein comprises an amino acid sequence that is at least 90% identical to SEQ ID NO: 5.

In one aspect, the disclosure is related to an engineered SIRPα polypeptide comprising an amino acid sequence that is at least 80% identical to SEQ ID NO: 1 or SEQ ID NO: 6, in some embodiments, the polypeptide comprises one or more of the following: (a) the amino acid that corresponds to T26 of SEQ ID NO: 1 is I; (b) the amino acid that corresponds to E54 of SEQ ID NO: 1 is I; (c) the amino acid that corresponds to G55 of SEQ ID NO: 1 is L; (d) the amino acid that corresponds to H56 of SEQ ID NO: 1 is T; and (e) the amino acid that corresponds to M72 of SEQ ID NO: 1 is Y In some embodiments, the engineered SIRPα polypeptide described herein comprises an amino acid sequence that is at least 90% identical to SEQ ID NO: 6.

In one aspect, the disclosure is related to an engineered SIRPα polypeptide comprising an amino acid sequence that is at least 80% identical to SEQ ID NO: 1 or SEQ ID NO: 7, in some embodiments, the polypeptide comprises one or more of the following: (a) the amino acid that corresponds to 131 of SEQ ID NO: 1 is K; (b) the amino acid that corresponds to E54 of SEQ ID NO: 1 is R; (c) the amino acid that corresponds to G55 of SEQ ID NO: 1 is D; (d) the amino acid that corresponds to H56 of SEQ ID NO: 1 is T; and (e) the amino acid that corresponds to M72 of SEQ ID NO: 1 is R. In some embodiments, the engineered SIRPα polypeptide described herein comprises an amino acid sequence that is at least 90% identical to SEQ ID NO: 7.

In one aspect, the disclosure is related to an engineered SIRPα polypeptide comprising an amino acid sequence that is at least 80% identical to SEQ ID NO: 1 or SEQ ID NO: 8, in some embodiments, the polypeptide comprises one or more of the following: (a) the amino acid that corresponds to H24 of SEQ ID NO: 1 is T; (b) the amino acid that corresponds to 131 of SEQ ID NO: 1 is W; (c) the amino acid that corresponds to E54 of SEQ ID NO: 1 is G; (d) the amino acid that corresponds to G55 of SEQ ID NO: 1 is Q; (e) the amino acid that corresponds to H56 of SEQ ID NO: 1 is N; and (f) the amino acid that corresponds to E70 of SEQ ID NO: 1 is F. In some embodiments, the engineered SIRPα polypeptide described herein comprises an amino acid sequence that is at least 90% identical to SEQ ID NO: 8.

In one aspect, the disclosure is related to an engineered SIRPα polypeptide comprising an amino acid sequence that is at least 80% identical to SEQ ID NO: 1 or SEQ ID NO: 9, in some embodiments, the polypeptide comprises one or more of the following: (a) the amino acid that corresponds to H24 of SEQ ID NO: 1 is T; (b) the amino acid that corresponds to 131 of SEQ ID NO: 1 is Y; (c) the amino acid that corresponds to E54 of SEQ ID NO: 1 is R; (d) the amino acid that corresponds to G55 of SEQ ID NO: 1 is Q; (e) the amino acid that corresponds to H56 of SEQ ID NO: 1 is T; and (f) the amino acid that corresponds to E70 of SEQ ID NO: 1 is F. In some embodiments, the engineered SIRPα polypeptide described herein comprises an amino acid sequence that is at least 90% identical to SEQ ID NO: 9.

In one aspect, the disclosure is related to an engineered SIRPα polypeptide comprising an amino acid sequence that is at least 80% identical to SEQ ID NO: 1 or SEQ ID NO: 10, in some embodiments, the polypeptide comprises one or more of the following: (a) the amino acid that corresponds to 131 of SEQ ID NO: 1 is L; (b) the amino acid that corresponds to E54 of SEQ ID NO: 1 is S; (c) the amino acid that corresponds to G55 of SEQ ID NO: 1 is K; (d) the amino acid that corresponds to H56 of SEQ ID NO: 1 is V; and (e) the amino acid that corresponds to E70 of SEQ ID NO: 1 is R. In some embodiments, the engineered SIRPα polypeptide described herein comprises an amino acid sequence that is at least 90% identical to SEQ ID NO: 10.

In one aspect, the disclosure is related to an engineered SIRPα polypeptide comprising an amino acid sequence that is at least 80% identical to SEQ ID NO: 1 or SEQ ID NO: 11, in some embodiments, the polypeptide comprises one or more of the following: (a) the amino acid that corresponds to 131 of SEQ ID NO: 1 is Y; (b) the amino acid that corresponds to E54 of SEQ ID NO: 1 is G; (c) the amino acid that corresponds to G55 of SEQ ID NO: 1 is R; (d) the amino acid that corresponds to H56 of SEQ ID NO: 1 is R; and (e) the amino acid that corresponds to E70 of SEQ ID NO: 1 is A. In some embodiments, the engineered SIRPα polypeptide described herein comprises an amino acid sequence that is at least 90% identical to SEQ ID NO: 11.

In one aspect, the disclosure is related to an engineered SIRPα polypeptide comprising an amino acid sequence that is at least 80% identical to SEQ ID NO: 1 or SEQ ID NO: 12, in some embodiments, the polypeptide comprises one or more of the following: (a) the amino acid that corresponds to 131 of SEQ ID NO: 1 is L; (b) the amino acid that corresponds to E54 of SEQ ID NO: 1 is D; (c) the amino acid that corresponds to G55 of SEQ ID NO: 1 is F; (d) the amino acid that corresponds to H56 of SEQ ID NO: 1 is L; and (e) the amino acid that corresponds to M72 of SEQ ID NO: 1 is R. In some embodiments, the engineered SIRPα polypeptide described herein comprises an amino acid sequence that is at least 90% identical to SEQ ID NO: 12.

In one aspect, the disclosure is related to an engineered SIRPα polypeptide comprising an amino acid sequence that is at least 80% identical to SEQ ID NO: 1 or SEQ ID NO: 13, in some embodiments, the polypeptide comprises one or more of the following: (a) the amino acid that corresponds to 131 of SEQ ID NO: 1 is A; (b) the amino acid that corresponds to E54 of SEQ ID NO: 1 is L; (c) the amino acid that corresponds to G55 of SEQ ID NO: 1 is D; (d) the amino acid that corresponds to H56 of SEQ ID NO: 1 is S; and (e) the amino acid that corresponds to N71 of SEQ ID NO: 1 is S. In some embodiments, the engineered SIRPα polypeptide described herein comprises an amino acid sequence that is at least 90% identical to SEQ ID NO: 13.

In one aspect, the disclosure is related to an engineered SIRPα polypeptide comprising an amino acid sequence that is at least 80% identical to SEQ ID NO: 1 or SEQ ID NO: 14, in some embodiments, the polypeptide comprises one or more of the following: (a) the amino acid that corresponds to H24 of SEQ ID NO: 1 is R; (b) the amino acid that corresponds to 131 of SEQ ID NO: 1 is T; (c) the amino acid that corresponds to E54 of SEQ ID NO: 1 is A; (d) the amino acid that corresponds to G55 of SEQ ID NO: 1 is K; (e) the amino acid that corresponds to H56 of SEQ ID NO: 1 is Q; and (f) the amino acid that corresponds to D73 of SEQ ID NO: 1 is I. In some embodiments, the engineered SIRPα polypeptide described herein comprises an amino acid sequence that is at least 90% identical to SEQ ID NO: 14.

In one aspect, the disclosure is related to an engineered SIRPα polypeptide comprising an amino acid sequence that is at least 80% identical to SEQ ID NO: 1 or SEQ ID NO: 33, in some embodiments, the polypeptide comprises one or more of the following: (a) the amino acid that corresponds to H24 of SEQ ID NO: 1 is T; (b) the amino acid that corresponds to E54 of SEQ ID NO: 1 is R; (c) the amino acid that corresponds to G55 of SEQ ID NO: 1 is A; and (d) the amino acid that corresponds to H56 of SEQ ID NO: 1 is P. In some embodiments, the engineered SIRPα polypeptide described herein comprises an amino acid sequence that is at least 90% identical to SEQ ID NO: 33.

In one aspect, the disclosure is related to an engineered SIRPα polypeptide comprising an amino acid sequence that is at least 80% identical to SEQ ID NO: 1 or SEQ ID NO: 34, in some embodiments, the polypeptide comprises one or more of the following: (a) the amino acid that corresponds to E54 of SEQ ID NO: 1 is S; (b) the amino acid that corresponds to G55 of SEQ ID NO: 1 is P; (c) the amino acid that corresponds to H56 of SEQ ID NO: 1 is P; and (d) the amino acid that corresponds to E70 of SEQ ID NO: 1 is L. In some embodiments, the engineered SIRPα polypeptide described herein comprises an amino acid sequence that is at least 90% identical to SEQ ID NO: 34.

In one aspect, the disclosure is related to an engineered SIRPα polypeptide comprising an amino acid sequence that is at least 80% identical to SEQ ID NO: 1 or SEQ ID NO: 35, in some embodiments, the polypeptide comprises one or more of the following: (a) the amino acid that corresponds to H24 of SEQ ID NO: 1 is T; (b) the amino acid that corresponds to 131 of SEQ ID NO: 1 is W; (c) the amino acid that corresponds to E54 of SEQ ID NO: 1 is S; (d) the amino acid that corresponds to H56 of SEQ ID NO: 1 is P; and (e) the amino acid that corresponds to E70 of SEQ ID NO: 1 is R. In some embodiments, the engineered SIRPα polypeptide described herein comprises an amino acid sequence that is at least 90% identical to SEQ ID NO: 34.

In one aspect, the disclosure is related to an engineered SIRPα polypeptide comprising an amino acid sequence that is at least 80% identical to SEQ ID NO: 1 or SEQ ID NO: 36, in some embodiments, the polypeptide comprises one or more of the following: (a) the amino acid that corresponds to 131 of SEQ ID NO: 1 is W; (b) the amino acid that corresponds to E54 of SEQ ID NO: 1 is R; (c) the amino acid that corresponds to G55 of SEQ ID NO: 1 is A; (d) the amino acid that corresponds to H56 of SEQ ID NO: 1 is G; and (e) the amino acid that corresponds to E70 of SEQ ID NO: 1 is T. In some embodiments, the engineered SIRPα polypeptide described herein comprises an amino acid sequence that is at least 90% identical to SEQ ID NO: 36.

In one aspect, the disclosure is related to an engineered SIRPα polypeptide comprising an amino acid sequence that is at least 80% identical to SEQ ID NO: 1 or SEQ ID NO: 37, in some embodiments, the polypeptide comprises one or more of the following: (a) the amino acid that corresponds to S29 of SEQ ID NO: 1 is Q; (b) the amino acid that corresponds to E54 of SEQ ID NO: 1 is H; (c) the amino acid that corresponds to G55 of SEQ ID NO: 1 is R; (d) the amino acid that corresponds to H56 of SEQ ID NO: 1 is T; and (e) the amino acid that corresponds to S66 of SEQ ID NO: 1 is N. In some embodiments, the engineered SIRPα polypeptide described herein comprises an amino acid sequence that is at least 90% identical to SEQ ID NO: 37.

In one aspect, the disclosure is related to an engineered SIRPα polypeptide comprising an amino acid sequence that is at least 80% identical to SEQ ID NO: 1 or SEQ ID NO: 38, in some embodiments, the polypeptide comprises one or more of the following: (a) the amino acid that corresponds to E54 of SEQ ID NO: 1 is S; (b) the amino acid that corresponds to G55 of SEQ ID NO: 1 is P; (c) the amino acid that corresponds to H56 of SEQ ID NO: 1 is R; and (d) the amino acid that corresponds to E70 of SEQ ID NO: 1 is L. In some embodiments, the engineered SIRPα polypeptide described herein comprises an amino acid sequence that is at least 90% identical to SEQ ID NO: 38.

In one aspect, the disclosure is related to an engineered SIRPα polypeptide comprising an amino acid sequence that is at least 80% identical to SEQ ID NO: 1 or SEQ ID NO: 39, in some embodiments, the polypeptide comprises one or more of the following: (a) the amino acid that corresponds to V27 of SEQ ID NO: 1 is L; (b) the amino acid that corresponds to G55 of SEQ ID NO: 1 is D; (c) the amino acid that corresponds to H56 of SEQ ID NO: 1 is R; and (d) the amino acid that corresponds to M72 of SEQ ID NO: 1 is R. In some embodiments, the engineered SIRPα polypeptide of described herein comprises an amino acid sequence that is at least 90% identical to SEQ ID NO: 39.

In one aspect, the disclosure is related to an engineered SIRPα polypeptide comprising an amino acid sequence that is at least 80% identical to SEQ ID NO: 1 or SEQ ID NO: 40, in some embodiments, the polypeptide comprises one or more of the following: (a) the amino acid that corresponds to V27 of SEQ ID NO: 1 is L; (b) the amino acid that corresponds to 131 of SEQ ID NO: 1 is T; (c) the amino acid that corresponds to H56 of SEQ ID NO: 1 is P; and (d) the amino acid that corresponds to E70 of SEQ ID NO: 1 is G. In some embodiments, the engineered SIRPα polypeptide described herein comprises an amino acid sequence that is at least 90% identical to SEQ ID NO: 40.

In one aspect, the disclosure is related to an engineered SIRPα polypeptide comprising an amino acid sequence that is at least 80% identical to SEQ ID NO: 1 or SEQ ID NO: 41, in some embodiments, the polypeptide comprises one or more of the following: (a) the amino acid that corresponds to H24 of SEQ ID NO: 1 is T; (b) the amino acid that corresponds to 131 of SEQ ID NO: 1 is Y; (c) the amino acid that corresponds to E54 of SEQ ID NO: 1 is R; (d) the amino acid that corresponds to G55 of SEQ ID NO: 1 is Q; and (e) the amino acid that corresponds to H56 of SEQ ID NO: 1 is T. In some embodiments, the engineered SIRPα polypeptide described herein comprises an amino acid sequence that is at least 90% identical to SEQ ID NO: 41.

In one aspect, the disclosure is related to an engineered SIRPα polypeptide comprising an amino acid sequence that is at least 80% identical to SEQ ID NO: 1 or SEQ ID NO: 42, in some embodiments, the polypeptide comprises one or more of the following: (a) the amino acid that corresponds to H24 of SEQ ID NO: 1 is T; (b) the amino acid that corresponds to 131 of SEQ ID NO: 1 is N; (c) the amino acid that corresponds to E54 of SEQ ID NO: 1 is R; (d) the amino acid that corresponds to G55 of SEQ ID NO: 1 is Q; and (e) the amino acid that corresponds to H56 of SEQ ID NO: 1 is T. In some embodiments, the engineered SIRPα polypeptide described herein comprises an amino acid sequence that is at least 90% identical to SEQ ID NO: 42.

In one aspect, the disclosure is related to an engineered SIRPα polypeptide comprising an amino acid sequence that is at least 80% identical to SEQ ID NO: 1 or SEQ ID NO:

43, in some embodiments, the polypeptide comprises one or more of the following: (a) the amino acid that corresponds to H24 of SEQ ID NO: 1 is R; (b) the amino acid that corresponds to 131 of SEQ ID NO: 1 is Y; (c) the amino acid that corresponds to E54 of SEQ ID NO: 1 is A; (d) the amino acid that corresponds to G55 of SEQ ID NO: 1 is K; and (e) the amino acid that corresponds to H56 of SEQ ID NO: 1 is Q. In some embodiments, the engineered SIRPα polypeptide described herein comprises an amino acid sequence that is at least 90% identical to SEQ ID NO: 43.

In one aspect, the disclosure is related to an engineered SIRPα polypeptide comprising an amino acid sequence that is at least 80% identical to SEQ ID NO: 1 or SEQ ID NO: 44, in some embodiments, the polypeptide comprises one or more of the following: (a) the amino acid that corresponds to H24 of SEQ ID NO: 1 is R; (b) the amino acid that corresponds to 131 of SEQ ID NO: 1 is N; (c) the amino acid that corresponds to E54 of SEQ ID NO: 1 is A; (d) the amino acid that corresponds to G55 of SEQ ID NO: 1 is K; and (e) the amino acid that corresponds to H56 of SEQ ID NO: 1 is Q. In some embodiments, the engineered SIRPα polypeptide described herein comprises an amino acid sequence that is at least 90% identical to SEQ ID NO: 44.

In one aspect, the disclosure is related to an engineered SIRPα polypeptide comprising an amino acid sequence that is at least 80% identical to SEQ ID NO: 1 or SEQ ID NO: 45, in some embodiments, the polypeptide comprises one or more of the following: (a) the amino acid that corresponds to H24 of SEQ ID NO: 1 is R; (b) the amino acid that corresponds to E54 of SEQ ID NO: 1 is A; (c) the amino acid that corresponds to G55 of SEQ ID NO: 1 is K; and (d) the amino acid that corresponds to H56 of SEQ ID NO: 1 is Q. In some embodiments, the engineered SIRPα polypeptide described herein comprises an amino acid sequence that is at least 90% identical to SEQ ID NO: 45.

In some embodiments, the engineered SIRPα polypeptide further comprises a CH2 domain and a CH3 domain. In some embodiments, the engineered SIRPα polypeptide further comprises a hinge region. In some embodiments, the CH2 domain is an IgG CH2 domain and the CH3 domain is an IgG CH3 domain. In some embodiments, the engineered SIRPα polypeptide comprises an amino acid sequence that is at least 80%, 85%, 90%, or 95% identical to any one of SEQ ID NOs: 15-28 and 46-58.

In one aspect, the disclosure is related to a protein construct comprising the engineered SIRPα polypeptide described herein. In some embodiments, the protein construct described herein comprises two or more engineered SIRPα polypeptides. In some embodiments, at least two engineered SIRPα polypeptides are identical. In some embodiments, at least two engineered SIRPα polypeptides are different. In some embodiments, the protein construct described herein further comprises an Fc region. In some embodiments, the Fc region is an IgG4 Fc region. In some embodiments, the Fc region is an IgG1 Fc region (e.g., with LALA mutations or LALA-PG mutations).

In one aspect, the disclosure is related to a protein construct comprising a first fusion polypeptide comprising the engineered SIRPα polypeptide as described herein, a first CH2 domain, and a first CH3 domain; and a second fusion polypeptide comprising a second CH2 domain, and a second CH3 domain; In some embodiments, the first fusion polypeptide and the second fusion polypeptide associate with each other, forming a dimer. In some embodiments, the second fusion polypeptide further comprises a second engineered SIRPα polypeptide.

In one aspect, the disclosure is related to a pharmaceutical composition comprising the engineered SIRPα polypeptide as described herein or the protein construct as described herein; and a pharmaceutically acceptable carrier.

In one aspect, the disclosure is related to a nucleic acid encoding the engineered SIRPα polypeptide as described herein or the protein construct as described herein. In one aspect, the disclosure is related to a vector comprising the nucleic acid as described herein. In one aspect, the disclosure is related to a cell comprising the nucleic acid as described herein. In some embodiments, the cell is a CHO cell.

In one aspect, the disclosure is related to a method of producing an engineered SIRPα polypeptide or a protein construct comprising the engineered SIRPα polypeptide, the method comprising (a) culturing the cell as described herein under conditions sufficient for the cell to produce the engineered SIRPα polypeptide or the protein construct; and (b) collecting the engineered SIRPα polypeptide or the protein construct produced by the cell.

In one aspect, the disclosure is related to a method of treating a subject having cancer, the method comprising administering a therapeutically effective amount of a composition comprising the engineered SIRPα polypeptide as described herein or the protein construct as described herein, to the subject. In some embodiments, the subject has a solid tumor or a hematologic cancer. In some embodiments, the cancer is acute myeloid leukemia, non-Hodgkin's lymphoma, breast cancer, bladder cancer, ovarian cancer, or small cell lung cancer tumors.

In one aspect, the disclosure is related to a method of decreasing the rate of tumor growth, the method comprising contacting a tumor cell with an effective amount of a composition comprising the engineered SIRPα polypeptide as described herein or the protein construct as described herein.

In one aspect, the disclosure is related to a method of killing a tumor cell, the method comprising contacting a tumor cell with an effective amount of a composition comprising the engineered SIRPα polypeptide as described herein or the protein construct as described herein.

As used herein, the term "engineered SIRPα polypeptide" refers to a polypeptide derived from a wildtype SIRPα polypeptide or a portion thereof (e.g., the extracellular region of SIRPα, or the IgV domain of SIRPα) with one or more mutations (e.g., insertions, deletions, or substitutions). In some embodiments, the engineered SIRPα polypeptide comprises or consists of the extracellular region of SIRPα. In some embodiments, the engineered SIRPα polypeptide comprises or consists of the IgV domain of SIRPα. In some embodiments, the engineered SIRPα polypeptide is a modified IgV domain.

As used herein, the term "protein construct" refers to a complex having one or more polypeptides. In some embodiments, the protein construct has two or more polypeptides, wherein the polypeptides can associate with each other, forming a dimer or a multimer.

As used herein, the term "cancer" refers to cells having the capacity for uncontrolled autonomous growth. Examples of such cells include cells having an abnormal state or condition characterized by rapidly proliferating cell growth. The term is meant to include cancerous growths, e.g., tumors; oncogenic processes, metastatic tissues, and malignantly transformed cells, tissues, or organs, irrespective of histopathologic type or stage of invasiveness. Also included are malignancies of the various organ systems, such as respiratory, cardiovascular, renal, reproductive, hematological, neurological, hepatic, gastrointestinal, and endocrine systems; as well as adenocarcinomas which include malignancies such as most colon cancers, renal-cell carcinoma, prostate cancer and/or testicular tumors, non-small cell carcinoma of the lung, and cancer of the small intestine. Cancer that is "naturally arising" includes any cancer that is not experimentally induced by implantation of cancer cells into a subject, and includes, for example, spontaneously arising cancer, cancer caused by exposure of a patient to a carcinogen(s), cancer resulting from insertion of a transgenic oncogene or knockout of a tumor suppressor gene, and cancer caused by infections, e.g., viral infections. The term "carcinoma" is art recognized and refers to malignancies of epithelial or endocrine tissues. The term also includes carcinosarcomas, which include malignant tumors composed of carcinomatous and sarcomatous tissues. An "adenocarcinoma" refers to a carcinoma derived from glandular tissue or in which the tumor cells form recognizable glandular structures. The term "sarcoma" is art recognized and refers to malignant tumors of mesenchymal derivation. The term "hematopoietic neoplastic disorders" includes diseases involving hyperplastic/neoplastic cells of hematopoietic origin. A hematopoietic neoplastic disorder can arise from myeloid, lymphoid or erythroid lineages, or precursor cells thereof. A hematologic cancer is a cancer that begins in blood-forming tissue, such as the bone marrow, or in the cells of the immune system. Examples of hematologic cancer include e.g., leukemia, lymphoma, and multiple myeloma etc.

As used herein, the terms "subject" and "patient" are used interchangeably throughout the specification and describe an animal, human or non-human, to whom treatment according to the methods of the present invention is provided. Veterinary and non-veterinary applications are contemplated in the present disclosure. Human patients can be adult humans or juvenile humans (e.g., humans below the age of 18 years old). In addition to humans, patients include but are not limited to mice, rats, hamsters, guinea-pigs, rabbits, ferrets, cats, dogs, and primates. Included are, for example, non-human primates (e.g., monkey, chimpanzee, gorilla, and the like), rodents (e.g., rats, mice, gerbils, hamsters, ferrets, rabbits), lagomorphs, swine (e.g., pig, miniature pig), equine, canine, feline, bovine, and other domestic, farm, and zoo animals.

As used herein, the terms "polypeptide," "peptide," and "protein" are used interchangeably to refer to polymers of amino acids of any length of at least two amino acids.

As used herein, the terms "polynucleotide," "nucleic acid molecule," and "nucleic acid sequence" are used interchangeably herein to refer to polymers of nucleotides of any length of at least two nucleotides, and include, without limitation, DNA, RNA, DNA/RNA hybrids, and modifications thereof.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF DRAWINGS

FIG. 2 shows amino acid residues of the IgV domain of human SIRPα. The sequence (SEQ ID NO: 1) is identical to amino acids 31-148 of GenBank Accession No.: CAA71403.1 (SEQ ID NO: 30). Residues within BC loop, C'D loop, and DE loop are underlined.

FIGS. 4A-4B are tables showing the expression level (absorbance at 450 nm, or $OD_{450}$), hCD47/hSIRPα blocking (absorbance at 450 nm, or $OD_{450}$), hCD47/hSIRPα blocking ability, human CD47 binding (absorbance at 450 nm, or $OD_{450}$), human CD47 binding ability (B)/expression (E) ratio, and mouse CD47 binding (absorbance at 450 nm, or $OD_{450}$) data of 56 selected clones.

FIG. 6 shows specific amino acid mutations within the BC loop region, C'D loop region, and DE loop region of the wild-type SIRPα IgV domain and 26 selected clones (mt3-mt23, and mt31-mt35). The BC loop of the wild-type SIRPα corresponds to amino acids 24-33 of SEQ ID NO: 1. The C'D loop of the wild-type SIRPα corresponds to amino acids 54-56 of SEQ ID NO: 1. The DE loop of the wild-type SIRPα corresponds to amino acids 66-73 of SEQ ID NO: 1. The BC loop of hSIRPα-mt3 corresponds to amino acids 24-33 of SEQ ID NO: 2. The C'D loop of hSIRPα-mt3 corresponds to amino acids 54-56 of SEQ ID NO: 2. The DE loop of hSIRPα-mt3 corresponds to amino acids 66-73 of SEQ ID NO: 2. The BC loop of hSIRPα-mt4 corresponds to amino acids 24-33 of SEQ ID NO: 3. The C'D loop of hSIRPα-mt4 corresponds to amino acids 54-56 of SEQ ID NO: 3. The DE loop of hSIRPα-mt4 corresponds to amino acids 66-73 of SEQ ID NO: 3. The BC loop of hSIRPα-mt5 corresponds to amino acids 24-33 of SEQ ID NO: 4. The C'D loop of hSIRPα-mt5 corresponds to amino acids 54-56 of SEQ ID NO: 4. The DE loop of hSIRPα-mt5 corresponds to amino acids 66-73 of SEQ ID NO: 4. The BC loop of hSIRPα-mt6 corresponds to amino acids 24-33 of SEQ ID NO: 5. The C'D loop of hSIRPα-mt6 corresponds to amino acids 54-56 of SEQ ID NO: 5. The DE loop of hSIRPα-mt6 corresponds to amino acids 66-73 of SEQ ID NO: 5. The BC loop of hSIRPα-mt7 corresponds to amino acids 24-33 of SEQ ID NO: 6. The C'D loop of hSIRPα-mt7 corresponds to amino acids 54-56 of SEQ ID NO: 6. The DE loop of hSIRPα-mt7 corresponds to amino acids 66-73 of SEQ ID NO: 6. The BC loop of hSIRPα-mt8 corresponds to amino acids 24-33 of SEQ ID NO: 7. The C'D loop of hSIRPα-mt8 corresponds to amino acids 54-56 of SEQ ID NO: 7. The DE loop of hSIRPα-mt8 corresponds to amino acids 66-73 of SEQ ID NO: 7. The BC loop of hSIRPα-mt9 corresponds to amino acids 24-33 of SEQ ID NO: 8. The C'D loop of hSIRPα-mt9 corresponds to amino acids 54-56 of SEQ ID NO: 8. The DE loop of hSIRPα-mt9 corresponds to amino acids 66-73 of SEQ ID NO: 8. The BC loop of hSIRPα-mt10 corresponds to amino acids 24-33 of SEQ ID NO: 9. The C'D loop of hSIRPα-mt10 corresponds to amino acids 54-56 of SEQ ID NO: 9. The DE loop of hSIRPα-mt10 corresponds to amino acids 66-73 of SEQ ID NO: 9. The BC loop of hSIRPα-mt11 corresponds to amino acids 24-33 of SEQ ID NO: 10. The C'D loop of hSIRPα-mt11 corresponds to amino acids 54-56 of SEQ ID NO: 10. The DE loop of hSIRPα-mt11 corresponds to amino acids 66-73 of SEQ ID NO: 10. The BC loop of hSIRPα-mt12 corresponds to amino acids 24-33 of SEQ ID NO: 11. The C'D loop of hSIRPα-mt12 corresponds to amino acids 54-56 of SEQ ID NO: 11. The DE loop of hSIRPα-mt12 corresponds to amino acids 66-73 of SEQ ID NO: 11. The BC loop of hSIRPα-mt13 corresponds to amino acids 24-33 of SEQ ID NO: 12. The C'D loop of hSIRPα-mt13 corresponds to amino acids 54-56 of SEQ ID NO: 12. The DE loop of hSIRPα-mt13 corresponds to amino acids 66-73 of SEQ ID NO: 12. The BC loop of hSIRPα-mt14 corresponds to amino acids 24-33 of SEQ ID NO: 13. The C'D loop of hSIRPα-mt14 corresponds to amino acids 54-56 of SEQ ID NO: 13. The DE loop of hSIRPα-mt14 corresponds to amino acids 66-73 of SEQ ID NO: 13. The BC loop of hSIRPα-mt15 corresponds to amino acids 24-33 of SEQ ID NO: 14. The C'D loop of hSIRPα-mt15 corresponds to amino acids 54-56 of SEQ ID NO: 14. The DE loop of hSIRPα-mt15 corresponds to amino acids 66-73 of SEQ ID NO: 14. The BC loop of hSIRPα-mt16 corresponds to amino acids 24-33 of SEQ ID NO: 33. The C'D loop of hSIRPα-mt16 corresponds to amino acids 54-56 of SEQ ID NO: 33. The DE loop of hSIRPα-mt16 corresponds to amino acids 66-73 of SEQ ID NO: 33. The BC loop of hSIRPα-mt17 corresponds to amino acids 24-33 of SEQ ID NO: 34. The C'D loop of hSIRPα-mt17 corresponds to amino acids 54-56 of SEQ ID NO: 34. The DE loop of hSIRPα-mt17 corresponds to amino acids 66-73 of SEQ ID NO: 34. The BC loop of hSIRPα-mt18 corresponds to amino acids 24-33 of SEQ ID NO: 35. The C'D loop of hSIRPα-mt18 corresponds to amino acids 54-56 of SEQ ID NO: 35. The DE loop of hSIRPα-mt18 corresponds to amino acids 66-73 of SEQ ID NO: 35. The BC loop of hSIRPα-mt19 corresponds to amino acids 24-33 of SEQ ID NO: 36. The C'D loop of hSIRPα-mt19 corresponds to amino acids 54-56 of SEQ ID NO: 36. The DE loop of hSIRPα-mt19 corresponds to amino acids 66-73 of SEQ ID NO: 36. The BC loop of hSIRPα-mt20 corresponds to amino acids 24-33 of SEQ ID NO: 37. The C'D loop of hSIRPα-mt20 corresponds to amino acids 54-56 of SEQ ID NO: 37. The DE loop of hSIRPα-mt20 corresponds to amino acids 66-73 of SEQ ID NO: 37. The BC loop of hSIRPα-mt21 corresponds to amino acids 24-33 of SEQ ID NO: 38. The C'D loop of hSIRPα-mt21 corresponds to amino acids 54-56 of SEQ ID NO: 38. The DE loop of hSIRPα-mt21 corresponds to amino acids 66-73 of SEQ ID NO: 38. The BC loop of hSIRPα-mt22 corresponds to amino acids 24-33 of SEQ ID NO: 39. The C'D loop of hSIRPα-mt22 corresponds to amino acids 54-56 of SEQ ID NO: 39. The DE loop of hSIRPα-mt22 corresponds to amino acids 66-73 of SEQ ID NO: 39. The BC loop of hSIRPα-mt23 corresponds to amino acids 24-33 of SEQ ID NO: 40. The C'D loop of hSIRPα-mt23 corresponds to amino acids 54-56 of SEQ ID NO: 40. The DE loop of hSIRPα-mt23 corresponds to amino acids 66-73 of SEQ ID NO: 40. The BC loop of hSIRPα-mt31 corresponds to amino acids 24-33 of SEQ ID NO: 41. The C'D loop of hSIRPα-mt31 corresponds to amino acids 54-56 of SEQ ID NO: 41. The DE loop of hSIRPα-mt31 corresponds to amino acids 66-73 of SEQ ID NO: 41. The BC loop of hSIRPα-mt32 corresponds to amino acids 24-33 of SEQ ID NO: 42. The C'D loop of hSIRPα-mt32 corresponds to amino acids 54-56 of SEQ ID NO: 42. The DE loop of hSIRPα-mt32 corresponds to amino acids 66-73 of SEQ ID NO: 42. The BC loop of hSIRPα-mt33 corresponds to amino acids 24-33 of SEQ ID NO: 43. The C'D loop of hSIRPα-mt33 corresponds to amino acids 54-56 of SEQ ID NO: 43. The DE loop of hSIRPα-mt33 corresponds to amino acids 66-73 of SEQ ID NO: 43. The BC loop of hSIRPα-mt34 corresponds to amino acids 24-33 of SEQ ID NO: 44. The C'D loop of hSIRPα-mt34 corresponds to amino acids 54-56 of SEQ ID NO: 44. The DE loop of hSIRPα-mt34 corresponds to amino acids 66-73 of SEQ ID NO: 44. The BC loop of hSIRPα-mt35 corresponds to amino acids 24-33 of SEQ ID NO: 45. The C'D loop of hSIRPα-mt35 corresponds to amino acids 54-56 of SEQ ID NO: 45. The DE loop of hSIRPα-mt35 corresponds to amino acids 66-73 of SEQ ID NO: 45. A selected 10-amino acid peptide ("HCTVTSLIPV"; SEQ ID NO: 59) of the BC loop is encoded by a nucleic acid sequence shown as "CACTGCACTGTGACCTCCCTGATCCCTGTG" (SEQ ID NO: 60). A selected 3-amino acid peptide ("EGH") of the C'D loop is encoded by a nucleic acid sequence shown as "GAAGGCCAC." A selected 8-amino acid peptide ("STKRENMD"; SEQ ID NO: 61) of the BC loop is encoded by a nucleic acid sequence shown as "TCCACAAAGAGAGAAAACATGGAC" (SEQ ID NO: 62).

FIG. 7 shows the purification results of hSIRPα-Fc mutant proteins by HPLC-SEC.

FIG. 8 shows the binding affinity results of hSIRPα-Fc mutant proteins to CD47-ECD-His by an Octet® system.

Figure 9A:
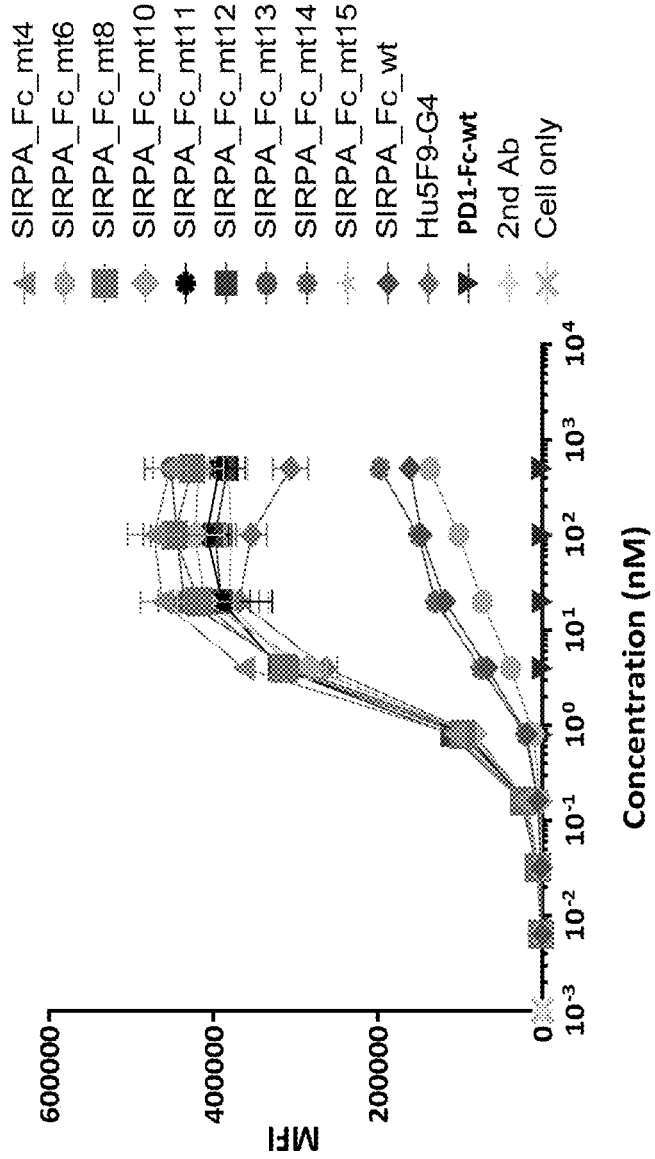
Figure 9B:
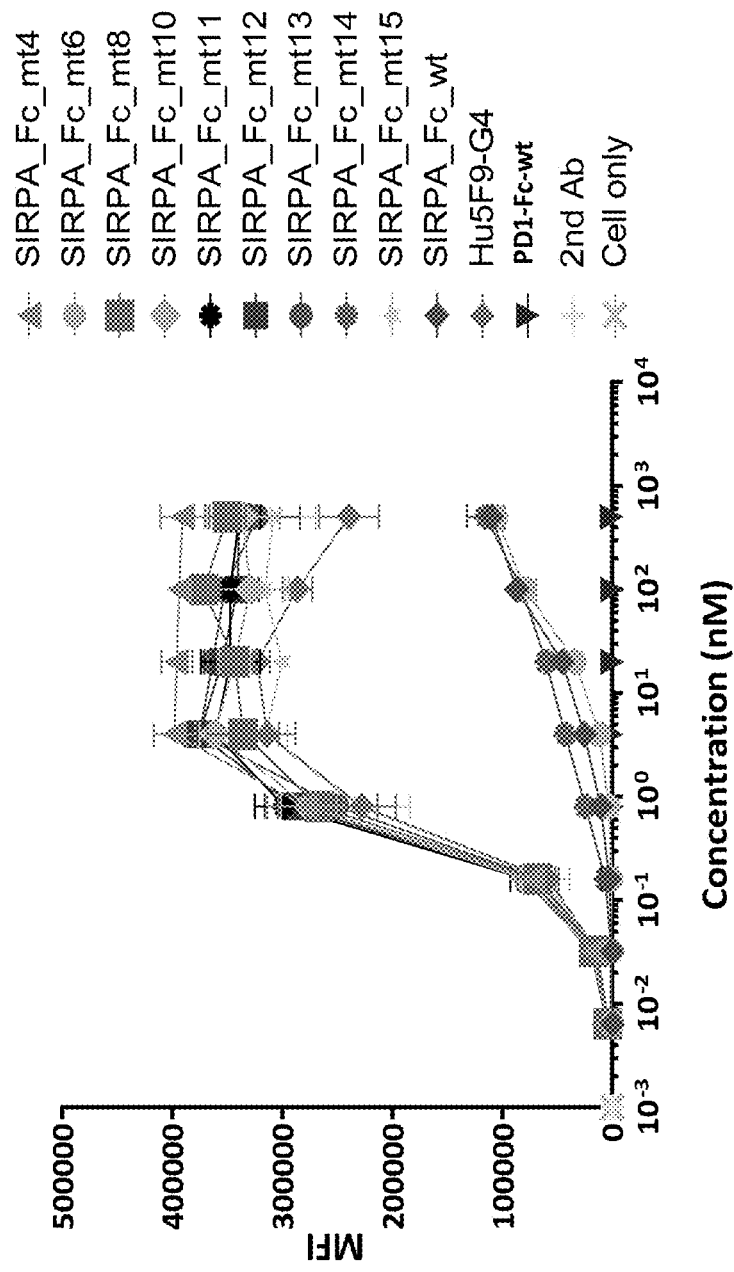
Figure 9C:
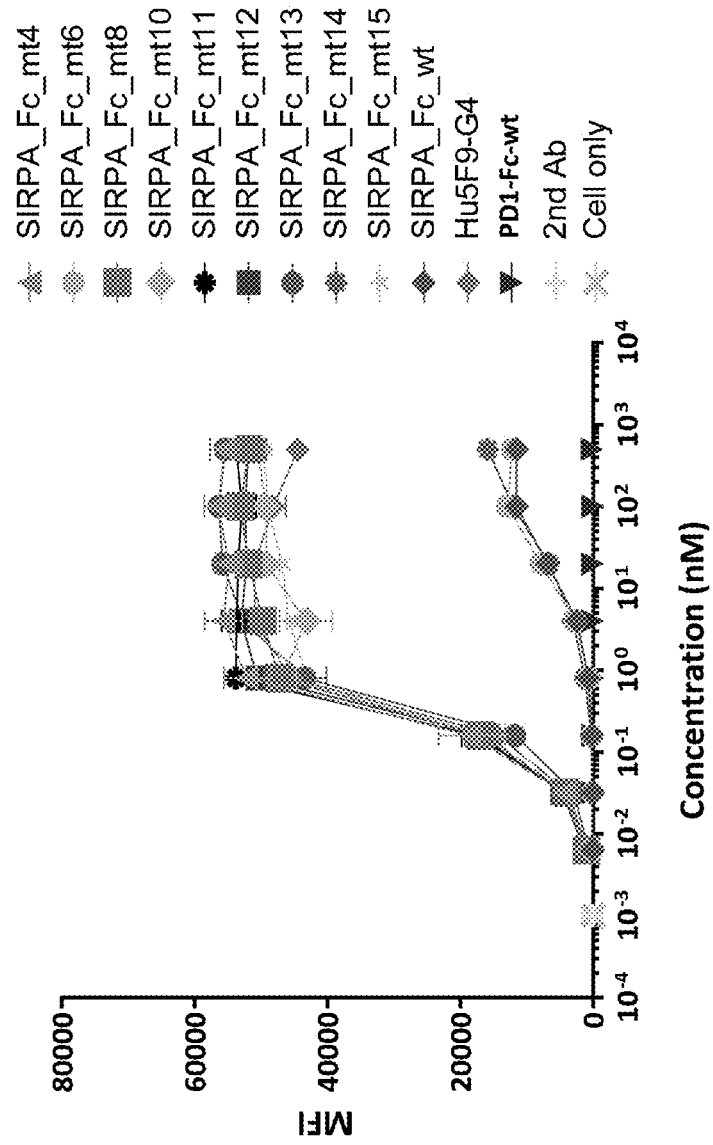

FIGS. 9A-9C show whole cell binding results of hSIRPα-Fc mutant proteins to CD47 transfected CHO-S cells, Jurkat cells, and Raji cells, respectively.

Figure 9D:
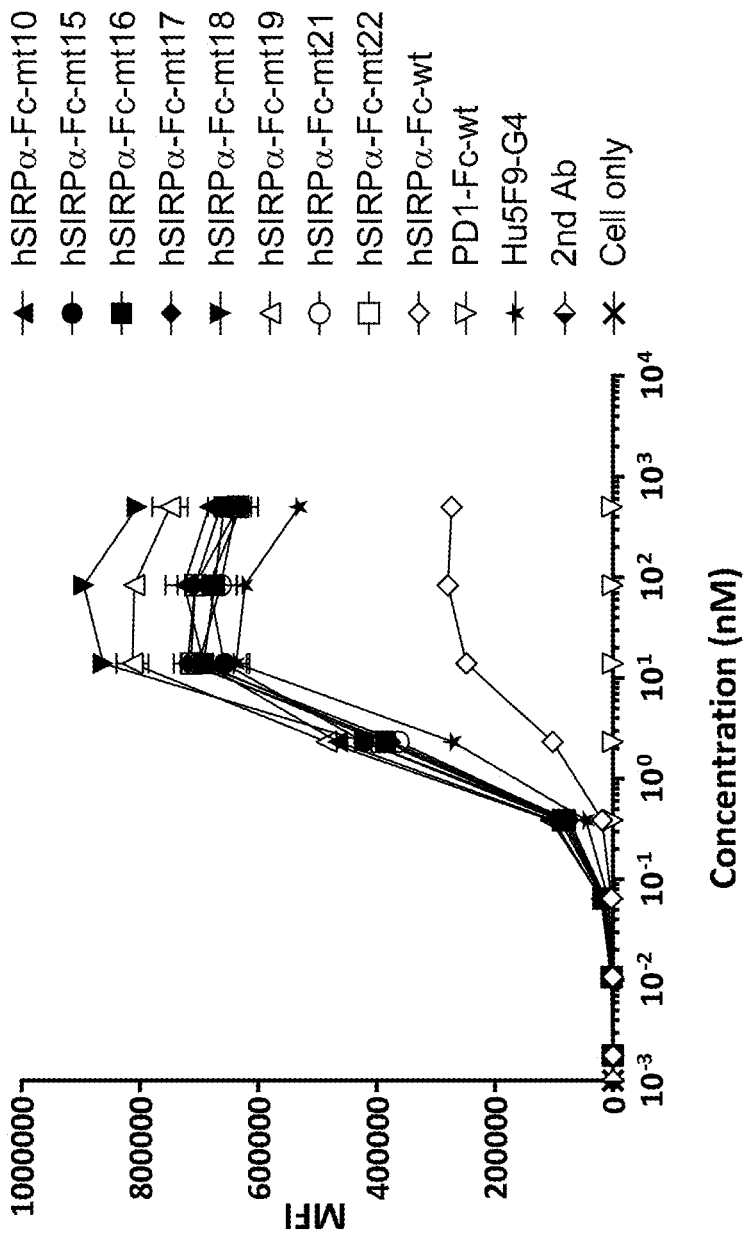
Figure 9E:
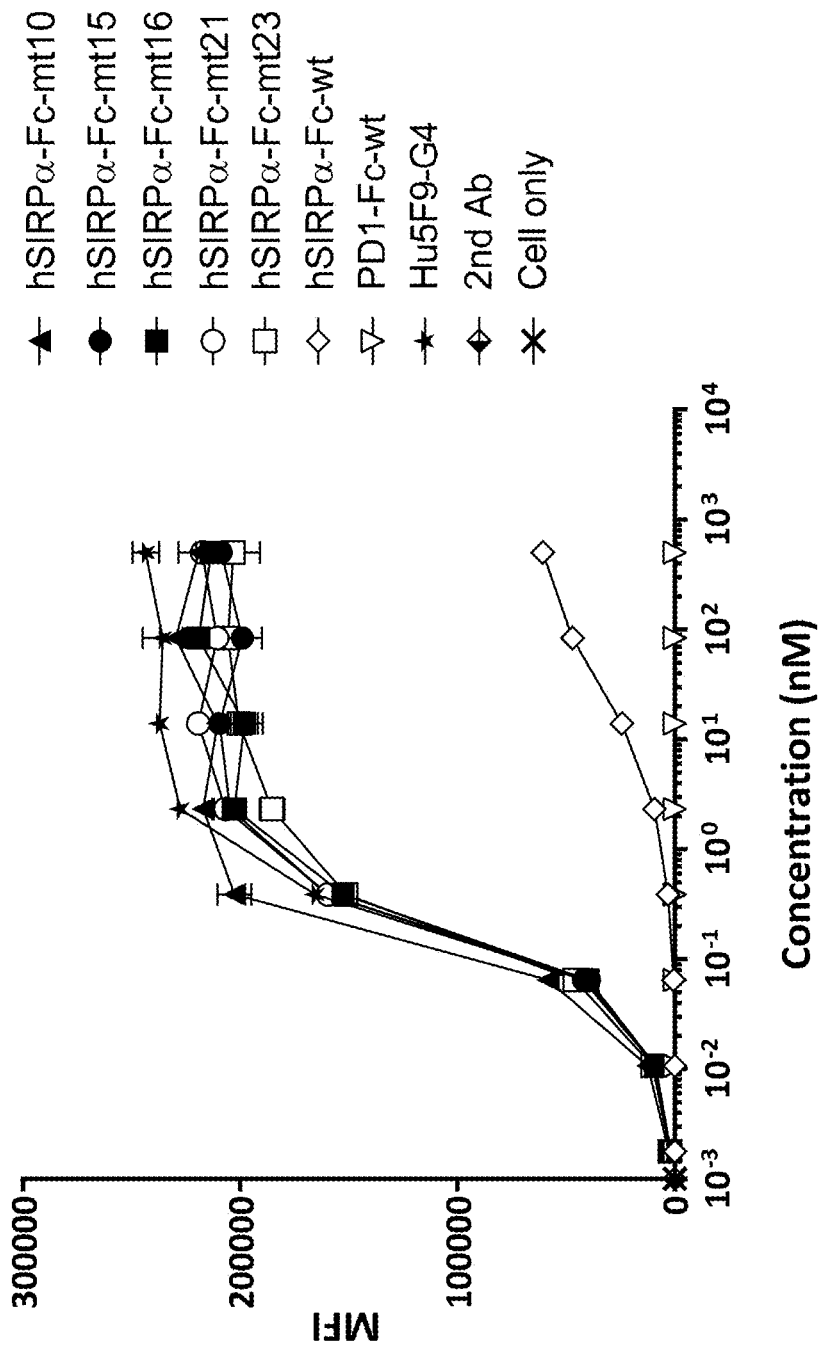

FIGS. 9D-9E show whole cell binding results of hSIRPα-Fc mutant proteins to CD47 tf CHO-S and Raji cells, respectively.

FIGS. 10A-10D show RBC binding results of hSIRPα-Fc mutant proteins. Human red blood cells were collected from two donors.

FIGS. 11A-11D show platelet binding results of hSIRPα-Fc mutant proteins. Human platelets were collected from two donors.

Figure 12A:
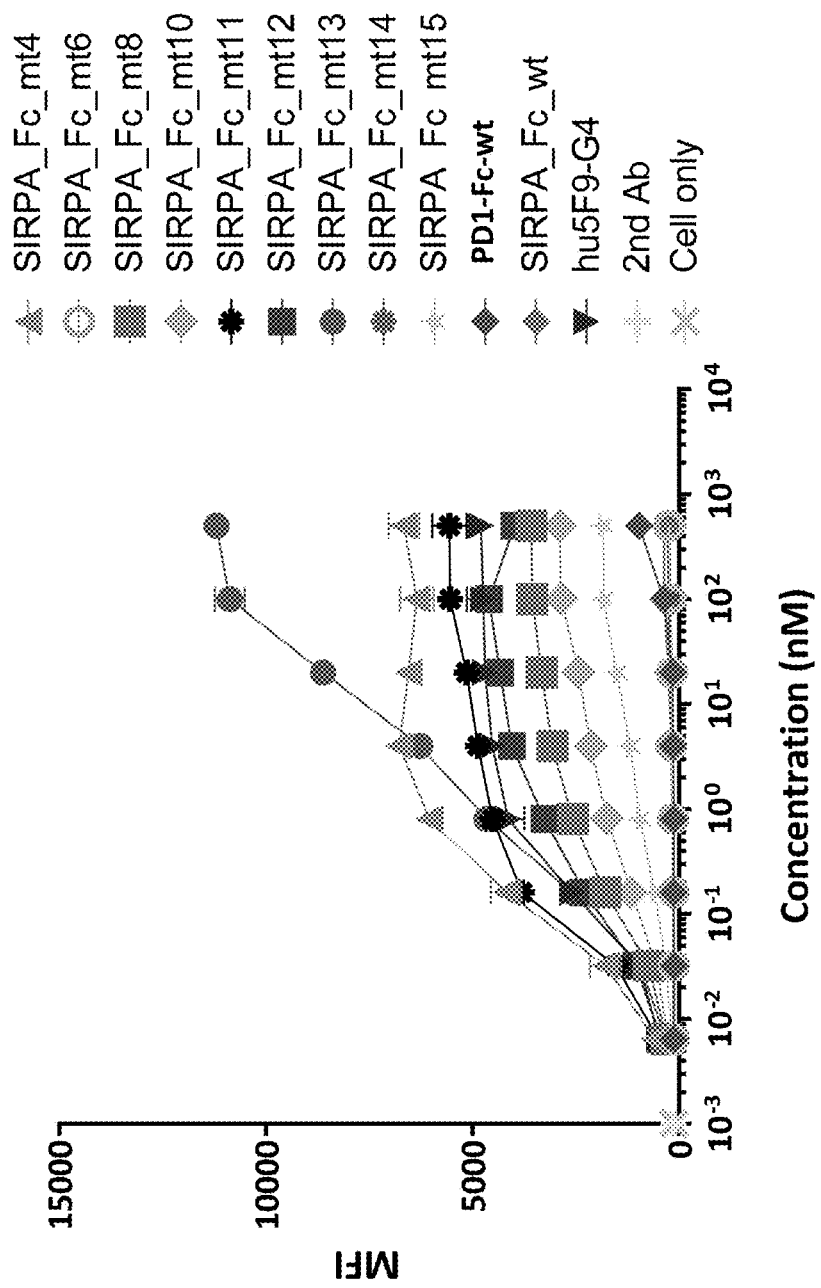
Figure 12B:
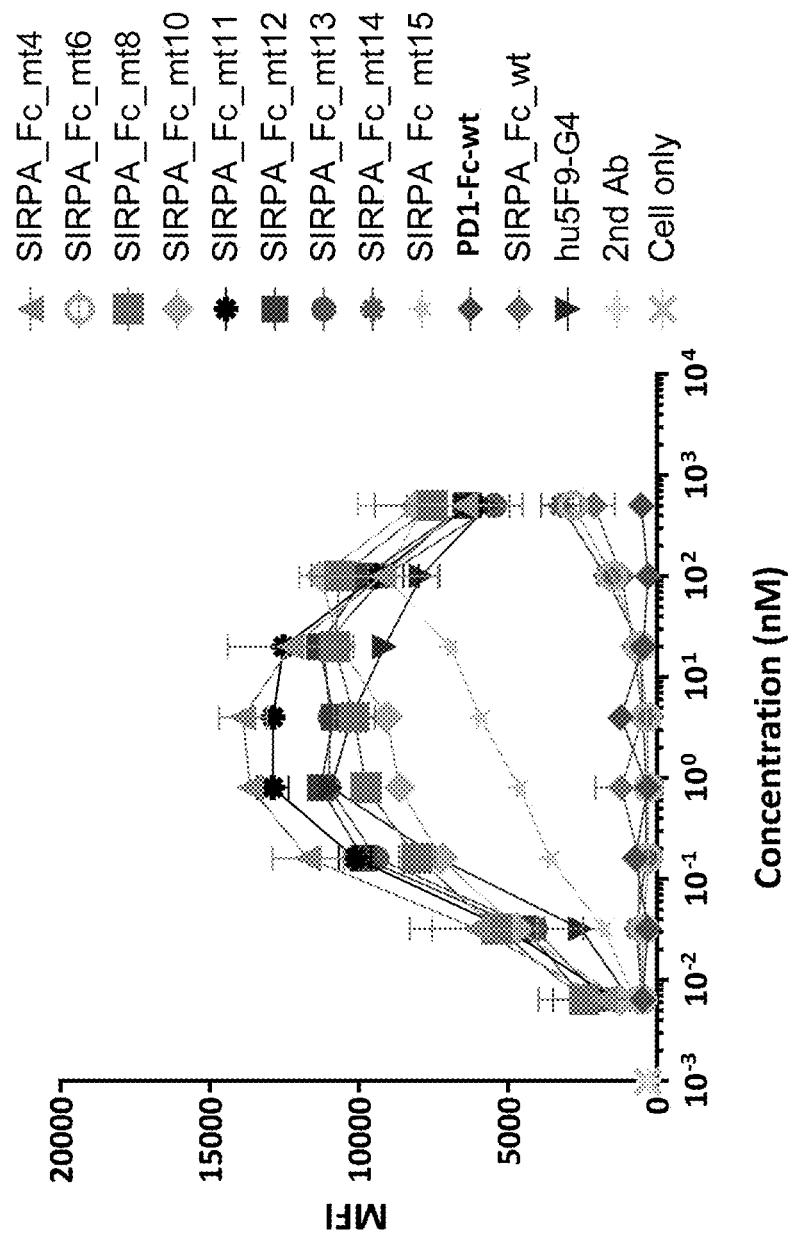
Figure 12C:
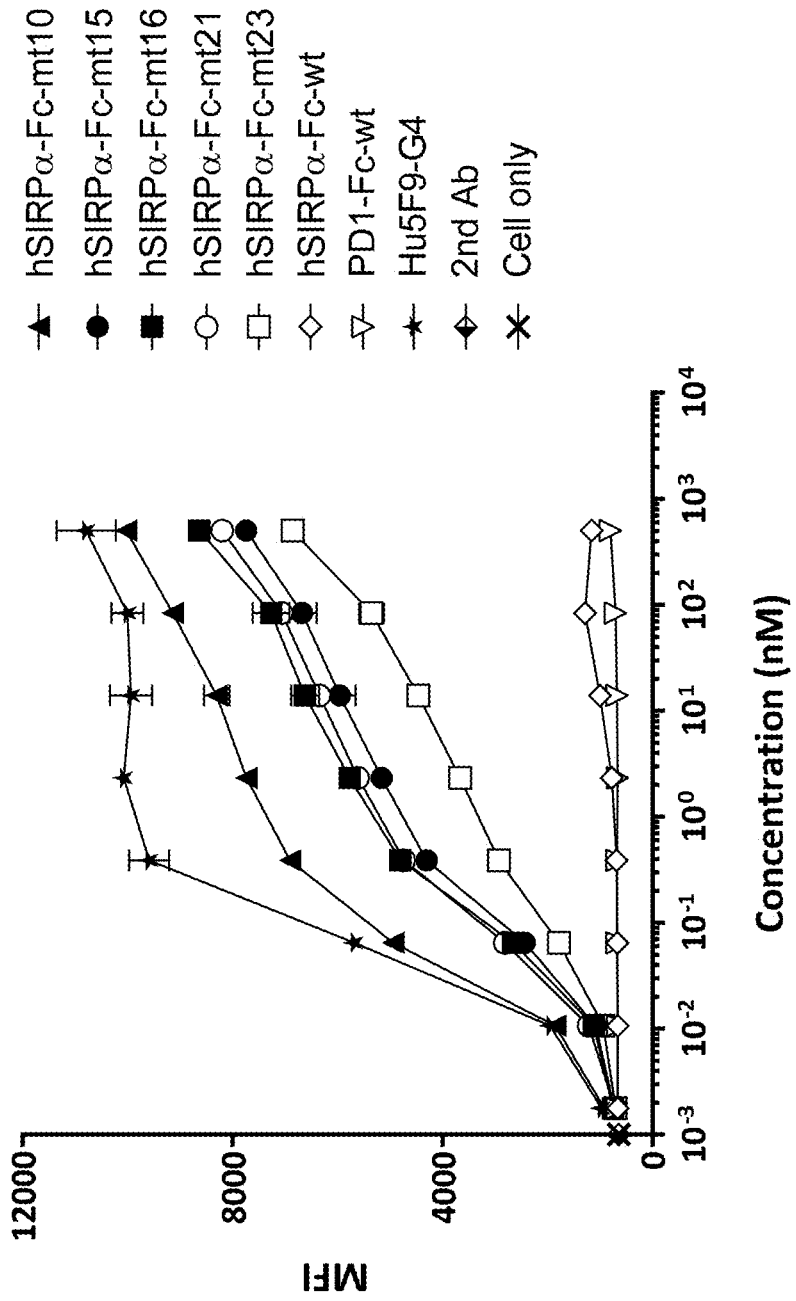

FIGS. 12A-12C show whole cell binding results of hSIRPα-Fc mutant proteins to cynoCD47 tf CHO-S cells or LLC-MK2 cells.

Figure 13A:
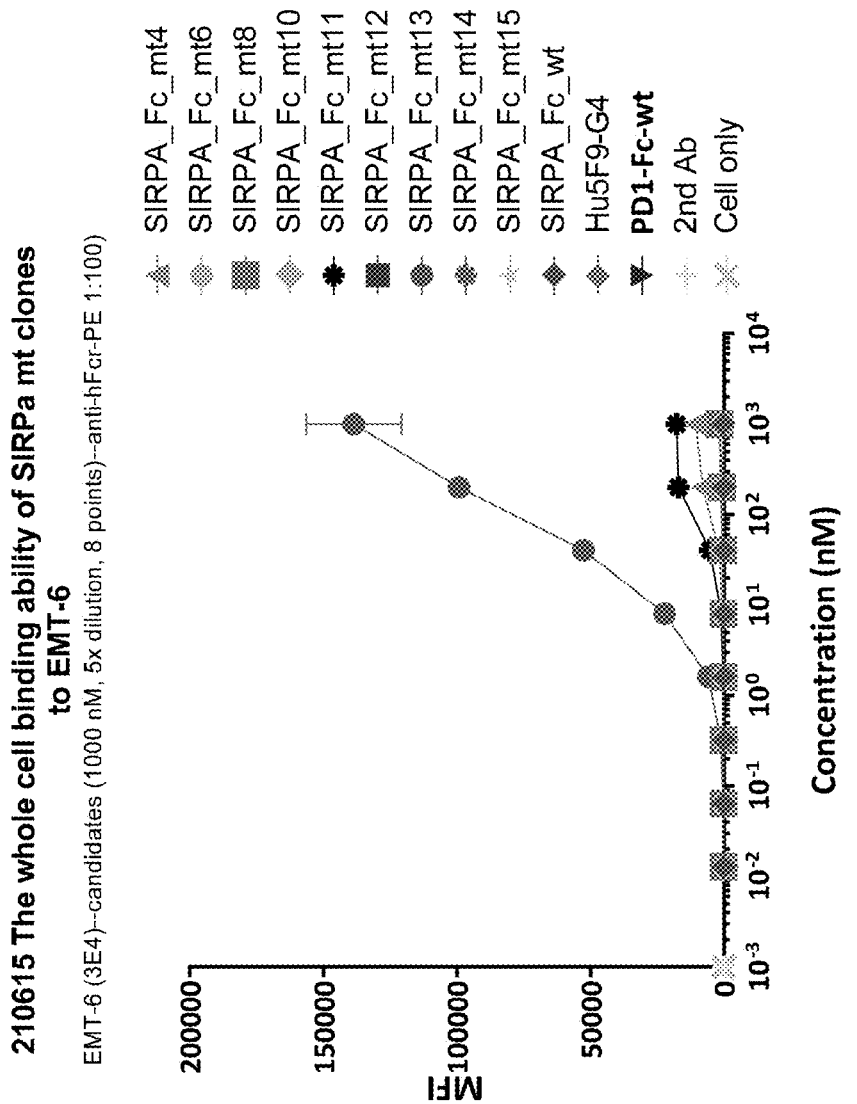

FIG. 13A shows whole cell binding results of hSIRPα-Fc mutant proteins to EMT-6 cells.

Figure 13B:
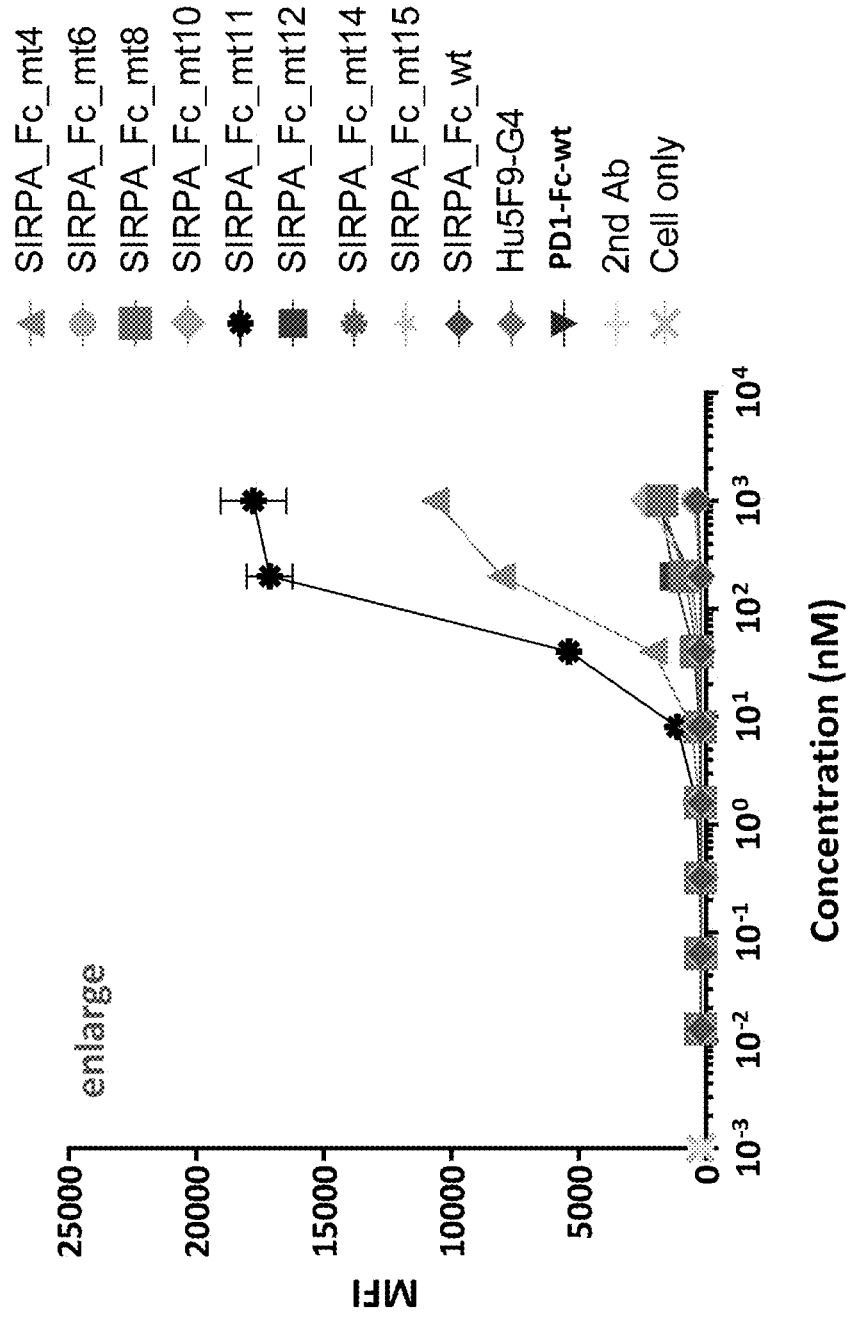

FIG. 13B is an enlarged figure of FIG. 13A in a low MFI range.

Figures 14A, 14B:
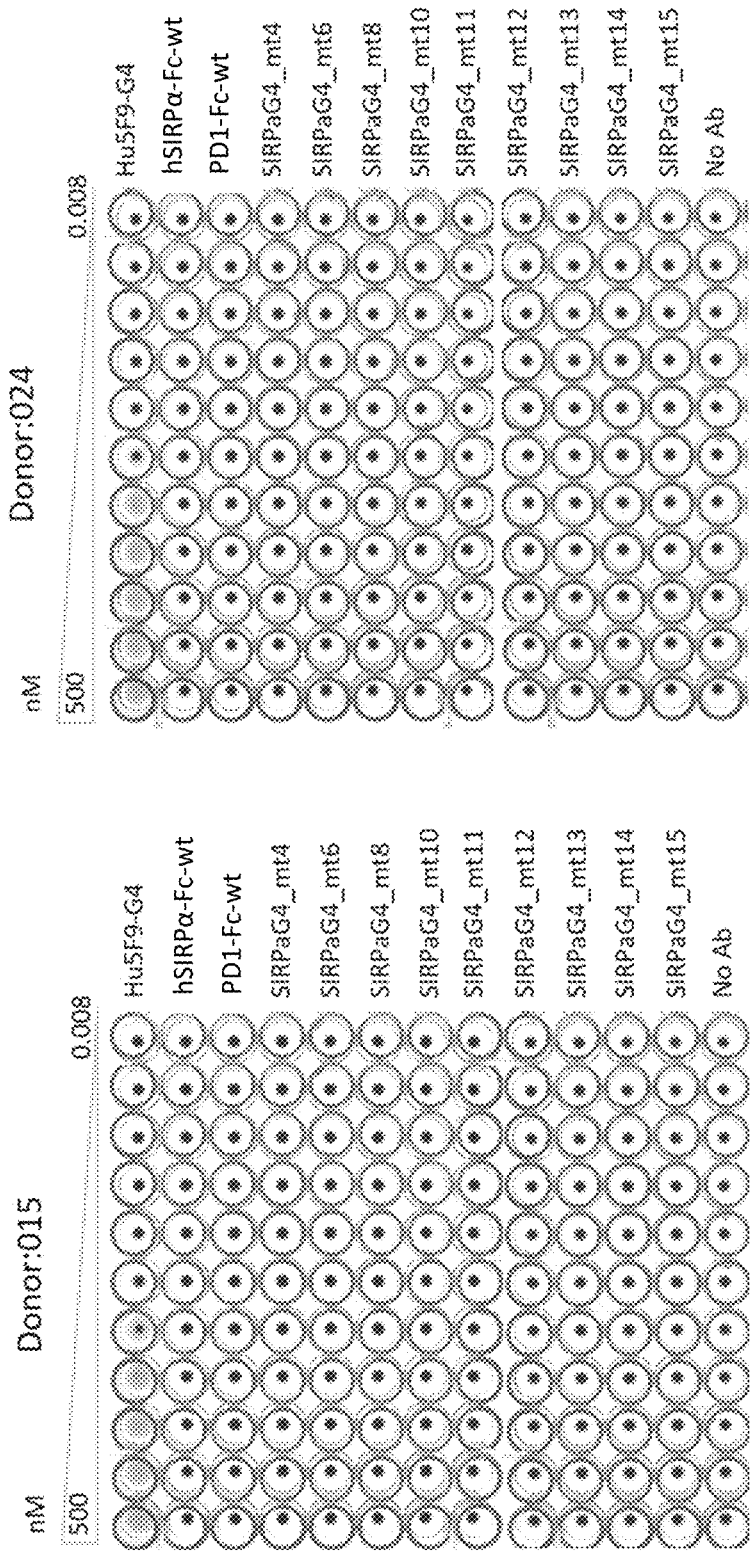
Figure 14C:
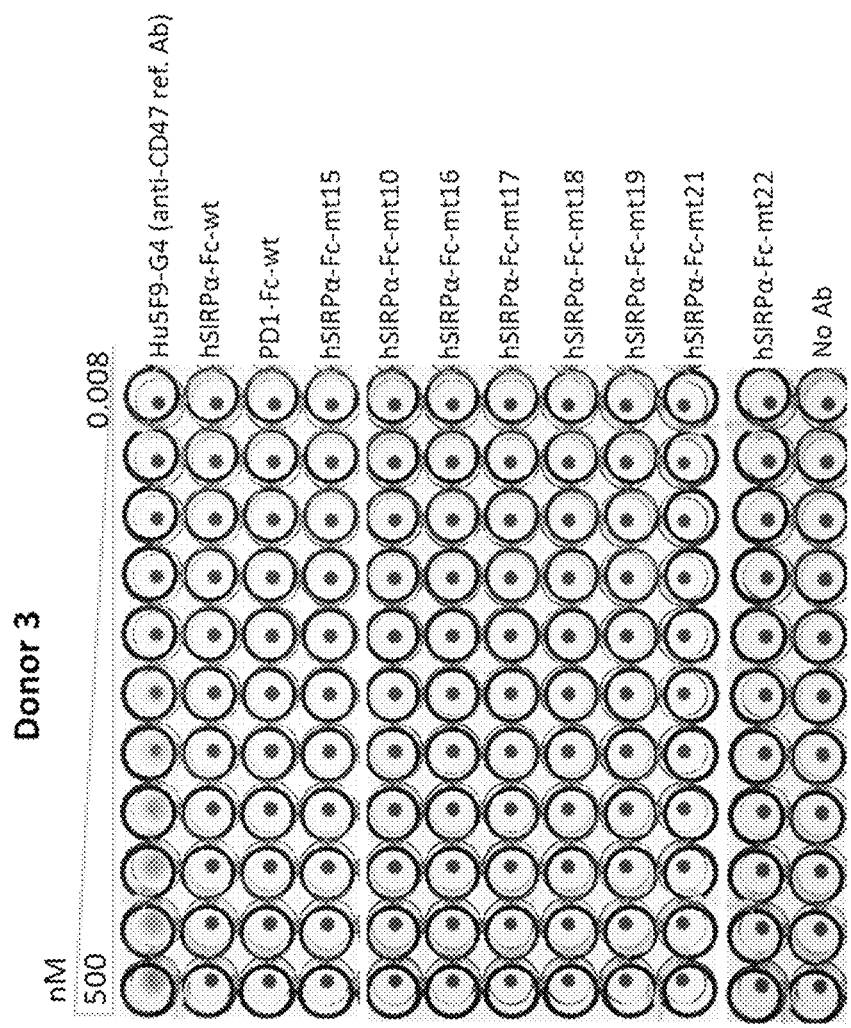

FIGS. 14A-14C show RBC hemagglutination assay results using hSIRPα-Fc mutant proteins. Human RBC cells were collected from three donors. Hu5F9-G4 was used as a positive control to induce hemagglutination.

Figure 15A:
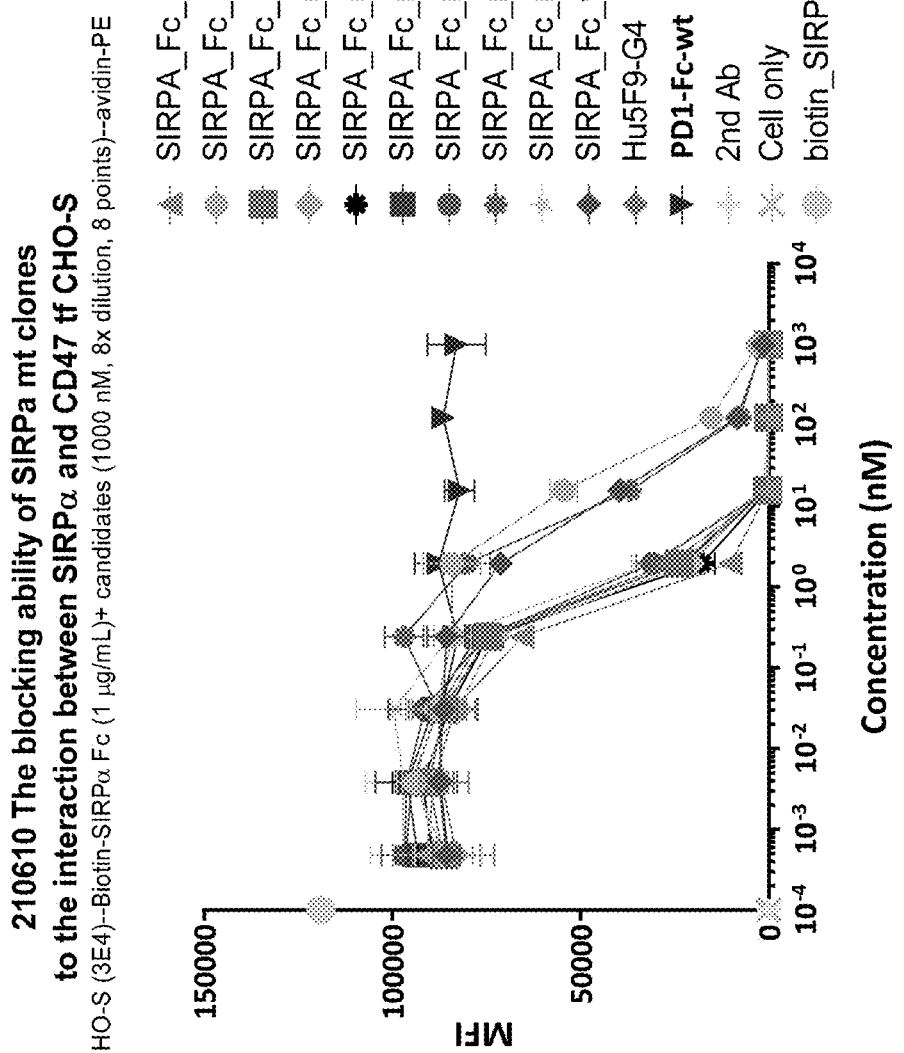
Figure 15B:
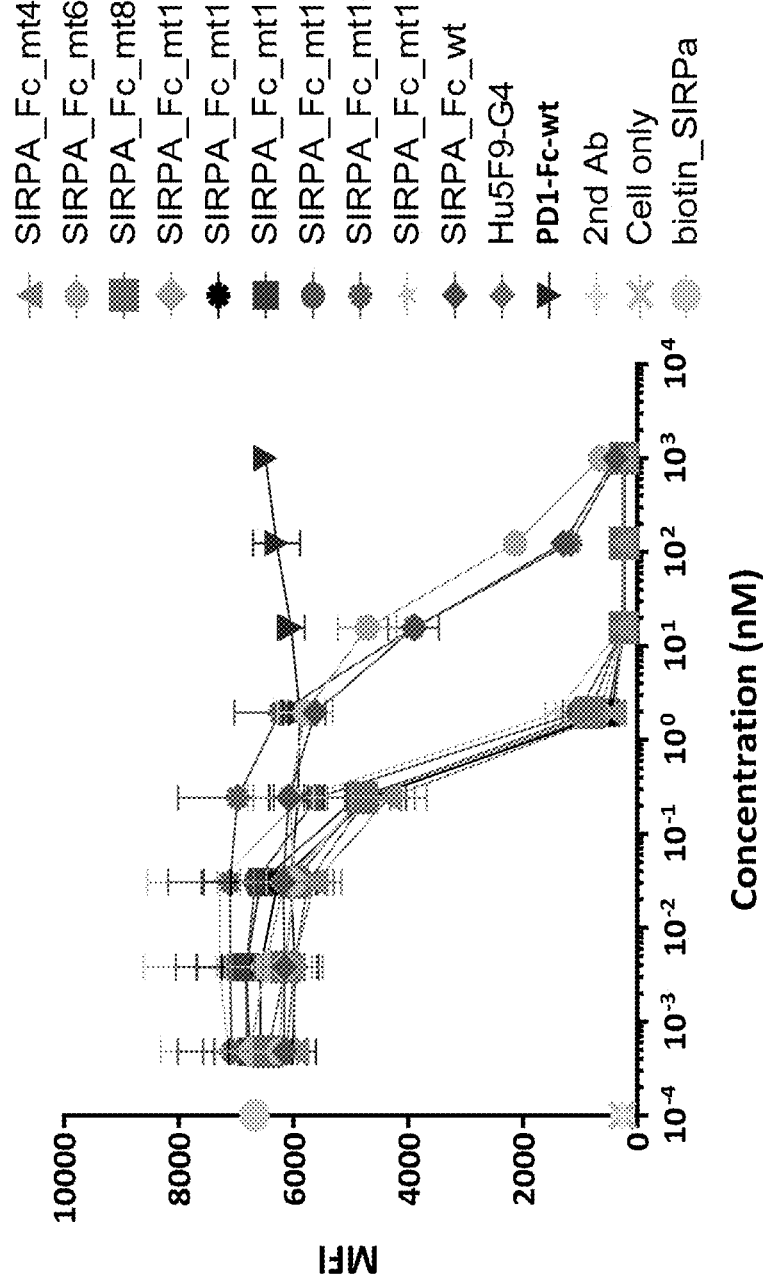
Figure 15C:
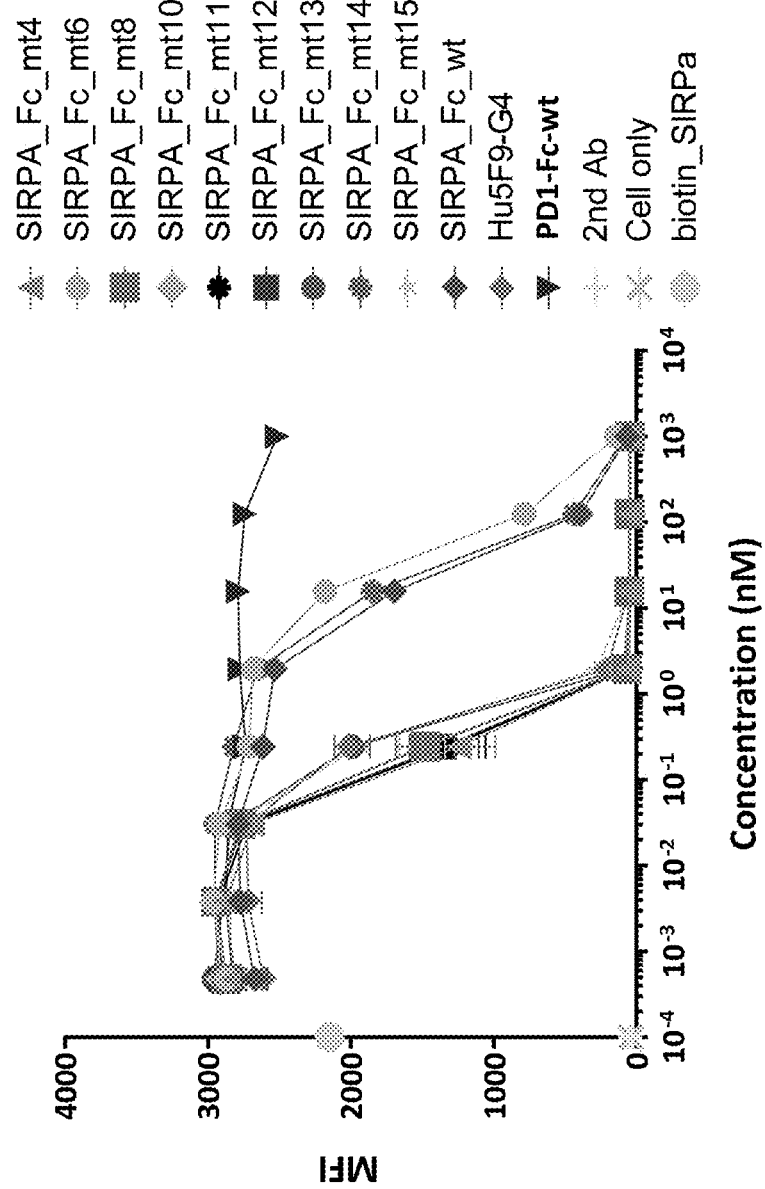

FIGS. 15A-15C show the hCD47/hSIRPα blocking ability of hSIRPα-Fc mutant proteins using CD47 tf CHO-S cells, FaDu cells, and Raji cells, respectively.

Figure 15D:
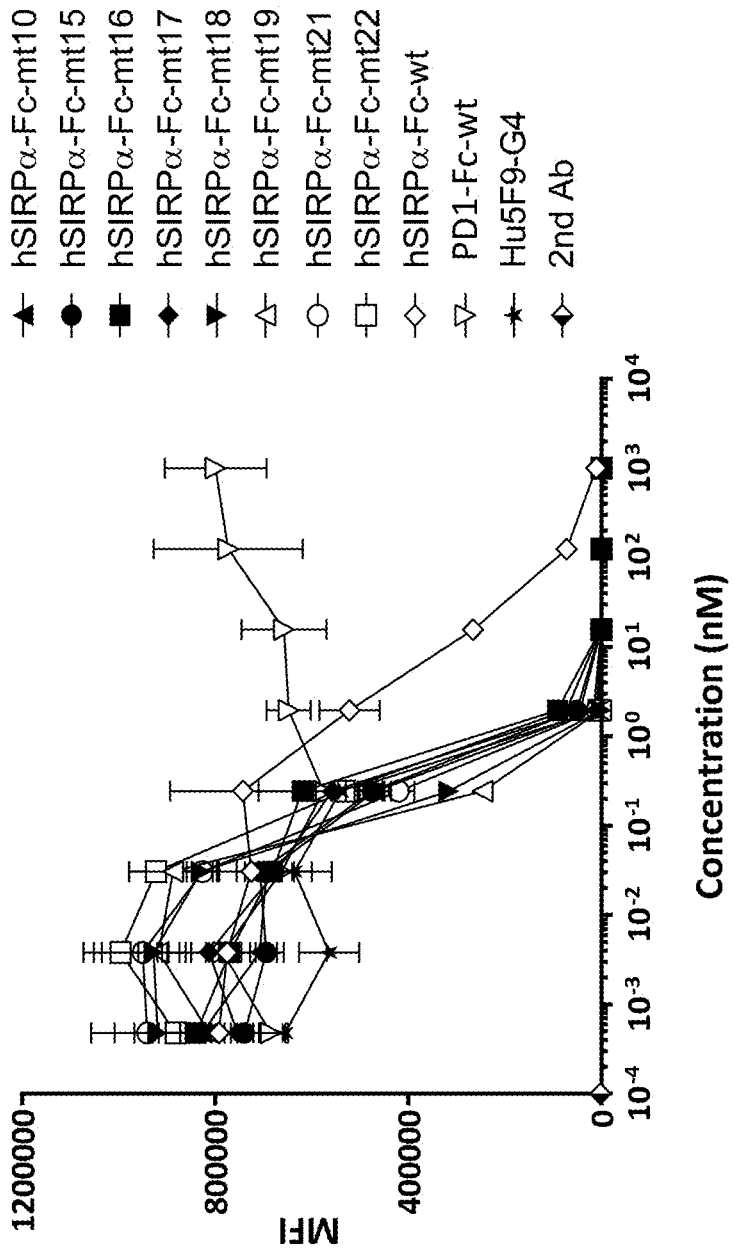
Figure 15E:
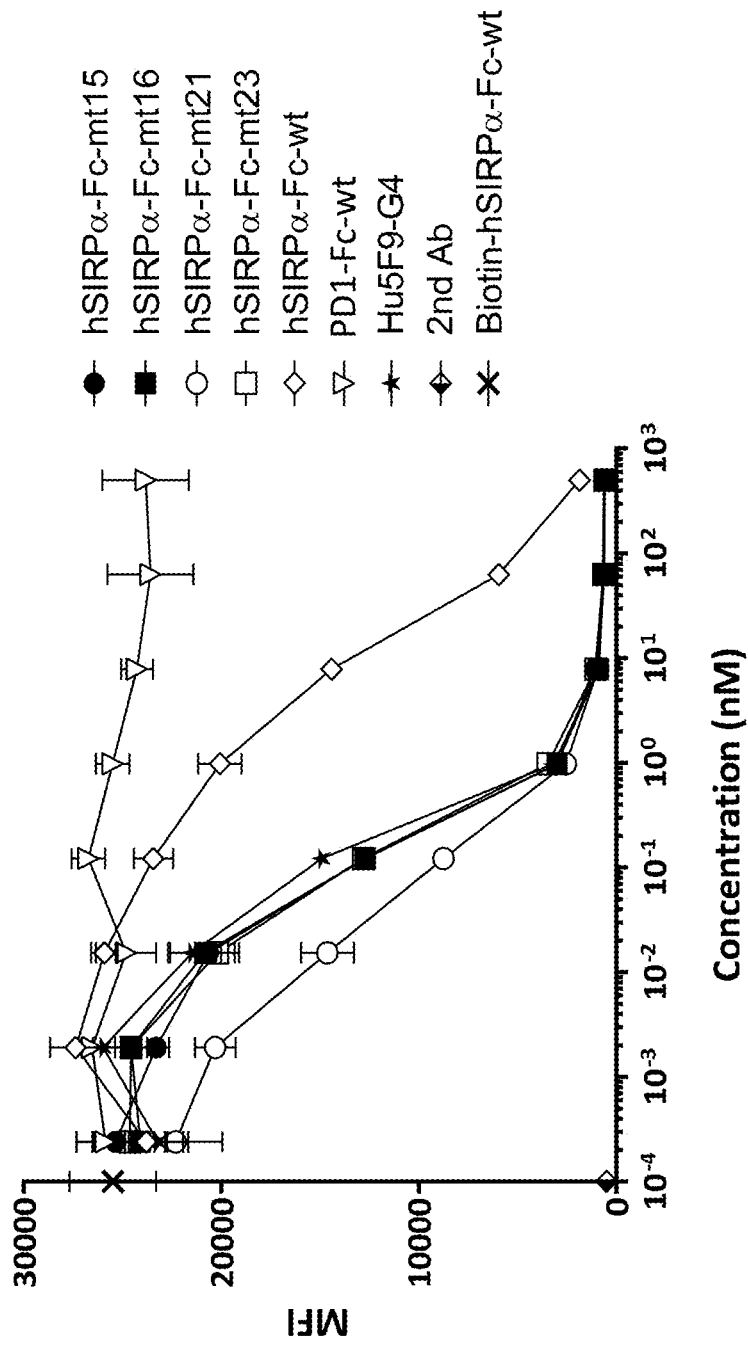

FIGS. 15D-15E show the hCD47/hSIRPα blocking ability of hSIRPα-Fc mutant proteins using CD47 tf CHO-S cells.

Figure 16A:
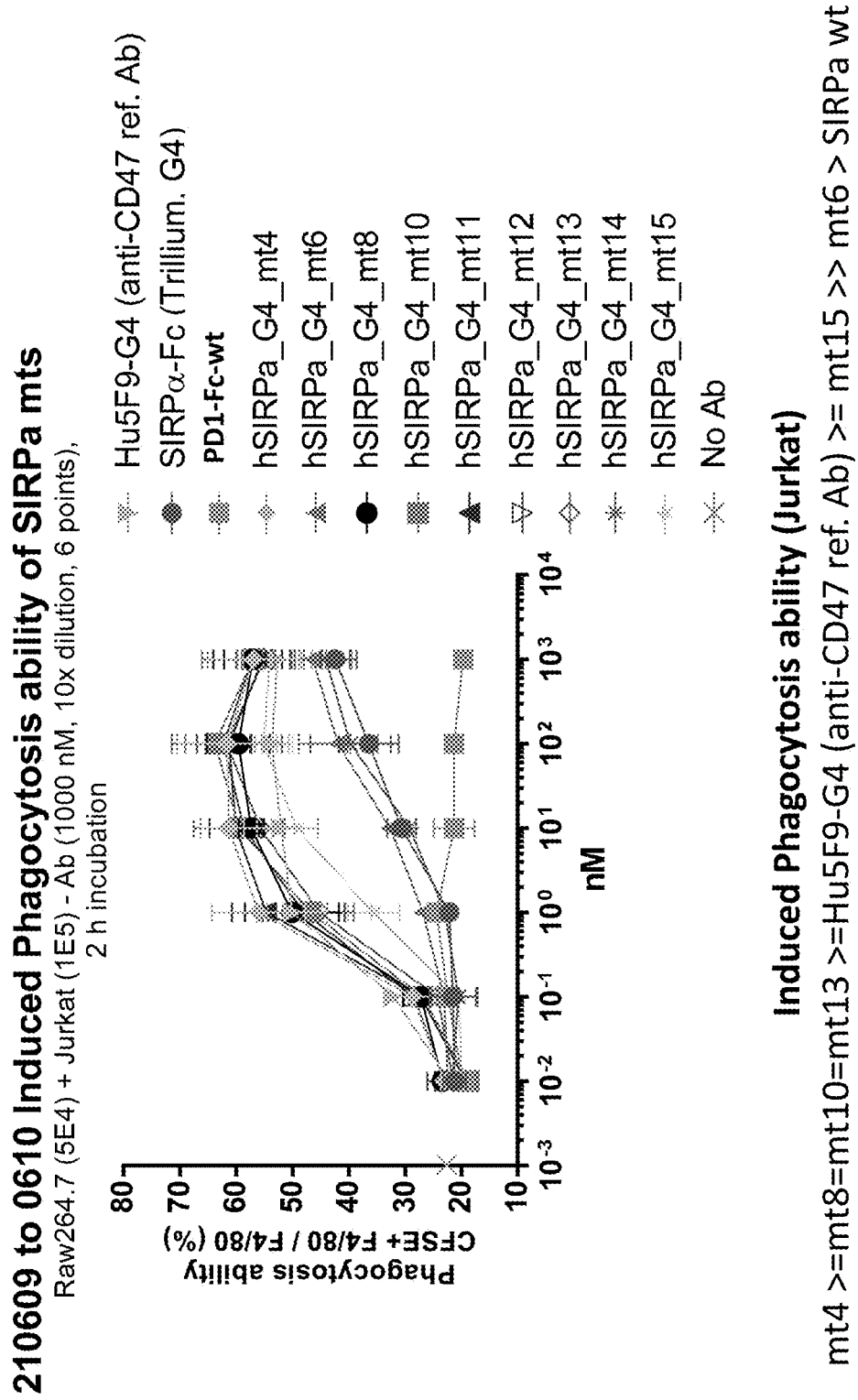
Figure 16B:
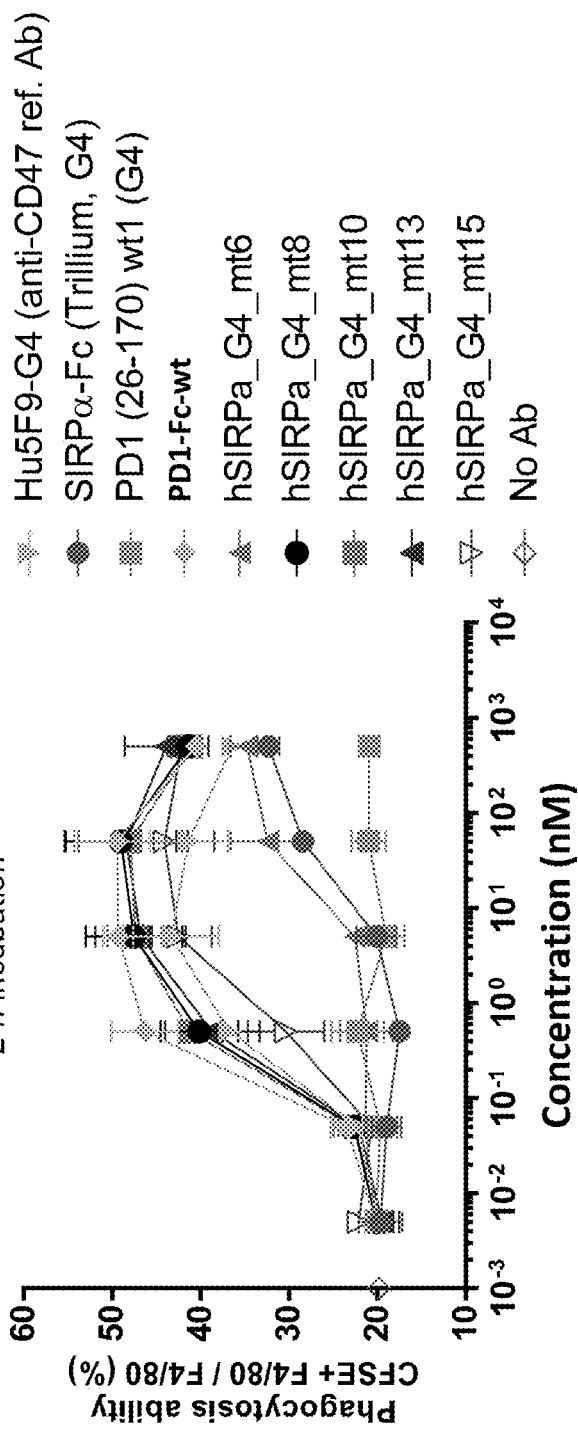
Figure 16C:
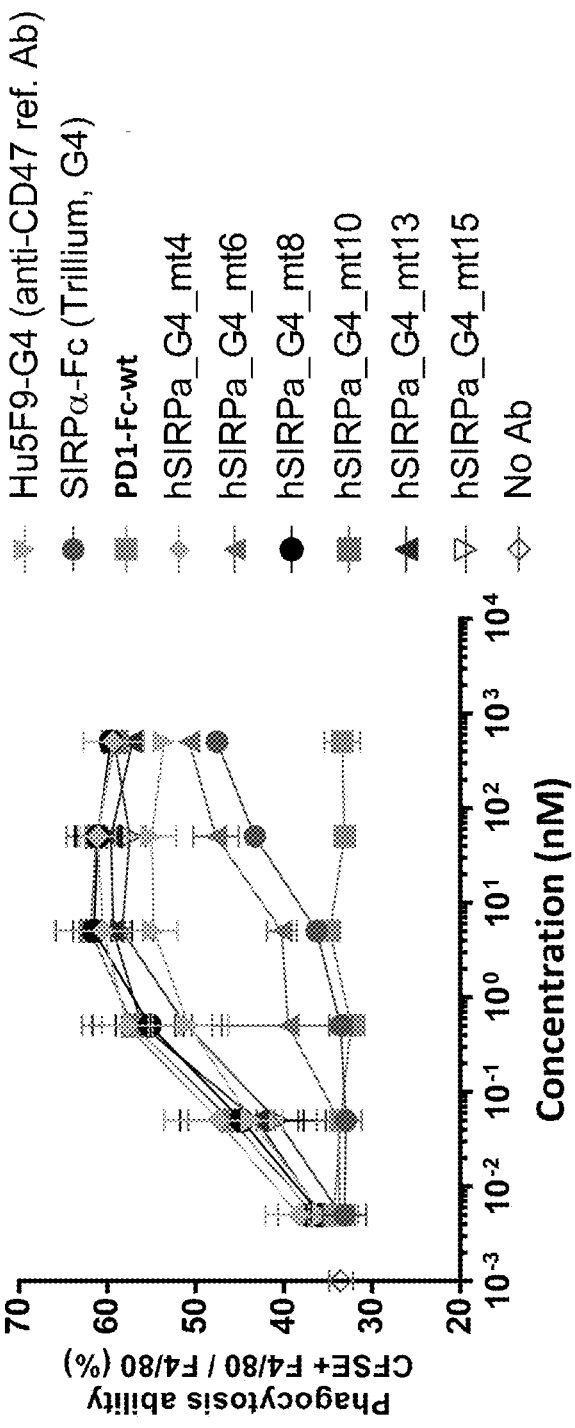

FIGS. 16A-16C show induced phagocytosis ability of hSIRPα-Fc mutant proteins by Raw264.7 mouse macrophages against Jurkat, FaDu, and Raji cells, respectively.

Figure 16D:
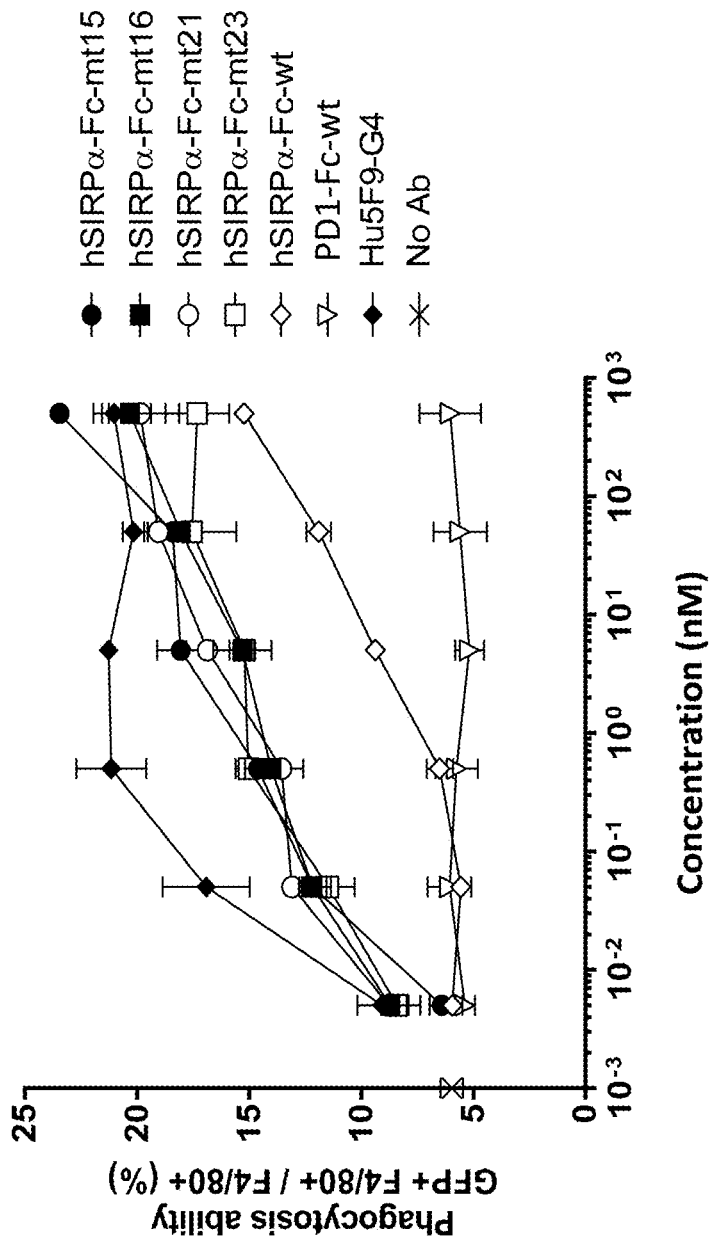
Figure 16E:
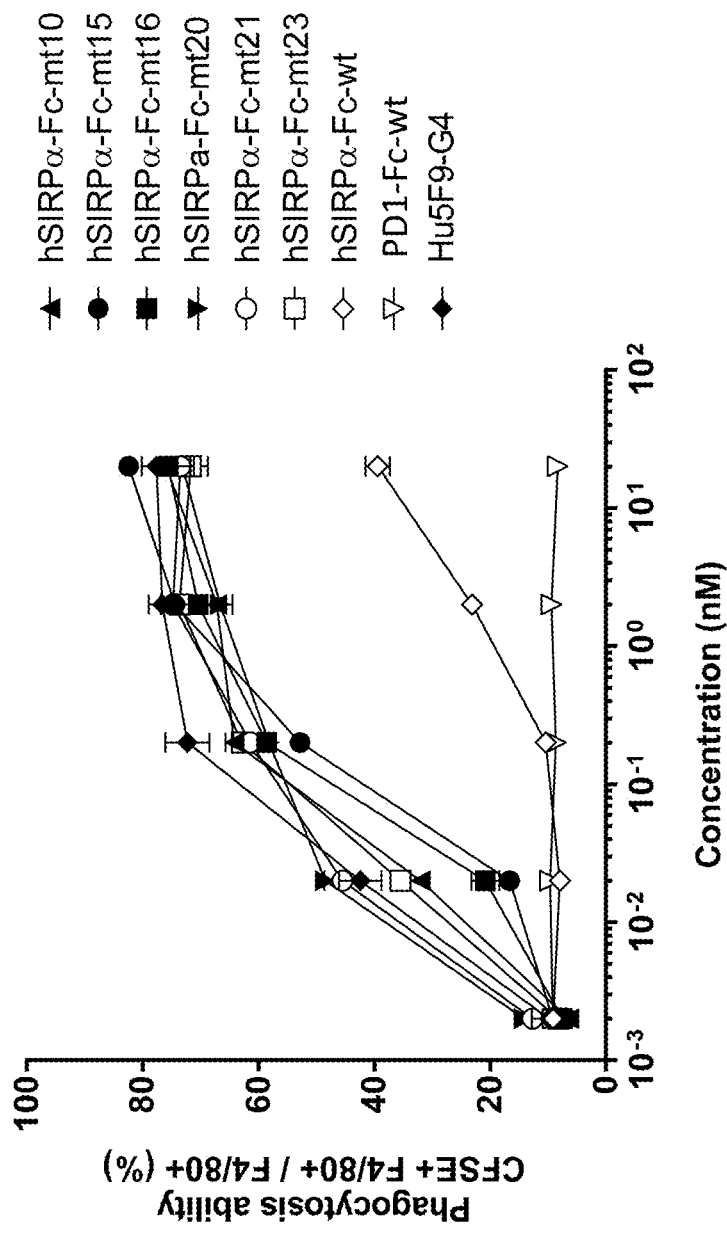

FIGS. 16D-16E show induced phagocytosis ability of hSIRPα-Fc mutant proteins by Raw264.7 mouse macrophages against DLD1 and Raji cells, respectively.

Figure 17A:
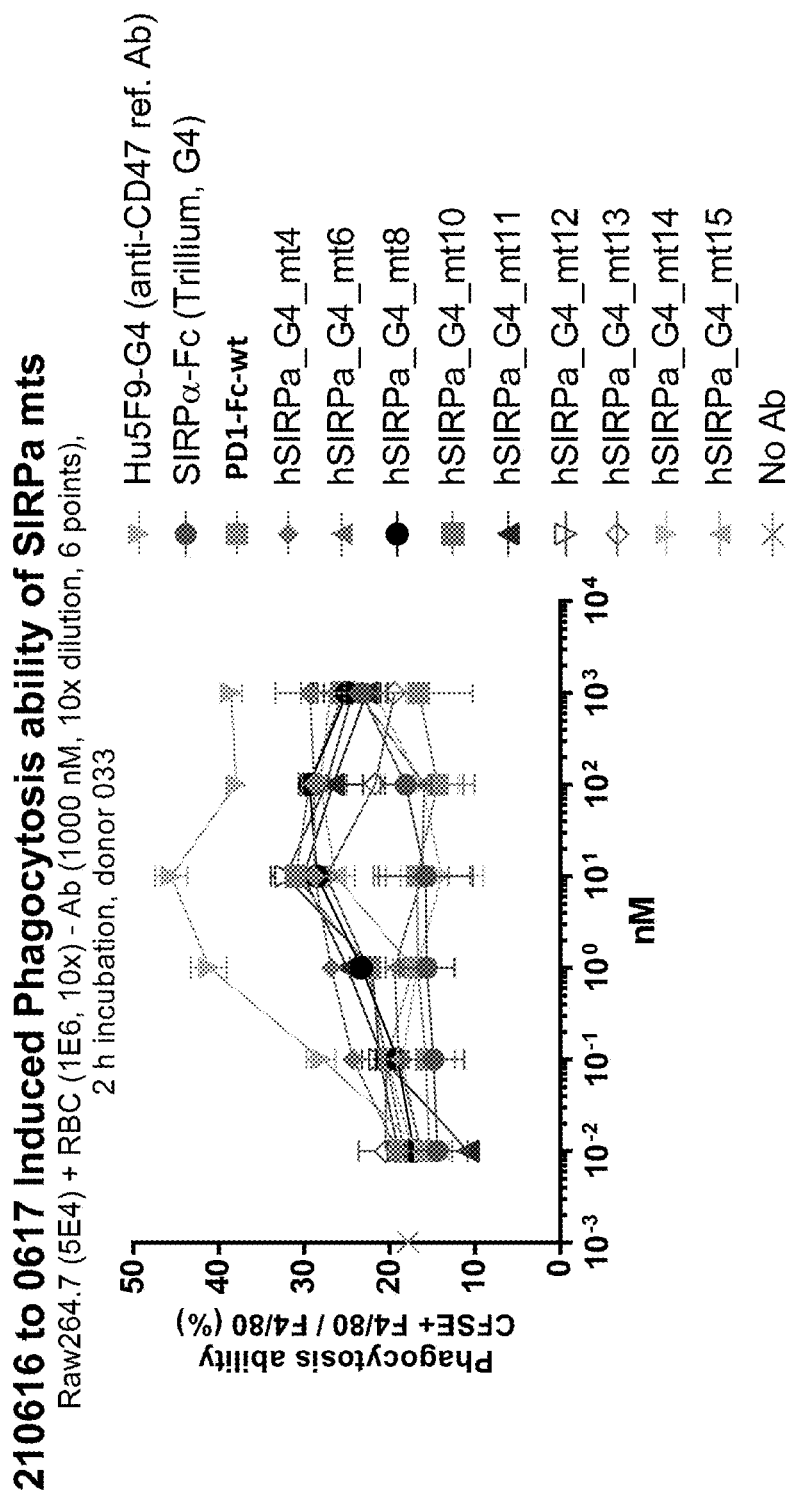

FIG. 17A shows induced phagocytosis ability of hSIRPα-Fc mutant proteins by Raw264.7 mouse macrophages against human RBC cells.

Figure 17B:
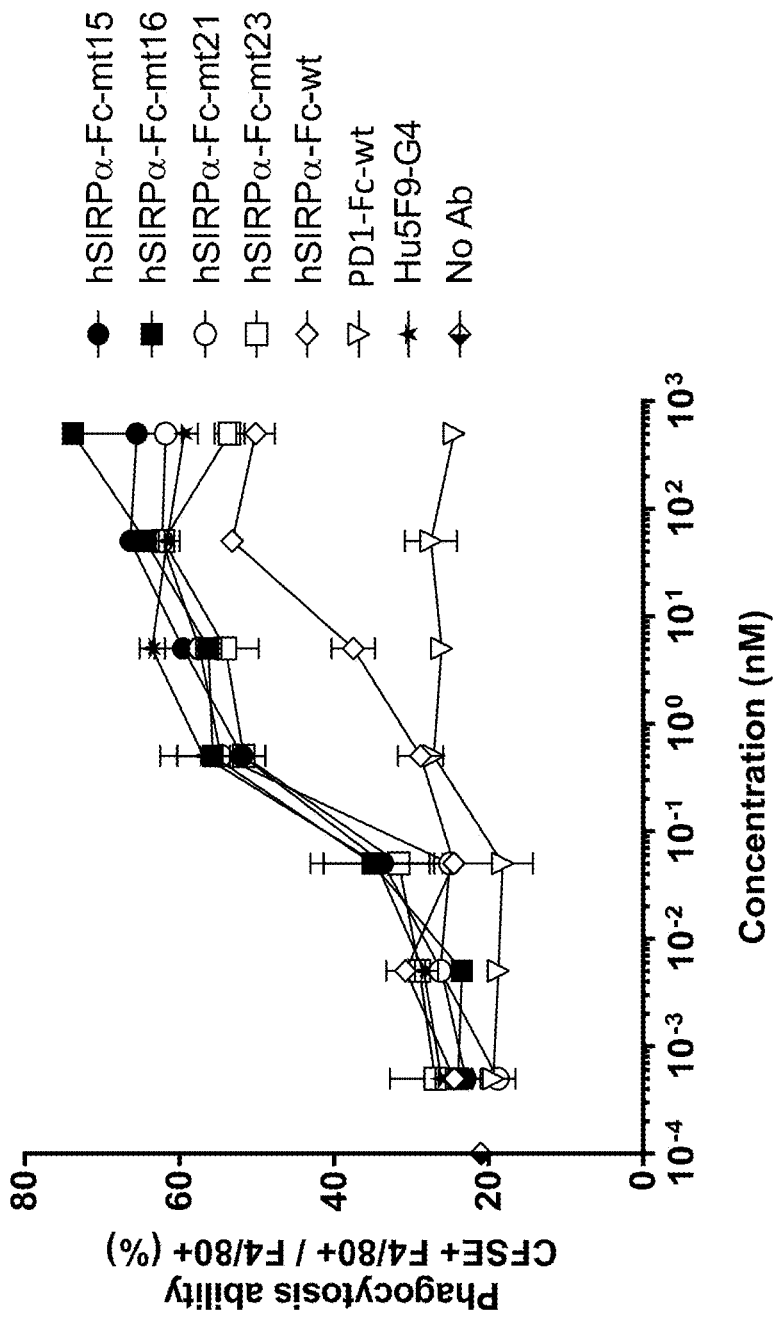

FIG. 17B shows induced phagocytosis ability of hSIRPα-Fc mutant proteins by Raw264.7 mouse macrophages against human platelets.

Figure 18A:
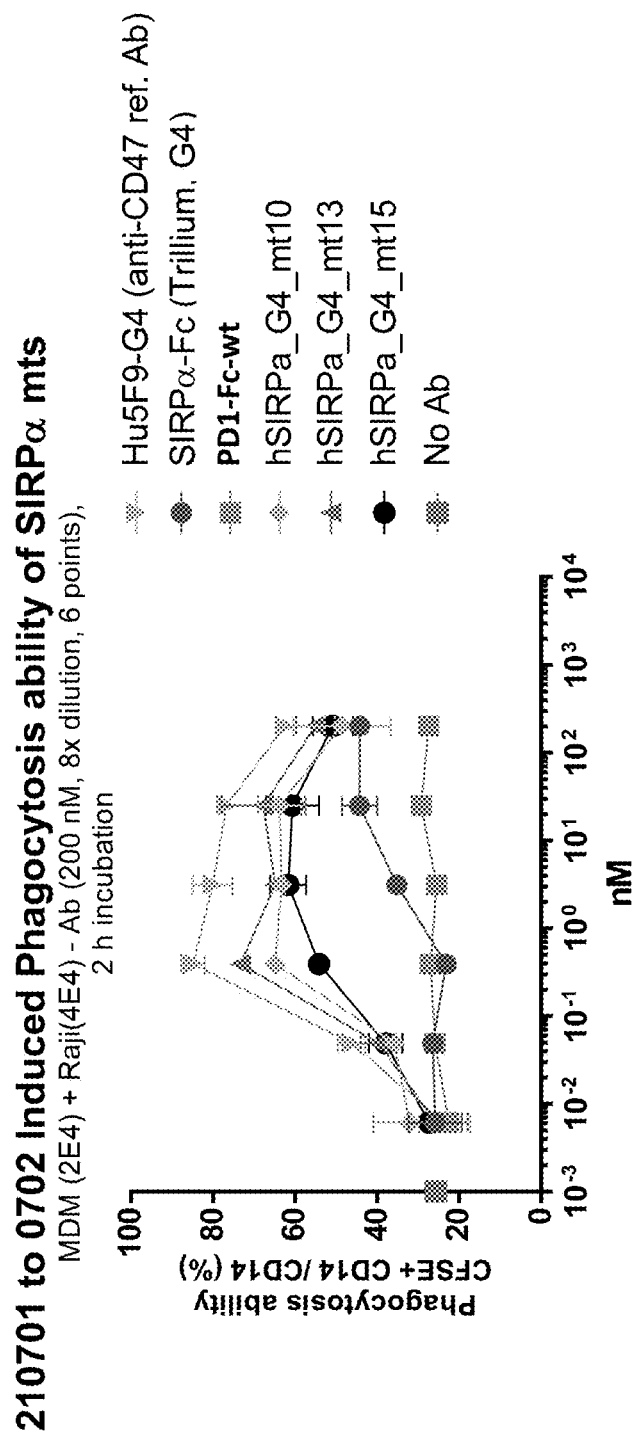
Figure 18B:
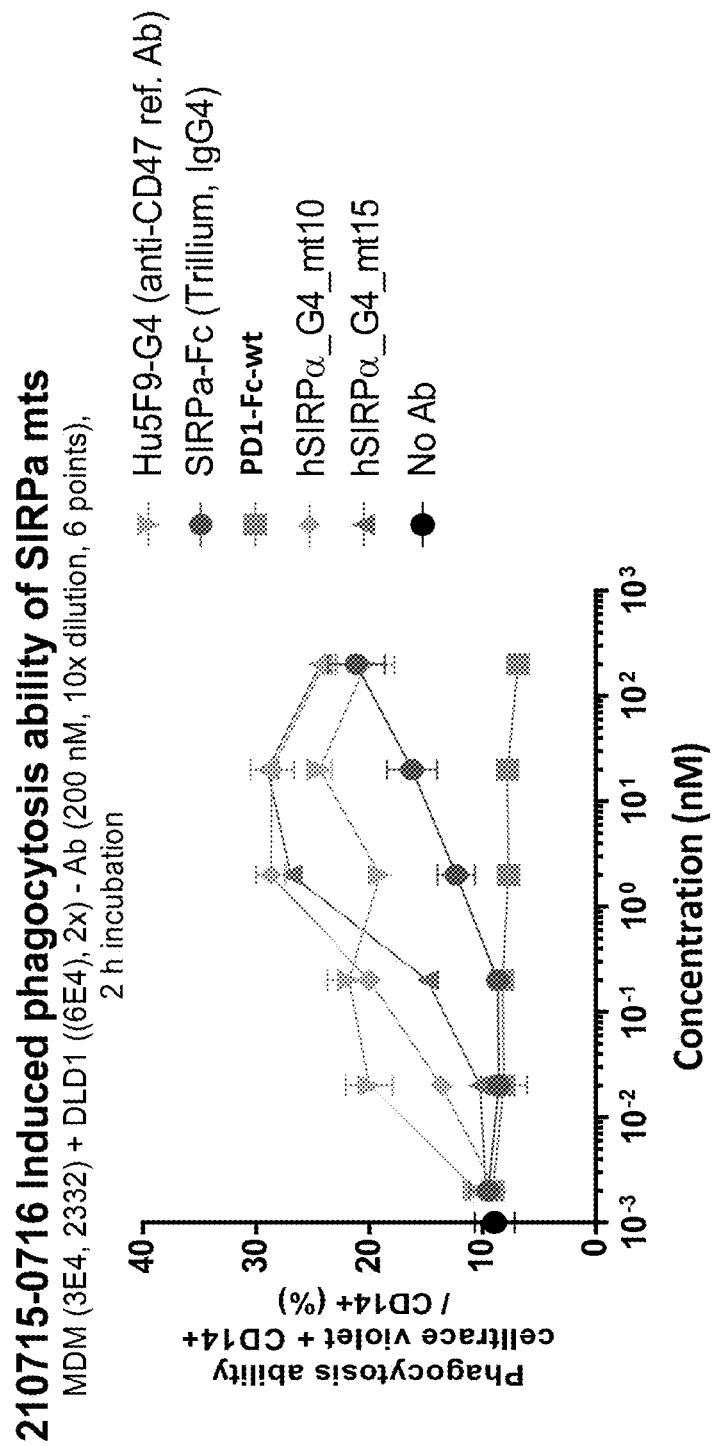
Figure 18C:
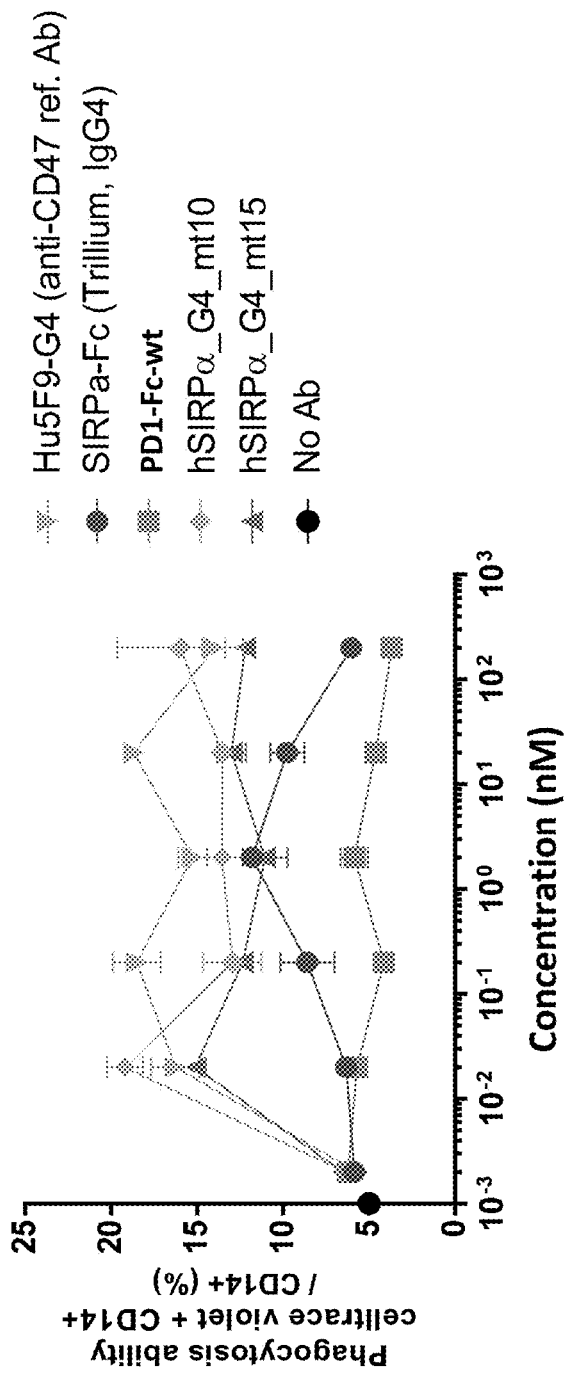

FIGS. 18A-18C show induced phagocytosis ability of hSIRPα-Fc mutant proteins by human monocyte-derived macrophages (MDM) against Raji, DLD1, and Jurkat cells, respectively.

Figure 18D:
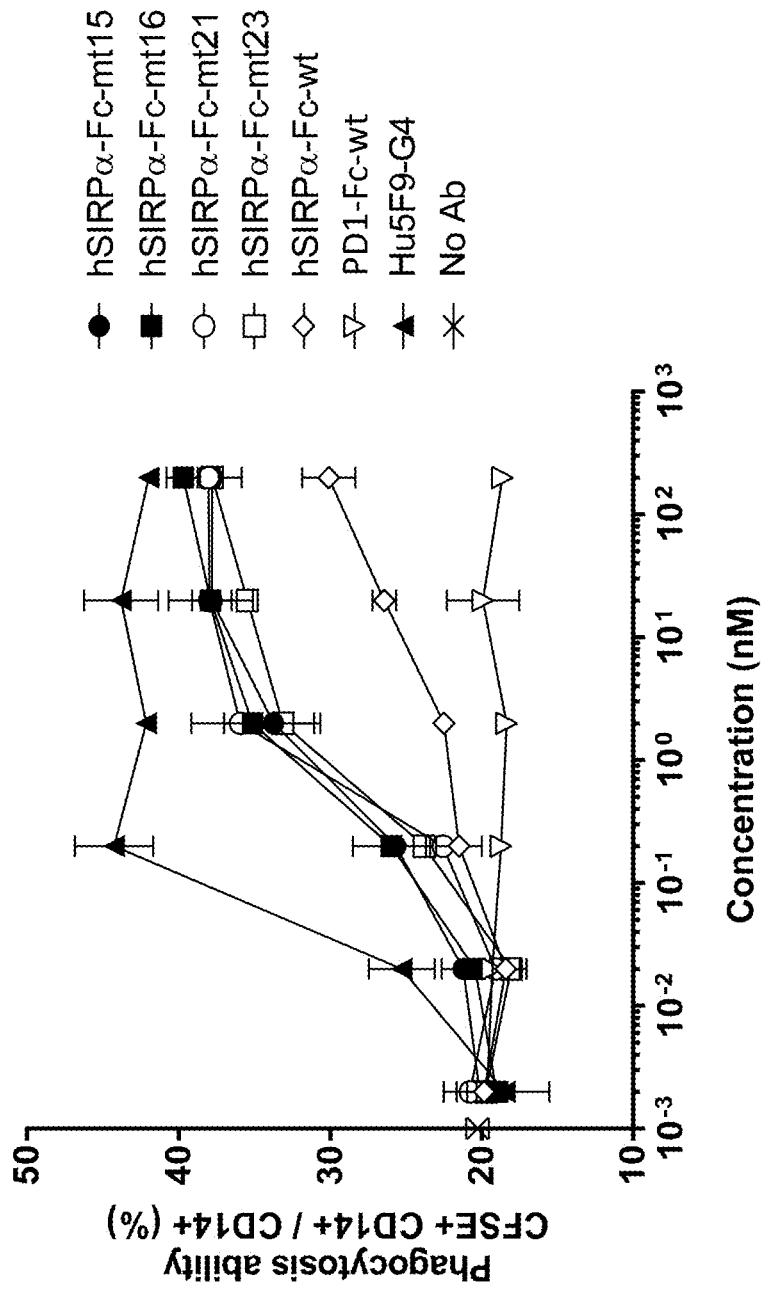

FIG. 18D shows induced phagocytosis ability of hSIRPα-Fc mutant proteins by human monocyte-derived macrophages (MDM) against DLD1 cells.

Figure 19A:
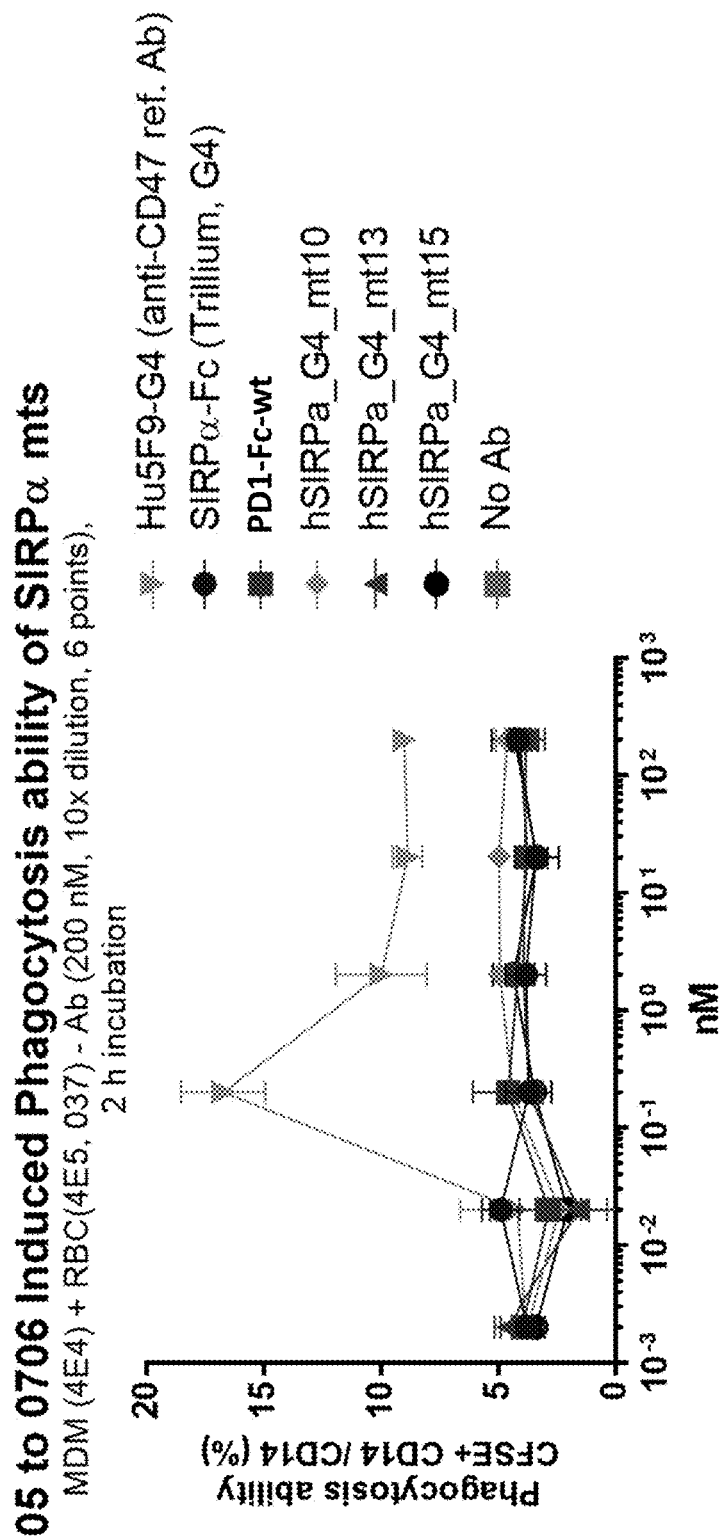
Figure 19B:
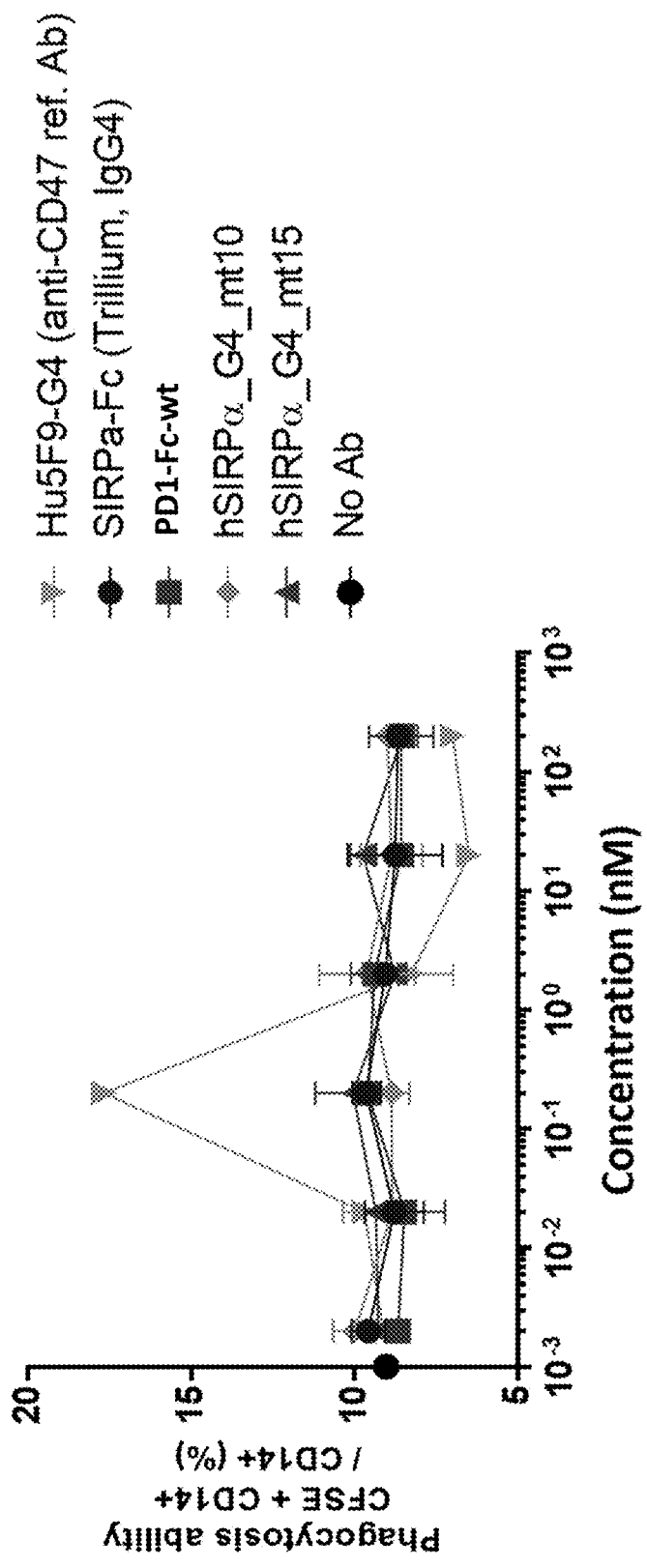
Figure 19C:
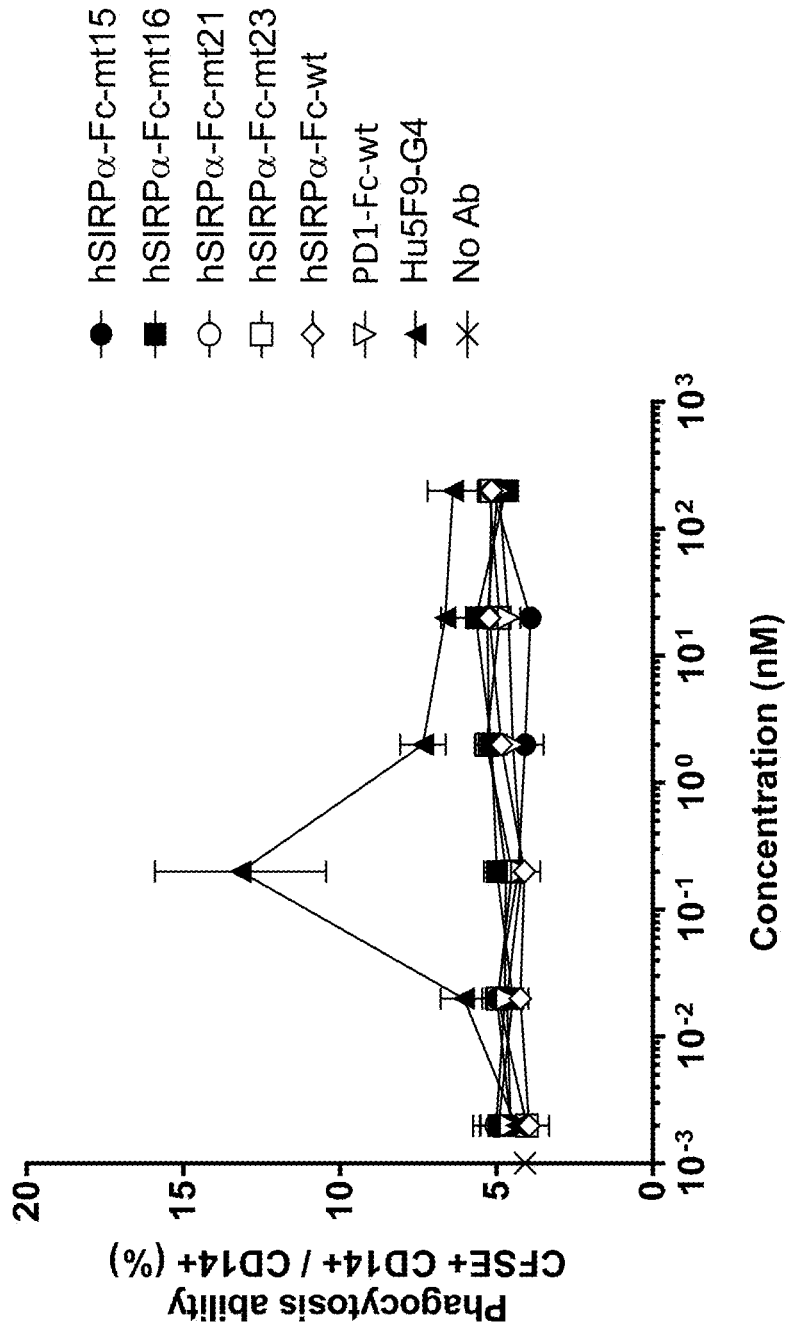

FIGS. 19A-19C show induced phagocytosis ability of hSIRPα-Fc mutant proteins by human monocyte-derived macrophages (MDM) against RBC cells. Human RBC cells were collected from two donors.

Figure 20A:
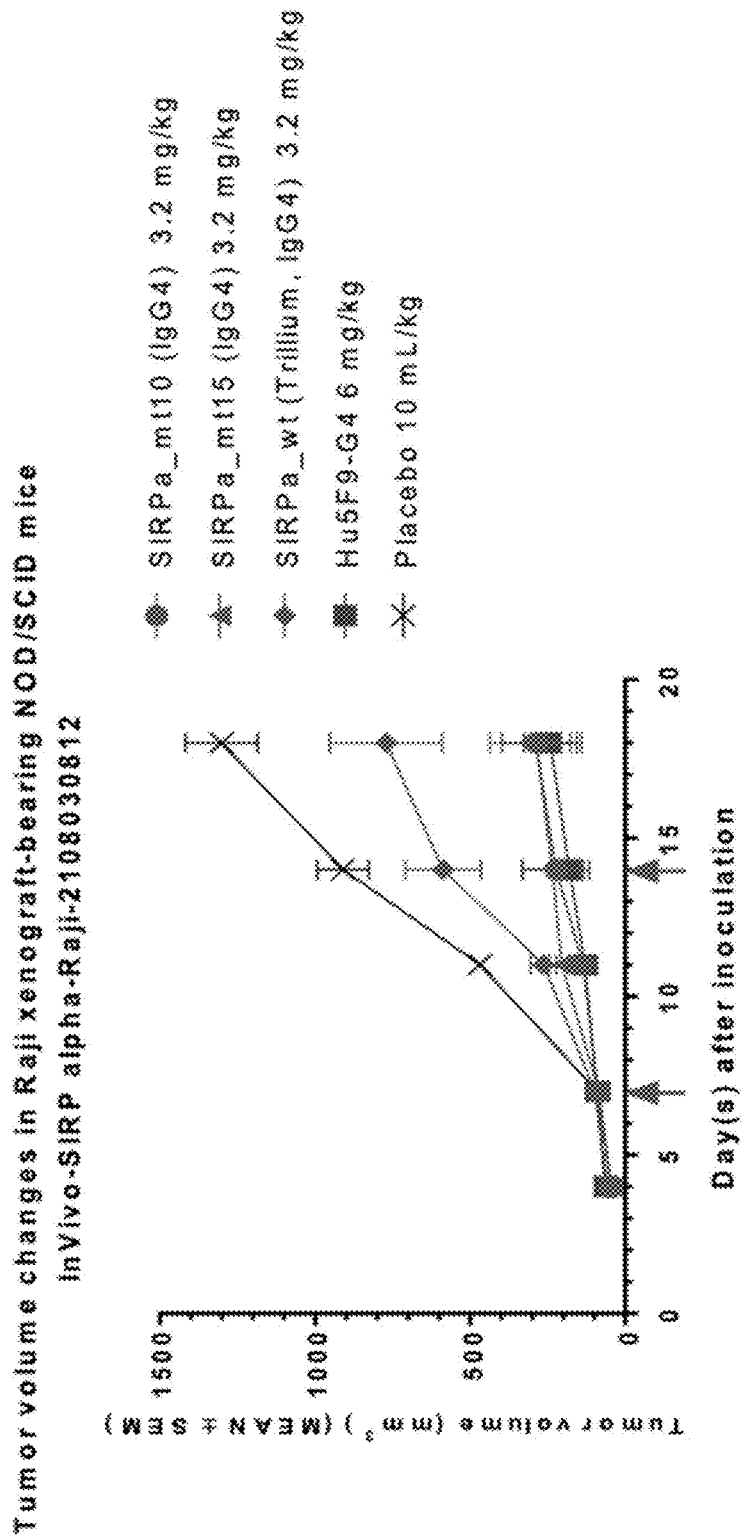

FIG. 20A shows the tumor growth curves in Raji xenograft-bearing NOD/SCID mice that were treated with hSIRPα-Fc-mt10, hSIRPα-Fc-mt15, hSIRPα-Fc-wt (Trillium TTI-622), or Hu5F9-IgG4. The control group mice were administered with placebo.

Figure 20B:
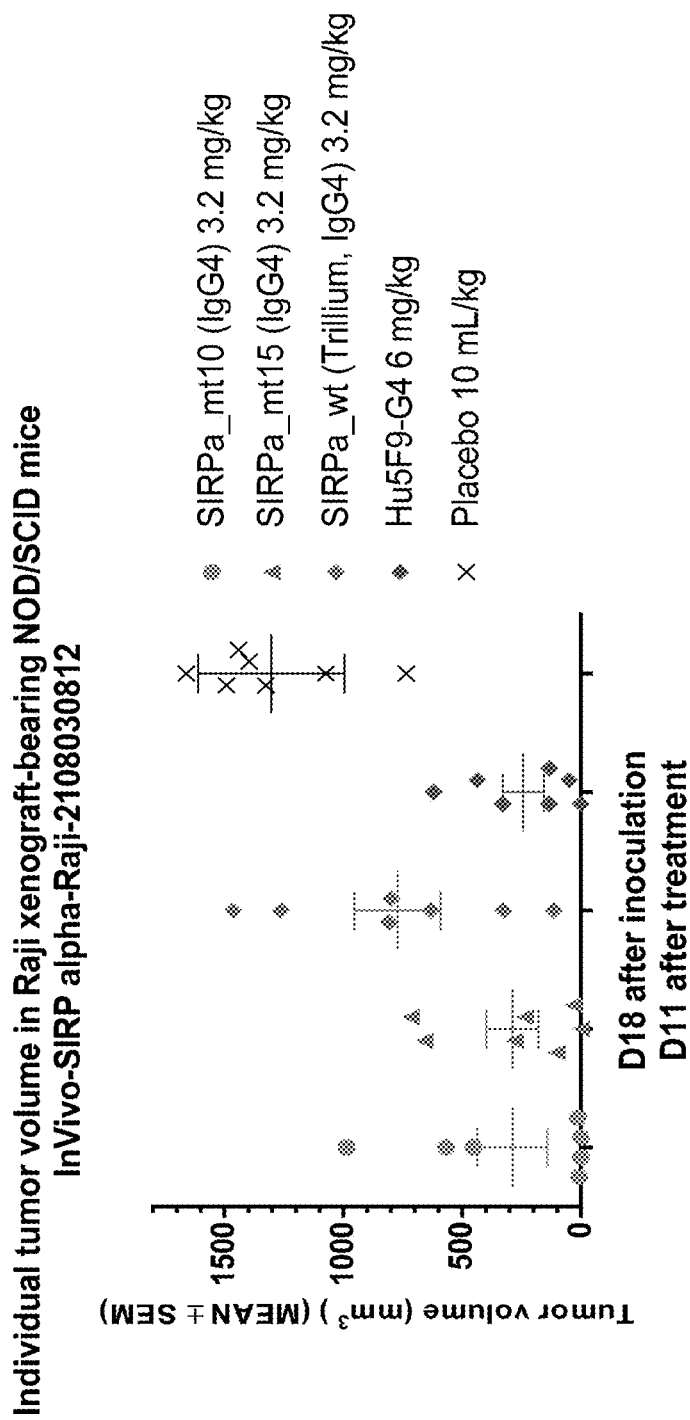

FIG. 20B shows the individual tumor volume on Day 18 post inoculation in Raji xenograft-bearing NOD/SCID mice that were treated with hSIRPα-Fc-mt10, hSIRPα-Fc-mt15, hSIRPα-Fc-wt (Trillium TTI-622), Hu5F9-IgG4, or placebo.

Figure 20C:
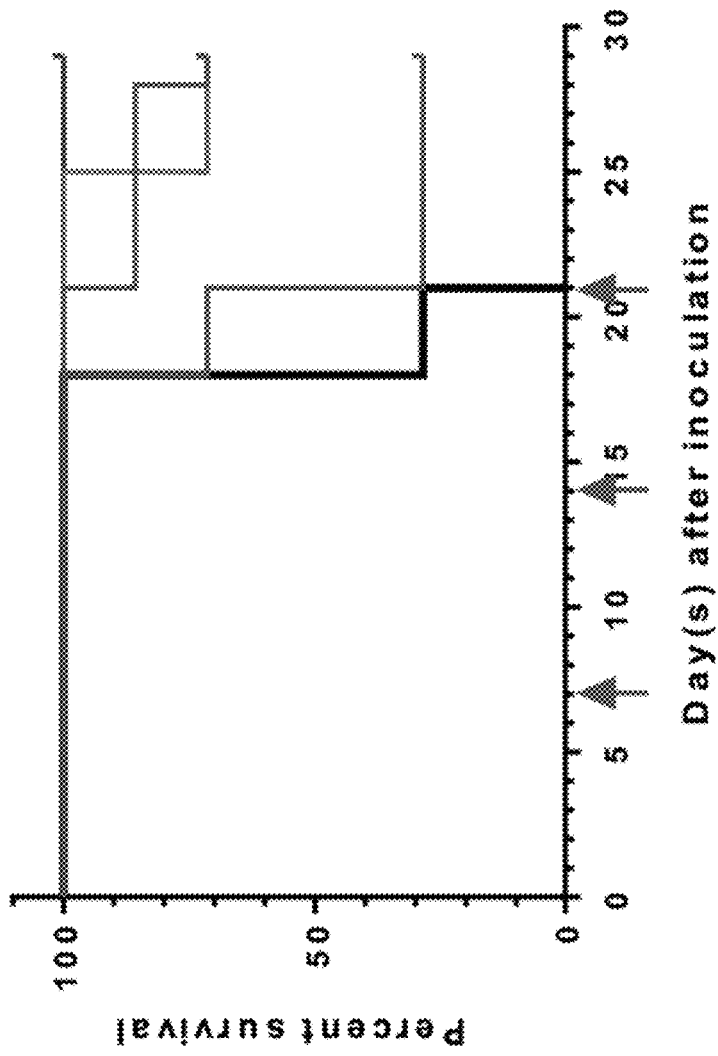

FIG. 20C shows the survival curves of Raji xenograft-bearing NOD/SCID mice that were treated with hSIRPα-Fc-mt10, hSIRPα-Fc-mt15, hSIRPα-Fc-wt (Trillium TTI-622), Hu5F9-IgG4, or placebo.

Figure 21A:
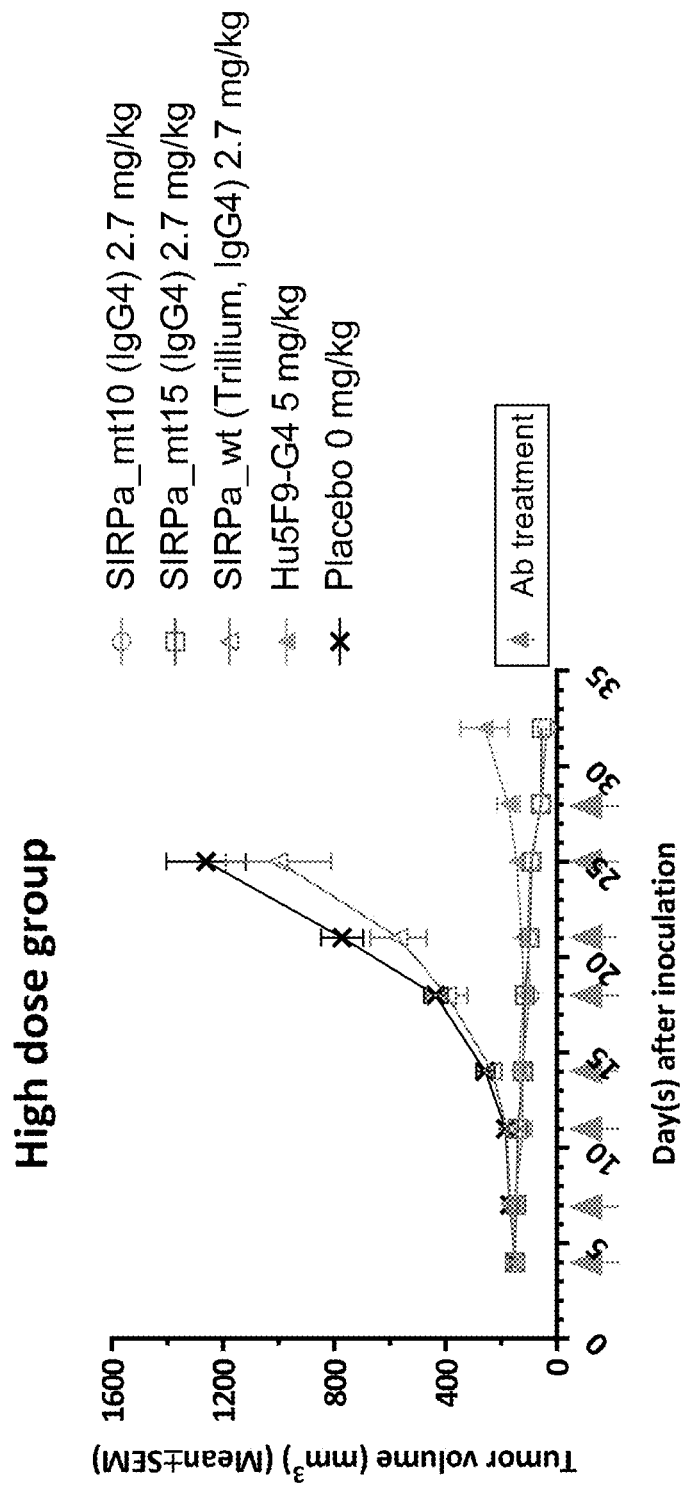

FIG. 21A shows the tumor growth curves in NCI_H82 xenograft-bearing NOD/SCID mice that were treated with hSIRPα-Fc-mt10, hSIRPα-Fc-mt15, hSIRPα-Fc-wt (Trillium TTI-622), or Hu5F9-IgG4. The control group mice were administered with placebo.

Figure 21B:
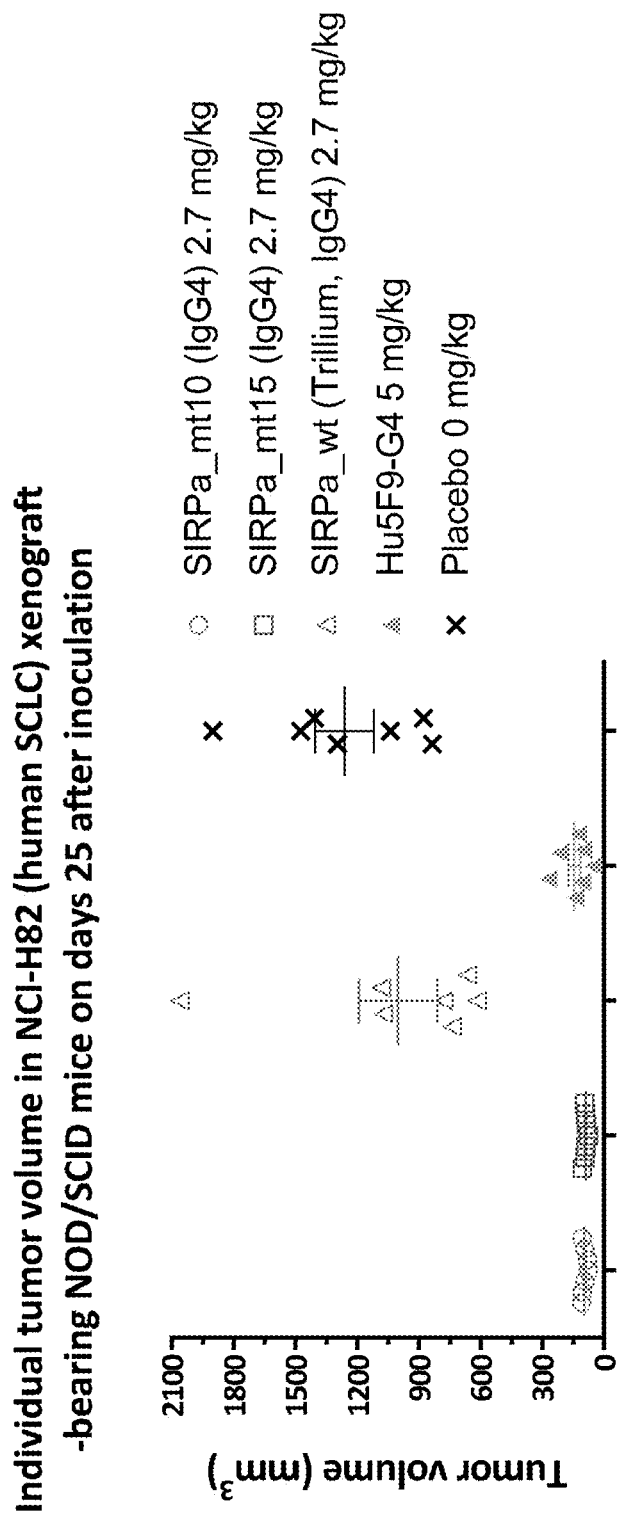

FIG. 21B shows the individual tumor volume on Day 25 post inoculation in NCI_H82 xenograft-bearing NOD/SCID mice that were treated with hSIRPα-Fc-mt10, hSIRPα-Fc-mt15, hSIRPα-Fc-wt (Trillium TTI-622), Hu5F9-IgG4, or placebo.

Figure 21C:
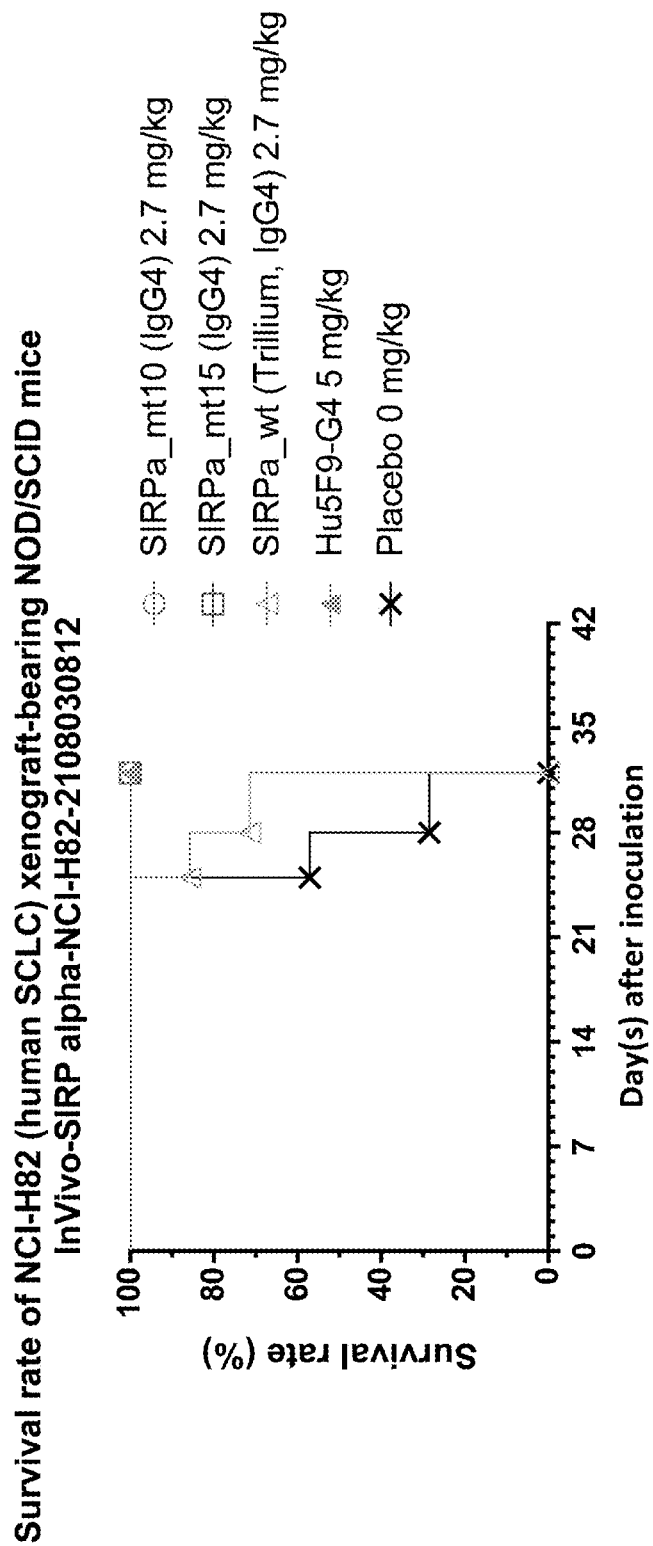

FIG. 21C shows the survival curves of NCI_H82 xenograft-bearing NOD/SCID mice that were treated with hSIRPα-Fc-mt10, hSIRPα-Fc-mt15, hSIRPα-Fc-wt (Trillium TTI-622), Hu5F9-IgG4, or placebo.

FIG. 22 lists amino acid sequences of the wild-type IgV domain or IgV domain mutants of human SIRPα.

FIG. 23 lists protein sequences discussed in the disclosure.

DETAILED DESCRIPTION

Signal regulatory protein a (SIRPα, SIRPa, or CD172A) is a transmembrane protein. It has an extracellular region comprising three Ig-like domains and a cytoplasmic region containing immunoreceptor tyrosine-based inhibition motifs that mediate binding of the protein tyrosine phosphatases SHP1 and SHP2. Tyrosine phosphorylation of SIRPα is regulated by various growth factors and cytokines as well as by integrin-mediated cell adhesion to extracellular matrix proteins. SIRPα is especially abundant in myeloid cells such as macrophages and dendritic cells, whereas it is expressed at only low levels in T, B, NK, and NKT cells.

The extracellular region of SIRPα can interact with its ligand CD47. The interaction of SIRPα on macrophages with CD47 on red blood cells prevents phagocytosis of Ig-opsonized red blood cells by macrophages in vitro and in vivo. The ligation of SIRPα on phagocytes by CD47 expressed on a neighboring cell results in phosphorylation of SIRPα cytoplasmic immunoreceptor tyrosine-based inhibition (ITIM) motifs, leading to the recruitment of SHP-1 and SHP-2 phosphatases. One resulting downstream effect is the prevention of myosin-IIA accumulation at the phagocytic synapse and consequently inhibition of phagocytosis. Thus, CD47-SIRPα interaction functions as a negative immune checkpoint to send a "don't eat me" signal to ensure that healthy autologous cells are not inappropriately phagocytosed. However, overexpression of CD47 has also been found in nearly all types of tumors, some of which include acute myeloid leukemia, non-Hodgkin's lymphoma, bladder cancer, and breast cancer. Such negative regulation of macrophages can be minimized by blocking the binding of CD47 to SIRPα.

Blocking CD47/SIRPα interaction can promote cellular phagocytosis, thus can be used to treat various cancers. It triggers the recognition and elimination of cancer cells by the innate immunity. Agents that target CD47 or SIRPα can be used to treat various tumors and cancers, e.g., solid tumors, hematologic malignancies (e.g., relapsed or refractory hematologic malignancies), acute myeloid leukemia, non-Hodgkin's lymphoma, breast cancer, bladder cancer, ovarian cancer, and small cell lung cancer tumors.

A detailed description of SIRPα and its function can be found, e.g., in Yanagita et al. "Anti-SIRPα antibodies as a potential new tool for cancer immunotherapy." JCI insight 2.1 (2017); Seiffert et al. "Signal-regulatory protein a (SIRPα) but not SIRPβ is involved in T-cell activation, binds to CD47 with high affinity, and is expressed on immature CD34+ CD38-hematopoietic cells." Blood 97.9 (2001): 2741-2749; which are incorporated by reference herein in the entirety.

In addition, SIRPα acts to inhibit in vivo clearance of CD47-expressing host cells, including red blood cells and platelets, by macrophages. CD47-SIRPα interactions also appear essential for engraftment upon hematopoietic stem cells. Blocking CD47/SIRPα interaction may cause accidental killing of normal red blood cells, potentially resulting in anemia, and triggering inflammation. Thus, it is important to modulate the interaction of a SIRPα targeting agent with CD47, e.g., with limited or controlled effects on red blood cells.

The present disclosure provides engineered SIRPα variants. These engineered SIRPα variants can be used to target CD47/SIRPα pathway, whereas the interaction of engineered SIRPα variants and CD47 are carefully modulated.

Engineered SIRPα Variants

Human SIRPα is a member of signal regulatory proteins (SIRPs). Signal regulatory proteins are cell surface Ig superfamily proteins that mediate essential cell surface protein interactions and signal transduction. SIRPs all contain an N-terminal extracellular region, a single transmembrane domain and a C-terminal intracellular region.

The extracellular region of human SIRPα (UniProt identifier: P78324) has an IgV domain, an Ig-like C1-type 1 domain, and an Ig-like C1-type 2 domain. They correspond to amino acids 32-137, amino acids 148-247, and amino acids 254-348 of the human SIRPα protein (SEQ ID NO: 31; NP_542970.1). Amino acids 1-30 are signal peptides. Human SIRPα also has a long intracellular domain that comprises two putative immunoreceptor tyrosine-based inhibition motifs (ITIM). Activation of SIRPα ITIMs delivers inhibitory signals that negatively regulate cell responses.

Figure 1:
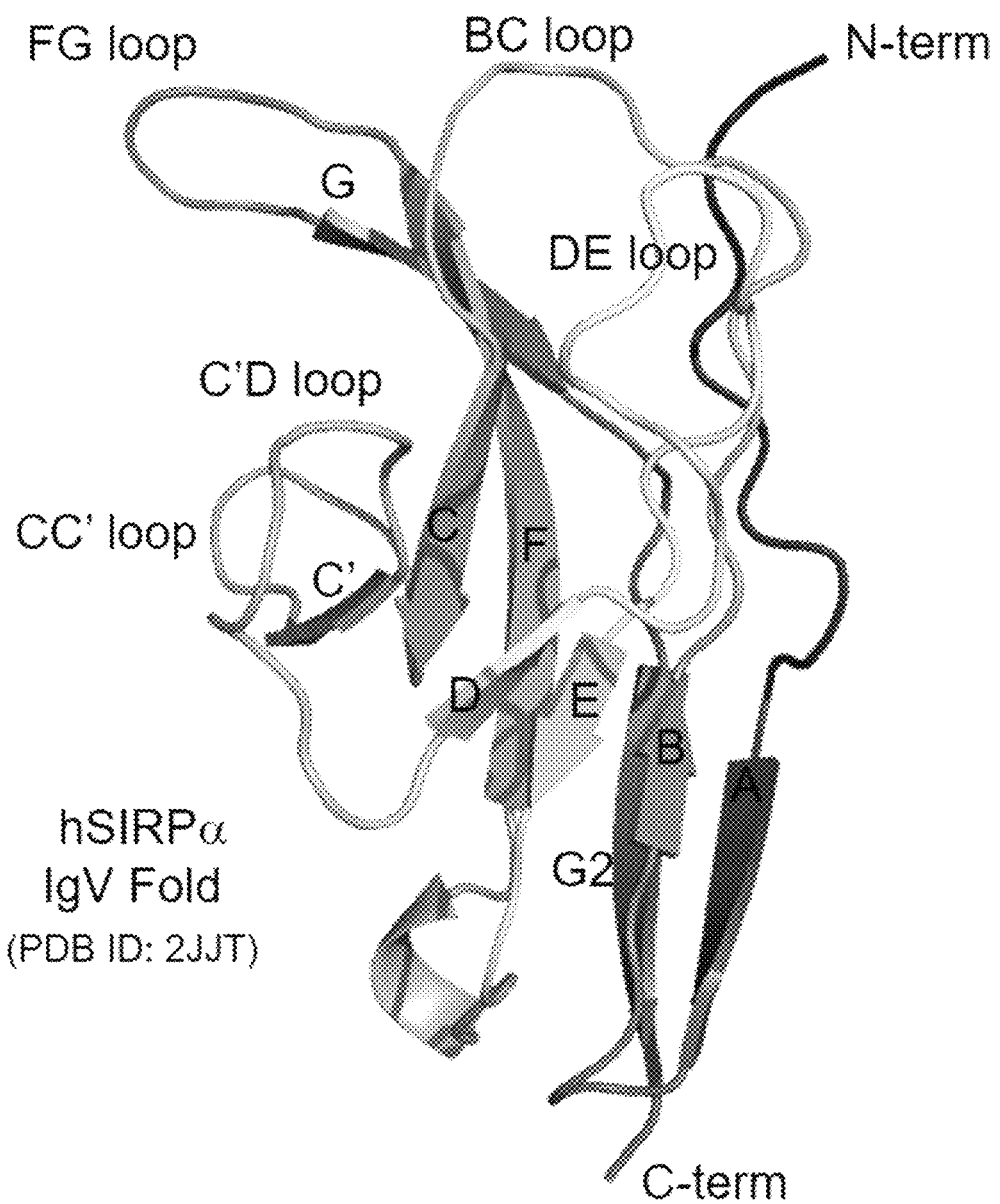
FIG. 1 shows a 3D protein structure of the IgV domain of human SIRPα. Nine β-strands (A-B-C-C'-D-E-F-G-G2) and five loop regions (BC loop, CC' loop, C'D loop, DE loop, and FG loop) are labeled.

The binding of SIRPα to CD47 is mediated through the extracellular IgV domain of SIRPα. The IgV domain of hSIRPα belongs immunoglobulin superfamily, which contains 9 β-strands, including A-B-C-C'-D-E-F-G-G2. A helix is located between E strand and F strand (FIG. 1).

Based on the structure of human CD47 (hCD47) in complex with hSIRPα, the interacting residues with CD47 are determined. The analysis results show that multiple interacting residues are located within the BC loop (corresponding to amino acids 24-36 of SEQ ID NO: 1), C'D loop (corresponding to amino acids 53-56 of SEQ ID NO: 1), and DE loop (corresponding to amino acids 61-78 of SEQ ID NO: 1) of the hSIRPα IgV domain are highly conserved. In FIG. 1B, amino acid residues within these loop regions are underlined. These regions are the targets for mutations. Thus, in some embodiments, the engineered SIRPα polypeptide comprises or consists of one or more amino acid mutations at BC loop, C'D loop, and/or DE loop.

Further analysis shows Leu30, Gly34, Gln52, Lys53, Glu54, His56, Ser66, Thr67, Arg69, Lys93, Lys96, Gly97, and Asp100 in hSIRPα are involved in the interaction with CD47. Thus, in some embodiments, the engineered SIRPα polypeptide can comprise one or more amino acid mutations at Leu30, Gly34, Gln52, Lys53, Glu54, His56, Ser66, Thr67, Arg69, Lys93, Lys96, Gly97, and/or Asp100.

In addition, it has been determined that Lys53 and Ser66 can be important for increasing binding affinity of hSIRPα to CD47. Lys53 is located on C'D loop and S66 is located on DE loop. Mutation at Lys in position 53 can be important for increasing the binding affinity of hSIRPα to CD47. Thus, in some embodiments, the amino acid that corresponds to K53 of SEQ ID NO: 1 is R. In addition, the elimination of steric hindrance of position 54 due to structural change also suggests changing the structure of C'D loop can also increase the chance to increase the binding affinity of hSIRPα to CD47. Mutations at C'D loops provides a more flexible approach to screen unique mutations that can provide increased binding affinity to CD47.

According to the results from residue scanning, Lys53 can increase stability when it is replaced by an amino acid with long side chain or the side chain with aromatic ring such as Arginine, Leucine, Phenylalanine, Tryptophan, and Tyrosine. Thus, in some embodiments, the amino acid that corresponds to K53 of SEQ ID NO: 1 is Arginine, Leucine, Phenylalanine, Tryptophan, or Tyrosine. In some embodiments, the amino acid that corresponds to K53 of SEQ ID NO: 1 is not R.

Meanwhile, instructing mutations at Glu54, Gly55, and His56 can be more flexible and can be more advantageous. In some embodiments, the engineered SIRPα polypeptide can have one or more of the following mutations: (a) the amino acid that corresponds to E54 of SEQ ID NO: 1 is A, H, N, I, R, G, S, D or L; (b) the amino acid that corresponds to G55 of SEQ ID NO: 1 is W, F, Q, L, D, K, R, A, or P; (c) the amino acid that corresponds to H56 of SEQ ID NO: 1 is P, I, T, N, V, R, L, S, G, or Q.

Thr67 is a residue that directly involved in interaction, decreasing the distance of Thr67 to CD47 may increase the binding affinity of hSIRPα to CD47. The replacement of residues Ser66 and Thr67 can make DE loop closer to CD47. Thus, in some embodiments, the engineered SIRPα polypeptide can have one or more of the following: (a) the amino acid that corresponds to S66 of SEQ ID NO: 1 is Q or N; (b) the amino acid that corresponds to T67 of SEQ ID NO: 1 is G.

Some other interface of CD47/hSIRPα complex are also observed in the present disclosure. The residues, Ile31, Val33, and Arg69 can form a positive charge pocket. The FG loop of CD47 is buried perfectly in the positive charge pocket because of the charge and shape complementary of the two regions. Thus, in some embodiments, the amino acid that corresponds to 131 of SEQ ID NO: 1 is W, K, Y, L, A, N, or T. In some embodiments, the amino acid that corresponds to 131 of SEQ ID NO: 1 is W, K, Y, L, A, or N.

In addition, the analysis in the present disclosure shows that Val27, Val63, and Lys68 can be important for maintaining the structure of hSIRPα. Thus, in some embodiments, these amino acid residues are retained. In summary, Ile31, Glu54, Gly55, His56, Ser66, and Thr67 are identified as candidate amino acids for hSIRPα mutation screening.

Thus, in one aspect, the engineered SIRPα polypeptide comprises or consists of an amino acid sequence that is at least 60%, 70%, 80%, 81%, 82%, 83%, 84%, 85%, 86%, 87%, 88%, 89%, 90%, 91%, 92%, 93%, 94%, 95%, 96%, 97%, 98%, 99%, or 100% identical to SEQ ID NO: 1, 2, 3, 4, 5, 6, 7, 8, 9, 10, 11, 12, 13, 14, 33, 34, 35, 36, 37, 38, 39, 40, 41, 42, 43, 44, or 45.

In some embodiments, the engineered SIRPα polypeptide comprises or consists of an amino acid sequence that is at least 60%, 70%, 80%, 81%, 82%, 83%, 84%, 85%, 86%, 87%, 88%, 89%, 90%, 91%, 92%, 93%, 94%, 95%, 96%, 97%, 98%, 99%, or 100% identical to SEQ ID NO: 9. In some embodiments, the engineered SIRPα polypeptide comprises or consists of an amino acid sequence that is at least 60%, 70%, 80%, 81%, 82%, 83%, 84%, 85%, 86%, 87%, 88%, 89%, 90%, 91%, 92%, 93%, 94%, 95%, 96%, 97%, 98%, 99%, or 100% identical to SEQ ID NO: 14. In some embodiments, the engineered SIRPα polypeptide comprises or consists of an amino acid sequence that is at least 60%, 70%, 80%, 81%, 82%, 83%, 84%, 85%, 86%, 87%, 88%, 89%, 90%, 91%, 92%, 93%, 94%, 95%, 96%, 97%, 98%, 99%, or 100% identical to SEQ ID NO: 41. In some embodiments, the engineered SIRPα polypeptide comprises or consists of an amino acid sequence that is at least 60%, 70%, 80%, 81%, 82%, 83%, 84%, 85%, 86%, 87%, 88%, 89%, 90%, 91%, 92%, 93%, 94%, 95%, 96%, 97%, 98%, 99%, or 100% identical to SEQ ID NO: 42. In some embodiments, the engineered SIRPα polypeptide comprises or consists of an amino acid sequence that is at least 60%, 70%, 80%, 81%, 82%, 83%, 84%, 85%, 86%, 87%, 88%, 89%, 90%, 91%, 92%, 93%, 94%, 95%, 96%, 97%, 98%, 99%, or 100% identical to SEQ ID NO: 43. In some embodiments, the engineered SIRPα polypeptide comprises or consists of an amino acid sequence that is at least 60%, 70%, 80%, 81%, 82%, 83%, 84%, 85%, 86%, 87%, 88%, 89%, 90%, 91%, 92%, 93%, 94%, 95%, 96%, 97%, 98%, 99%, or 100% identical to SEQ ID NO: 44. In some embodiments, the engineered SIRPα polypeptide comprises or consists of an amino acid sequence that is at least 60%, 70%, 80%, 81%, 82%, 83%, 84%, 85%, 86%, 87%, 88%, 89%, 90%, 91%, 92%, 93%, 94%, 95%, 96%, 97%, 98%, 99%, or 100% identical to SEQ ID NO: 45.

In some embodiments, the engineered SIRPα variants can have at least or about 1 (e.g., at least or about 2, 3, 4, 5, 6, 7, 8, 9, 10, 20, 30, 40) amino acid insertions, deletions, or substitutions as compared to any one of SEQ ID NOs: 1-14 and 33-45.

In some embodiments, the engineered SIRPα polypeptide has one or more of the following mutations:

(a) the amino acid that corresponds to E54 of SEQ ID NO: 1 is A, H, N, I, R, G, S, D, or L;

(b) the amino acid that corresponds to G55 of SEQ ID NO: 1 is W, F, Q, L, D, K, R, A or P;

(c) the amino acid that corresponds to H56 of SEQ ID NO: 1 is P, I, T, N, V, R, L, S, G, or Q.

In some embodiments, the amino acid that corresponds to H56 of SEQ ID NO: 1 is I, T, N, V, L, S, G, or Q. In some embodiments, the amino acid that corresponds to 131 of SEQ ID NO: 1 is W, K, Y, L, A, N, I, or T. In some embodiments, the amino acid that corresponds to 131 of SEQ ID NO: 1 is W, K, Y, L, A, N, or I.

In some embodiments, the engineered SIRPα polypeptide comprises or consists of one or more of the following mutations:
- (a) the amino acid that corresponds to S66 of SEQ ID NO: 1 is Q orN;
- (b) the amino acid that corresponds to T67 of SEQ ID NO: 1 is G.

In some embodiments, the engineered SIRPα polypeptide comprises or consists of one or more of the following mutations:
- (a) the amino acid that corresponds to H24 of SEQ ID NO: 1 is R, N, or T;
- (b) the amino acid that corresponds to T26 of SEQ ID NO: 1 is I.

In some embodiments, the amino acid that corresponds to H24 of SEQ ID NO: 1 is N or T.

In some embodiments, the engineered SIRPα polypeptide comprises or consists of one or more of the following mutations:
- (a) the amino acid that corresponds to E70 of SEQ ID NO: 1 is G, F, R, A, L, or T;
- (b) the amino acid that corresponds to M72 of SEQ ID NO: 1 is R or Y; and
- (c) the amino acid that corresponds to D73 of SEQ ID NO: 1 is I.

In some embodiments, the engineered SIRPα polypeptide comprises or consists of one or more of the following mutations:
- (a) the amino acid that corresponds to position 27 of SEQ ID NO: 1 is V or L;
- (b) the amino acid that corresponds to position 63 of SEQ ID NO: 1 is V; and
- (c) the amino acid that corresponds to position 68 of SEQ ID NO: 1 is K.

In some embodiments, the engineered SIRPα polypeptide comprises or consists of one or more of the following mutations:
- (a) the amino acid that corresponds to H24 of SEQ ID NO: 1 is R, N, or T;
- (b) the amino acid that corresponds to T26 of SEQ ID NO: 1 is I;
- (c) the amino acid that corresponds to V27 of SEQ ID NO: 1 is L;
- (d) the amino acid that corresponds to S29 of SEQ ID NO: 1 is Q;
- (e) the amino acid that corresponds to 131 of SEQ ID NO: 1 is W, K, Y, L, A, or N;
- (f) the amino acid that corresponds to E54 of SEQ ID NO: 1 is A, H, N, I, R, G, S, D, or L;
- (g) the amino acid that corresponds to G55 of SEQ ID NO: 1 is W, F, Q, L, D, K, R, A, or P;
- (h) the amino acid that corresponds to H56 of SEQ ID NO: 1 is P, I, T, N, V, R, L, S, G, or Q.
- (i) the amino acid that corresponds to S66 of SEQ ID NO: 1 is Q or N;
- (j) the amino acid that corresponds to T67 of SEQ ID NO: 1 is G;
- (k) the amino acid that corresponds to E70 of SEQ ID NO: 1 is G, F, R, A, L, or T;
- (l) the amino acid that corresponds to N71 of SEQ ID NO: 1 is S;
- (m) the amino acid that corresponds to M72 of SEQ ID NO: 1 is R or Y; and
- (n) the amino acid that corresponds to D73 of SEQ ID NO: 1 is I.

In some embodiments, the engineered SIRPα polypeptide does not comprise or consist of one or more of the following mutations:
- (a) the amino acid that corresponds to V27 of SEQ ID NO: 1 is I or L;
- (b) the amino acid that corresponds to 131 of SEQ ID NO: 1 is F, S, or T;
- (c) the amino acid that corresponds to E54 of SEQ ID NO: 1 is Q;
- (d) the amino acid that corresponds to H56 of SEQ ID NO: 1 is P or R;
- (e) the amino acid that corresponds to S66 of SEQ ID NO: 1 is T or G;
- (f) the amino acid that corresponds to K68 of SEQ ID NO: 1 is K or R; and
- (g) the amino acid that corresponds to E70 of SEQ ID NO: 1 is N.

In some embodiments, the engineered SIRPα polypeptide comprises or consists of one or more of the following mutations:
- (a) the amino acid that corresponds to 131 of SEQ ID NO: 1 is W;
- (b) the amino acid that corresponds to E54 of SEQ ID NO: 1 is A;
- (c) the amino acid that corresponds to G55 of SEQ ID NO: 1 is W;
- (d) the amino acid that corresponds to H56 of SEQ ID NO: 1 is P.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 2).

In some embodiments, the engineered SIRPα polypeptide comprises or consists of one or more of the following mutations:
- (a) the amino acid that corresponds to H24 of SEQ ID NO: 1 is R;
- (b) the amino acid that corresponds to 131 of SEQ ID NO: 1 is W;
- (c) the amino acid that corresponds to E54 of SEQ ID NO: 1 is A;
- (d) the amino acid that corresponds to G55 of SEQ ID NO: 1 is F;
- (e) the amino acid that corresponds to H56 of SEQ ID NO: 1 is I;
- (f) the amino acid that corresponds to E70 of SEQ ID NO: 1 is G.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 3).

In some embodiments, the engineered SIRPα polypeptide comprises or consists of one or more of the following mutations:
- (a) the amino acid that corresponds to H24 of SEQ ID NO: 1 is N;
- (b) the amino acid that corresponds to E54 of SEQ ID NO: 1 is H;
- (c) the amino acid that corresponds to G55 of SEQ ID NO: 1 is Q;
- (d) the amino acid that corresponds to H56 of SEQ ID NO: 1 is T;
- (e) the amino acid that corresponds to S66 of SEQ ID NO: 1 is Q;

(f) the amino acid that corresponds to M72 of SEQ ID NO: 1 is R.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 4).

In some embodiments, the engineered SIRPα polypeptide comprises or consists of one or more of the following mutations:
  (a) the amino acid that corresponds to E54 of SEQ ID NO: 1 is N;
  (b) the amino acid that corresponds to G55 of SEQ ID NO: 1 is L;
  (c) the amino acid that corresponds to H56 of SEQ ID NO: 1 is I;
  (d) the amino acid that corresponds to T67 of SEQ ID NO: 1 is G.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 5).

In some embodiments, the engineered SIRPα polypeptide comprises or consists of one or more of the following mutations:
  (a) the amino acid that corresponds to T26 of SEQ ID NO: 1 is I;
  (b) the amino acid that corresponds to E54 of SEQ ID NO: 1 is I;
  (c) the amino acid that corresponds to G55 of SEQ ID NO: 1 is L;
  (d) the amino acid that corresponds to H56 of SEQ ID NO: 1 is T;
  (e) the amino acid that corresponds to M72 of SEQ ID NO: 1 is Y.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 6).

In some embodiments, the engineered SIRPα polypeptide comprises or consists of one or more of the following mutations:
  (a) the amino acid that corresponds to I31 of SEQ ID NO: 1 is K;
  (b) the amino acid that corresponds to E54 of SEQ ID NO: 1 is R;
  (c) the amino acid that corresponds to G55 of SEQ ID NO: 1 is D;
  (d) the amino acid that corresponds to H56 of SEQ ID NO: 1 is T;
  (e) the amino acid that corresponds to M72 of SEQ ID NO: 1 is R.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 7).

In some embodiments, the engineered SIRPα polypeptide comprises or consists of one or more of the following mutations:
  (a) the amino acid that corresponds to H24 of SEQ ID NO: 1 is T;
  (b) the amino acid that corresponds to I31 of SEQ ID NO: 1 is W;
  (c) the amino acid that corresponds to E54 of SEQ ID NO: 1 is G;
  (d) the amino acid that corresponds to G55 of SEQ ID NO: 1 is Q;
  (e) the amino acid that corresponds to H56 of SEQ ID NO: 1 is N;
  (f) the amino acid that corresponds to E70 of SEQ ID NO: 1 is F.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 8).

In some embodiments, the engineered SIRPα polypeptide comprises or consists of one or more of the following mutations:
  (a) the amino acid that corresponds to H24 of SEQ ID NO: 1 is T;
  (b) the amino acid that corresponds to I31 of SEQ ID NO: 1 is Y;
  (c) the amino acid that corresponds to E54 of SEQ ID NO: 1 is R;
  (d) the amino acid that corresponds to G55 of SEQ ID NO: 1 is Q;
  (e) the amino acid that corresponds to H56 of SEQ ID NO: 1 is T;
  (f) the amino acid that corresponds to E70 of SEQ ID NO: 1 is F.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 9).

In some embodiments, the engineered SIRPα polypeptide comprises or consists of one or more of the following mutations:
  (a) the amino acid that corresponds to I31 of SEQ ID NO: 1 is L;
  (b) the amino acid that corresponds to E54 of SEQ ID NO: 1 is S;
  (c) the amino acid that corresponds to G55 of SEQ ID NO: 1 is K;
  (d) the amino acid that corresponds to H56 of SEQ ID NO: 1 is V;
  (e) the amino acid that corresponds to E70 of SEQ ID NO: 1 is R.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 10).

In some embodiments, the engineered SIRPα polypeptide comprises or consists of one or more of the following mutations:
  (a) the amino acid that corresponds to I31 of SEQ ID NO: 1 is Y;
  (b) the amino acid that corresponds to E54 of SEQ ID NO: 1 is G;
  (c) the amino acid that corresponds to G55 of SEQ ID NO: 1 is R;
  (d) the amino acid that corresponds to H56 of SEQ ID NO: 1 is R;
  (e) the amino acid that corresponds to E70 of SEQ ID NO: 1 is A.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 11).

In some embodiments, the engineered SIRPα polypeptide comprises or consists of one or more of the following mutations:
(a) the amino acid that corresponds to I31 of SEQ ID NO: 1 is L;
(b) the amino acid that corresponds to E54 of SEQ ID NO: 1 is D;
(c) the amino acid that corresponds to G55 of SEQ ID NO: 1 is F;
(d) the amino acid that corresponds to H56 of SEQ ID NO: 1 is L;
(e) the amino acid that corresponds to M72 of SEQ ID NO: 1 is R.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 12).

In some embodiments, the engineered SIRPα polypeptide comprises or consists of one or more of the following mutations:
(a) the amino acid that corresponds to I31 of SEQ ID NO: 1 is A;
(b) the amino acid that corresponds to E54 of SEQ ID NO: 1 is L;
(c) the amino acid that corresponds to G55 of SEQ ID NO: 1 is D;
(d) the amino acid that corresponds to H56 of SEQ ID NO: 1 is S;
(e) the amino acid that corresponds to N71 of SEQ ID NO: 1 is S.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 13).

In some embodiments, the engineered SIRPα polypeptide comprises or consists of one or more of the following mutations:
(a) the amino acid that corresponds to H24 of SEQ ID NO: 1 is R;
(b) the amino acid that corresponds to I31 of SEQ ID NO: 1 is T;
(c) the amino acid that corresponds to E54 of SEQ ID NO: 1 is A;
(d) the amino acid that corresponds to G55 of SEQ ID NO: 1 is K;
(e) the amino acid that corresponds to H56 of SEQ ID NO: 1 is Q;
(f) the amino acid that corresponds to D73 of SEQ ID NO: 1 is I.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 14).

In some embodiments, the engineered SIRPα polypeptide comprises or consists of one or more of the following mutations:
(a) the amino acid that corresponds to H24 of SEQ ID NO: 1 is T;
(b) the amino acid that corresponds to E54 of SEQ ID NO: 1 is R;
(c) the amino acid that corresponds to G55 of SEQ ID NO: 1 is A;
(d) the amino acid that corresponds to H56 of SEQ ID NO: 1 is P.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 33).

In some embodiments, the engineered SIRPα polypeptide comprises or consists of one or more of the following mutations:
(a) the amino acid that corresponds to E54 of SEQ ID NO: 1 is S;
(b) the amino acid that corresponds to G55 of SEQ ID NO: 1 is P;
(c) the amino acid that corresponds to H56 of SEQ ID NO: 1 is P;
(d) the amino acid that corresponds to E70 of SEQ ID NO: 1 is L.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 34).

In some embodiments, the engineered SIRPα polypeptide comprises or consists of one or more of the following mutations:
(a) the amino acid that corresponds to H24 of SEQ ID NO: 1 is T;
(b) the amino acid that corresponds to I31 of SEQ ID NO: 1 is W;
(c) the amino acid that corresponds to E54 of SEQ ID NO: 1 is S;
(d) the amino acid that corresponds to H56 of SEQ ID NO: 1 is P;
(e) the amino acid that corresponds to E70 of SEQ ID NO: 1 is R.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 35).

In some embodiments, the engineered SIRPα polypeptide comprises or consists of one or more of the following mutations:
(a) the amino acid that corresponds to I31 of SEQ ID NO: 1 is W;
(b) the amino acid that corresponds to E54 of SEQ ID NO: 1 is R;
(c) the amino acid that corresponds to G55 of SEQ ID NO: 1 is A;
(d) the amino acid that corresponds to H56 of SEQ ID NO: 1 is G;
(e) the amino acid that corresponds to E70 of SEQ ID NO: 1 is T.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 36).

In some embodiments, the engineered SIRPα polypeptide comprises or consists of one or more of the following mutations:
(a) the amino acid that corresponds to S29 of SEQ ID NO: 1 is Q;

(b) the amino acid that corresponds to E54 of SEQ ID NO: 1 is H;
(c) the amino acid that corresponds to G55 of SEQ ID NO: 1 is R;
(d) the amino acid that corresponds to H56 of SEQ ID NO: 1 is T;
(e) the amino acid that corresponds to S66 of SEQ ID NO: 1 is N.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 37).

In some embodiments, the engineered SIRPα polypeptide comprises or consists of one or more of the following mutations:
(a) the amino acid that corresponds to E54 of SEQ ID NO: 1 is S;
(b) the amino acid that corresponds to G55 of SEQ ID NO: 1 is P;
(c) the amino acid that corresponds to H56 of SEQ ID NO: 1 is R;
(d) the amino acid that corresponds to E70 of SEQ ID NO: 1 is L.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 38).

In some embodiments, the engineered SIRPα polypeptide comprises or consists of one or more of the following mutations:
(a) the amino acid that corresponds to V27 of SEQ ID NO: 1 is L;
(b) the amino acid that corresponds to G55 of SEQ ID NO: 1 is D;
(c) the amino acid that corresponds to H56 of SEQ ID NO: 1 is R;
(d) the amino acid that corresponds to M72 of SEQ ID NO: 1 is R.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 39).

In some embodiments, the engineered SIRPα polypeptide comprises or consists of one or more of the following mutations:
(a) the amino acid that corresponds to V27 of SEQ ID NO: 1 is L;
(b) the amino acid that corresponds to I31 of SEQ ID NO: 1 is T;
(c) the amino acid that corresponds to H56 of SEQ ID NO: 1 is P;
(d) the amino acid that corresponds to E70 of SEQ ID NO: 1 is G.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 40).

In some embodiments, the engineered SIRPα polypeptide comprises or consists of one or more of the following mutations:
(a) the amino acid that corresponds to H24 of SEQ ID NO: 1 is T;
(b) the amino acid that corresponds to I31 of SEQ ID NO: 1 is Y;
(c) the amino acid that corresponds to E54 of SEQ ID NO: 1 is R;
(d) the amino acid that corresponds to G55 of SEQ ID NO: 1 is Q;
(e) the amino acid that corresponds to H56 of SEQ ID NO: 1 is T.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 41).

In some embodiments, the engineered SIRPα polypeptide comprises or consists of one or more of the following mutations:
(a) the amino acid that corresponds to H24 of SEQ ID NO: 1 is T;
(b) the amino acid that corresponds to I31 of SEQ ID NO: 1 is N;
(c) the amino acid that corresponds to E54 of SEQ ID NO: 1 is R;
(d) the amino acid that corresponds to G55 of SEQ ID NO: 1 is Q;
(e) the amino acid that corresponds to H56 of SEQ ID NO: 1 is T.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 42).

In some embodiments, the engineered SIRPα polypeptide comprises or consists of one or more of the following mutations:
(a) the amino acid that corresponds to H24 of SEQ ID NO: 1 is R;
(b) the amino acid that corresponds to I31 of SEQ ID NO: 1 is Y;
(c) the amino acid that corresponds to E54 of SEQ ID NO: 1 is A;
(d) the amino acid that corresponds to G55 of SEQ ID NO: 1 is K;
(e) the amino acid that corresponds to H56 of SEQ ID NO: 1 is Q.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 43).

In some embodiments, the engineered SIRPα polypeptide comprises or consists of one or more of the following mutations:
(a) the amino acid that corresponds to H24 of SEQ ID NO: 1 is R;
(b) the amino acid that corresponds to I31 of SEQ ID NO: 1 is N;
(c) the amino acid that corresponds to E54 of SEQ ID NO: 1 is A;
(d) the amino acid that corresponds to G55 of SEQ ID NO: 1 is K;
(e) the amino acid that corresponds to H56 of SEQ ID NO: 1 is Q.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 44).

In some embodiments, the engineered SIRPα polypeptide comprises or consists of one or more of the following mutations:
(a) the amino acid that corresponds to H24 of SEQ ID NO: 1 is R;
(b) the amino acid that corresponds to E54 of SEQ ID NO: 1 is A;
(c) the amino acid that corresponds to G55 of SEQ ID NO: 1 is K;
(d) the amino acid that corresponds to H56 of SEQ ID NO: 1 is Q.

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 45).

In some embodiments, the engineered SIRPα polypeptide comprises or consists of an amino acid sequence that is at least 80%, 85%, 90%, or 95% identical to any one of SEQ ID NOs: 1-14 and 33-45 (e.g., SEQ ID NO: 1 or SEQ ID NO: 44) with 1, 2, 3, 4, 5, 6, 7, 8, 9, 10, 11, 12, 13, 14, or 15 mutations as shown in FIG. 6.

The engineered SIRPα polypeptide can have additional modifications. In some embodiments, the engineered SIRPα polypeptide can have a CH2 domain and/or a CH3 domain of Fc. In some embodiments, the engineered SIRPα polypeptide can be linked to the N-terminal of the CH2 domain (e.g., through an optional hinge region or a GS linker). In some embodiments, the engineered SIRPα polypeptide can be linked to the C-terminal of the CH3 domain (e.g., through an optional GS linker). In some embodiments, the hinge region is an IgG hinge region (e.g., IgG4 hinge region). In some embodiments, the CH2 domain is an IgG CH2 domain (e.g., IgG4 CH2 domain). In some embodiments, the CH3 domain is an IgG CH3 domain (e.g., IgG4 CH3 domain). In some embodiments, the hinge region, the CH2 domain, the CH3 domain have a sequence that is at least 80%, 85%, 90%, 95%, 100% identical to SEQ ID NO: 29.

In some embodiments, the engineered SIRPα polypeptide comprises or consists of an amino acid sequence that is at least 60%, 70%, 80%, 81%, 82%, 83%, 84%, 85%, 86%, 87%, 88%, 89%, 90%, 91%, 92%, 93%, 94%, 95%, 96%, 97%, 98%, 99%, or 100% identical to SEQ ID NO: 15, 16, 17, 18, 19, 20, 21, 22, 23, 24, 25, 26, 27, 28, 46, 47, 48, 49, 50, 51, 52, 53, 54, 55, 56, 57 or 58.

SIRPα Protein Constructs

The disclosure provides engineered SIRPα protein constructs that can specifically bind to CD47. In some embodiments, these protein constructs can block CD47/SIRPα signaling pathway thus increase immune response. In some embodiments, these protein constructs can initiate phagocytosis.

In some embodiments, the engineered SIRPα protein constructs can comprise any engineered SIRPα variant as described herein. In some embodiments, the engineered SIRPα protein constructs can have a sequence that is at least 80%, 81%, 82%, 83%, 84%, 85%, 86%, 87%, 88%, 89% 90%, 91%, 92%, 93%, 94%, 95%, 96%, 97%, 98%, 99% or 100% identical to any sequence of SEQ ID NOs: 1-14 and 33-45. In some embodiments, the engineered SIRPα protein constructs can comprise or consists of a sequence that is at least 80%, 81%, 82%, 83%, 84%, 85%, 86%, 87%, 88%, 89% 90%, 91%, 92%, 93%, 94%, 95%, 96%, 97%, 98%, 99% or 100% identical to any sequence of SEQ ID NOs: 15-28 and 46-58.

The disclosure also provides nucleic acid comprising a polynucleotide encoding a polypeptide comprising a sequence that is at least 80%, 81%, 82%, 83%, 84%, 85%, 86%, 87%, 88%, 89% 90%, 91%, 92%, 93%, 94%, 95%, 96%, 97%, 98%, 99% or 100% identical to any sequence of SEQ ID NOs: 1-14 and 33-45 or SEQ ID NOs: 15-28 and 46-58.

To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position. The percent identity between the two sequences is a function of the number of identical positions shared by the sequences, taking into account the number of gaps, and the length of each gap, which need to be introduced for optimal alignment of the two sequences. For example, the comparison of sequences and determination of percent identity between two sequences can be accomplished using a Blossum 62 scoring matrix with a gap penalty of 12, a gap extend penalty of 4, and a frameshift gap penalty of 5.

The engineered SIRPα protein constructs can further comprises an Fc region of an antibody. These antibodies can be of any type (e.g., IgG, IgE, IgM, IgD, IgA, and IgY), class or subclass (e.g., IgG1, IgG2, IgG3, IgG4, IgA1, IgA2, IgE1, IgE2). In some embodiments, the he Fc region is derived from human IgG (e.g., IgG1, IgG2, IgG3, or IgG4). In some embodiments, the Fc region is an IgG4 Fc region (e.g., human IgG4 Fc region).

In some embodiments, the engineered SIRPα variant is linked to the Fc region through an antibody hinge region (e.g., IgG, IgE hinge region). In addition, the Fc region can be modified to provide desired effector functions or serum half-life.

The engineered SIRPα variants and protein constructs described herein can block the binding between CD47 and endogenous SIRPα that are expressed on immune cells. In some embodiments, by binding to CD47, the engineered SIRPα variants and protein constructs can inhibit the binding of CD47 (e.g., that is expressed on tumor cells) to endogenous SIRPα that is expressed on immune cells (e.g., myeloid cells, macrophages and dendritic cells), thereby blocking CD47/SIRPα pathway, upregulating immune response, and promoting phagocytosis.

In some embodiments, the engineered SIRPα variants and protein constructs as described herein can increase immune response, activity or number of immune cells (e.g., myeloid cells, macrophages, dendritic cells, antigen presenting cells) by at least 10%, 20%, 30%, 40%, 50%, 60%, 70%, 80%, 90%, 100%, 2 folds, 3 folds, 5 folds, 10 folds, or 20 folds.

In some implementations, the engineered SIRPα variants and protein constructs can bind to SIRPα (e.g., human SIRPα, monkey SIRPα (e.g., cynomolgus monkey (*Macaca fascicularis*), mouse SIRPα) with a dissociation rate ($k_{off}$) of less than 0.1 s$^{-1}$, less than 0.01 s$^{-1}$, less than 0.001 s$^{-1}$, less than 0.0001 s$^{-1}$, or less than 0.00001 s$^{-1}$. In some embodiments, the dissociation rate ($k_{off}$) is greater than 0.01 s$^{-1}$, greater than 0.001 s$^{-1}$, greater than 0.0001 s$^1$, greater than 0.00001 s$^{-1}$, or greater than 0.000001 s$^{-1}$.

In some embodiments, kinetic association rates ($k_{on}$) is greater than 1×10$^2$/Ms, greater than 1×10$^3$/Ms, greater than 1×10$^4$/Ms, greater than 1×10$^5$/Ms, or greater than 1×10$^6$/Ms.

In some embodiments, kinetic association rates ($k_{on}$) is less than $1 \times 10^5$/Ms, less than $1 \times 10^6$/Ms, or less than $1 \times 10^7$/Ms.

Affinities can be deduced from the quotient of the kinetic rate constants (KD=$k_{off}/k_{on}$). In some embodiments, KD is less than $1 \times 10^{-6}$ M, less than $1 \times 10^{-7}$ M, less than $1 \times 10^{-8}$ M, less than $1 \times 10^{-9}$ M, or less than $1 \times 10^{-10}$ M. In some embodiments, the KD is less than 300 nM, 200 nM, 100 nM, 50 nM, 30 nM, 20 nM, 15 nM, 10 nM, 9 nM, 8 nM, 7 nM, 6 nM, 5 nM, 4 nM, 3 nM, 2 nM, 1 nM, 900 pM, 800 pM, 700 pM, 600 pM, 500 pM, 400 pM, 300 pM, 200 pM, 100 pM, 90 pM, 80 pM, 70 pM, 60 pM, 50 pM, 40 pM, 30 pM, 20 pM, or 10 pM. In some embodiments, KD is greater than $1 \times 10^{-7}$ M, greater than $1 \times 10^{-8}$ M, greater than $1 \times 10^{-9}$ M, greater than $1 \times 10^{-10}$ M, greater than $1 \times 10^{-11}$ M, or greater than $1 \times 10^{-12}$ M.

General techniques for measuring the affinity include, e.g., ELISA, RIA, and surface plasmon resonance (SPR). In some embodiments, the engineered SIRPα variants and protein constructs can bind to monkey SIRPα, and/or mouse SIRPα. In some embodiments, the engineered SIRPα variants and protein constructs cannot bind to monkey SIRPα, and/or mouse SIRPα.

In some embodiments, thermal stabilities are determined. The engineered SIRPα variants and protein constructs as described herein can have a Tm greater than 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95° C. In some embodiments, Tm is less than 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95° C.

In some embodiments, the engineered SIRPα variants and/or protein constructs as described herein has a tumor growth inhibition percentage (TGI %) that is greater than 10%, 20%, 30%, 40%, 50%, 60%, 70%, 80%, 90%, 100%, 110%, 120%, 130%, 140%, 150%, 160%, 170%, 180%, 190%, or 200%. In some embodiments, the engineered SIRPα variants and/or protein constructs as described herein has a tumor growth inhibition percentage that is less than 60%, 70%, 80%, 90%, 100%, 110%, 120%, 130%, 140%, 150%, 160%, 170%, 180%, 190%, or 200%. The TGI % can be determined, e.g., at 3, 4, 5, 6, 7, 8, 9, 10, 11, 12, 13, 14, 15, 16, 17, 18, 19, 20, 21, 22, 23, 24, 25, 26, 27, 28, 29, or 30 days after the treatment starts, or 1, 2, 3, 4, 5, 6, 7, 8, 9, 10, 11, or 12 months after the treatment starts. As used herein, the tumor growth inhibition percentage (TGI %) is calculated using the following formula:

$$TGI(\%) = [1 - (Ti - T0)/(Vi - V0)] \times 100$$

Ti is the average tumor volume in the treatment group on day i. T0 is the average tumor volume in the treatment group on day zero. Vi is the average tumor volume in the control group on day i. V0 is the average tumor volume in the control group on day zero.

In some embodiments, the tumor inhibitory effects of the engineered SIRPα variants and/or protein constructs as described herein are comparable to an anti-CD47 reference antibody, e.g., Hu5F9-G4, or an anti-SIRPα antibody, e.g., CC-95251. Hu5F9-G4 is described e.g., in Sikic et al. "First-in-human, first-in-class phase I trial of the anti-CD47 antibody Hu5F9-G4 in patients with advanced cancers." Journal of Clinical Oncology 37.12 (2019): 946, which is incorporated herein by reference in its entirety. CC-95251. In some embodiments, the tumor inhibitory effects of the engineered SIRPα variants and/or protein constructs as described herein are at least 10%, 20%, 30%, 40%, 50%, 60%, 70%, 80%, 90%, 1 fold, 2 folds, or 5 folds more than an anti-CD47 reference antibody, e.g., Hu5F9-G4, or an anti-SIRPα antibody, e.g., CC-95251. In some embodiments, the tumor inhibitory effects of the engineered SIRPα variants and/or protein constructs as described herein are at least 10%, 20%, 30%, 40%, 50%, 60%, 70%, 80%, 90%, 1 fold, 2 folds, or 5 folds more than Trillium. Details of hSIRPα-Fc-wt (Trillium), also named TTI-622. Amino acid sequence of hSIRPα-Fc-wt (Trillium) is shown in SEQ ID NO: 15.

In some embodiments, the protein constructs as described herein have a functional Fc region. In some embodiments, the Fc region is human IgG1, human IgG2, human IgG3, or human IgG4. In some embodiments, effector function of a functional Fc region is antibody-dependent cell-mediated cytotoxicity (ADCC). In some embodiments, effector function of a functional Fc region is phagocytosis. In some embodiments, effector function of a functional Fc region is ADCC and phagocytosis. In some embodiments, the protein constructs as described herein have an Fc region without effector function. In some embodiments, the Fc is a human IgG4 Fc. In some embodiments, the Fc does not have a functional Fc region. For example, the Fc region has LALA mutations (L234A and L235A mutations in EU numbering), or LALA-PG mutations (L234A, L235A, P329G mutations in EU numbering).

Some other modifications to the Fc region can be made. For example, a cysteine residue(s) can be introduced into the Fc region, thereby allowing interchain disulfide bond formation in this region. The homodimeric fusion protein thus generated may have any increased half-life in vitro and/or in vivo.

In some embodiments, the IgG4 has S228P mutation (EU numbering). The S228P mutation prevents in vivo and in vitro IgG4 Fab-arm exchange.

In some embodiments, Fc regions are provided having a carbohydrate structure that lacks fucose attached (directly or indirectly) to an Fc region. For example, the amount of fucose in such Fc region composition may be from 1% to 80%, from 1% to 65%, from 5% to 65% or from 20% to 40%. The amount of fucose is determined by calculating the average amount of fucose within the sugar chain at Asn297, relative to the sum of all glycostructures attached to Asn 297 (e.g. complex, hybrid and high mannose structures) as measured by MALDI-TOF mass spectrometry, as described in WO 2008/077546, for example. Asn297 refers to the asparagine residue located at about position 297 in the Fc region (Eu numbering of Fc region residues; or position 314 in Kabat numbering); however, Asn297 may also be located about ±3 amino acids upstream or downstream of position 297, i.e., between positions 294 and 300, due to minor sequence variations in Fc region sequences. Such fucosylation variants may have improved ADCC function. In some embodiments, to reduce glycan heterogeneity, the Fc region can be further engineered to replace the Asparagine at position 297 with Alanine (N297A).

In some embodiments, the binding affinity between CD47 (e.g., human CD47, monkey CD47, mouse CD47, or extracellular domains thereof) and the engineered SIRPα variants and/or protein constructs as described herein is at least 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, or 50-fold as compared to that between CD47 and a wild-type SIRPα or protein constructs thereof.

In some embodiments, the engineered SIRPα variants and/or protein constructs as described herein has a B/E ratio (CD47 binding $OD_{450}$ over expression $OD_{450}$) that is between 1 and 1.25, between 1.25 and 1.5, between 1.5 and 1.75, between 1.75 and 2, or greater than 2. In some instances, the B/E ratio is greater than 0.4.

In some embodiments, the main peak of HPLC-SEC accounts for at least 90%, 95%, 96%, 97%, 98%, 99%, or 99.5% of the engineered SIRPα variants and/or protein constructs as described herein after purification by a protein A column.

In some embodiments, the engineered SIRPα variants and/or protein constructs thereof as described herein can bind to human CD47-expressing tumor cells (e.g., human CD47 tf CHO-S cells, Jurkat cells, or Raji cells) with an affinity that is at least 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, or 50-fold as compared to that a wild-type SIRPα or protein constructs thereof. In some embodiments, the EC50 value of engineered SIRPα variants and/or protein constructs thereof to bind to human CD47-expressing tumor cells (e.g., human CD47 tf CHO-S cells) is less than 5 nM, less than 4 nM, less than 3.5 nM, less than 3 nM, less than 2.5 nM, less than 2 nM, less than 1.5 nM, or less than 1 nM. In some embodiments, the engineered SIRPα variants and/or protein constructs thereof as described herein can bind to monkey CD47-expressing cells (e.g., cynoCD47 tf CHO-S cells, or LLC-MK2 cells) with an affinity that is at least 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, or 50-fold as compared to that a wild-type SIRPα or protein constructs thereof. In some embodiments, the engineered SIRPα variants and/or protein constructs thereof as described herein can bind to mouse CD47-expressing cells (e.g., EMT-6 cells) with an affinity that is at least 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, or 50-fold as compared to that a wild-type SIRPα or protein constructs thereof.

In some embodiments, the engineered SIRPα variants and/or protein constructs thereof as described herein can bind to CD47-expressing tumor cells (e.g., CD47 tf CHO-S cells, Jurkat cells, or Raji cells) with an affinity that is at least 50%, at least 60%, at least 70%, at least 80%, at least 90%, at least 100%, at least 110%, at least 120%, at least 130%, at least 140%, or at least 150% as compared to that an anti-CD47 reference antibody (e.g., Hu5F9-G4).

In some embodiments, the engineered SIRPα variants and/or protein constructs thereof as described herein can bind to RBC cells or platelets (e.g., from human donors) with an affinity that is less than 90%, less than 80%, less than 70%, less than 60%, less than 50%, less than 40%, less than 30%, less than 20%, less than 10%, less than 5%, less than 3%, or less than 1% as compared to that of an anti-CD47 reference antibody (e.g., Hu5F9-G4). In some embodiments, the EC50 value of engineered SIRPα variants and/or protein constructs thereof to bind to RBC cells is less than 5 nM, less than 4 nM, less than 3 nM, less than 2.5 nM, less than 2 nM, less than 1.5 nM, less than 1 nM, or less than 0.5 nM. In some embodiments, the EC50 value of engineered SIRPα variants and/or protein constructs thereof to bind to platelets is less than 2 nM, less than 1 nM, less than 0.5 nM, less than 0.4 nM, less than 0.3 nM, less than 0.2 nM, or less than 0.1 nM.

In some embodiments, the engineered SIRPα variants and/or protein constructs thereof as described herein do not induce hemagglutination. In some embodiments, the engineered SIRPα variants and/or protein constructs thereof as described herein induce hemagglutination at a minimal concentration that is greater than 500-fold, 2000-fold, 5000-fold, 20000-fold, or 50000-fold as compared to that of an anti-CD47 reference antibody (e.g., Hu5F9-G4).

In some embodiments, the engineered SIRPα variants and/or protein constructs thereof as described herein can block the interaction between human CD47 and human SIRPα. In some embodiments, the engineered SIRPα variants and/or protein constructs thereof as described herein can block the interaction between human CD47-expressing cells (e.g., CD47 tf CHO-S cells, FaDu cells, or Raji cells) and human SIRPα. In some embodiments, the blocking ability of the engineered SIRPα variants and/or protein constructs thereof as described herein is at least at least 50%, at least 60%, at least 70%, at least 80%, at least 90%, at least 100%, at least 110%, at least 120%, at least 130%, at least 140%, or at least 150% as compared to that an anti-CD47 reference antibody (e.g., Hu5F9-G4). In some embodiments, the blocking ability of the engineered SIRPα variants and/or protein constructs thereof as described herein is at least 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, or 50-fold as compared to that a wild-type SIRPα or protein constructs thereof. In some embodiments, the IC50 value of engineered SIRPα variants and/or protein constructs thereof to block the CD47/SIRPα interaction is less than 2 nM, less than 1 nM, less than 0.5 nM, less than 0.4 nM, less than 0.3 nM, less than 0.2 nM, or less than 0.1 nM.

In some embodiments, the engineered SIRPα variants and/or protein constructs thereof as described herein can induce phagocytosis of CD47-expressing tumor cells (e.g., Jurkat cells, FaDu cells, or Raji cells) by mouse macrophages (e.g., Raw264.7 cells). In some embodiments, the EC50 value of engineered SIRPα variants and/or protein constructs thereof to induce phagocytosis of CD47-expressing tumor cells is less than 30 nM, less than 20 nM, less than 10 nM, less than 5 nM, less than 4 nM, less than 3 nM, less than 2 nM, or less than 1 nM. In some embodiments, EC50 values of engineered SIRPα variants and/or protein constructs thereof to induce phagocytosis of CD47-expressing tumor cells is comparable (e.g., at least 80%, 85%, 90%, or 95%) to that of an anti-CD47 reference antibody (e.g., Hu5F9-G4). In some embodiments, the engineered SIRPα variants and/or protein constructs thereof as described herein have a weaker ability to induce phagocytosis of RBC cells by mouse macrophages (e.g., Raw264.7 cells) than an anti-CD47 reference antibody (e.g., Hu5F9-G4). In some embodiments, the engineered SIRPα variants and/or protein constructs thereof as described herein have a weaker ability to induce phagocytosis of platelets by mouse macrophages (e.g., Raw264.7 cells) than an anti-CD47 reference antibody (e.g., Hu5F9-G4).

In some embodiments, the engineered SIRPα variants and/or protein constructs thereof as described herein can induce phagocytosis of CD47-expressing tumor cells (e.g., Raji cells, DLD1 cells, or Jurkat cells) by human macrophages (e.g., MDM cells). In some embodiments, the ability to induce phagocytosis of the engineered SIRPα variants and/or protein constructs thereof is comparable (at least 80%, 85%, 90%, or 95%) to that of an anti-CD47 reference antibody (e.g., Hu5F9-G4). In some embodiments, the ability to induce phagocytosis of the engineered SIRPα variants and/or protein constructs thereof is at least 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, or 50-fold as compared to that a wild-type SIRPα or protein constructs thereof. In some embodiments, the engineered SIRPα variants and/or protein constructs thereof as described herein have a weaker ability to induce phagocytosis of RBC cells by human macrophages (e.g., MDM cells) than an anti-CD47 reference antibody (e.g., Hu5F9-G4).

In some embodiments, the engineered SIRPα variants and/or protein constructs thereof as described herein can inhibit tumor growth. In some embodiments, Raji cells or NCI-H82 cells are injected to immuno-deficient mice (e.g., NOD/SCID mice) to generate a xenograft model.

Methods of Making Engineered SIRPα Variants and Protein Constructs

Variants of the SIRPα described herein can be prepared by introducing appropriate nucleotide changes into the DNA encoding a SIRPα peptide or a part thereof or by peptide synthesis. Such variants include, for example, deletions, insertions, or substitutions of residues within the amino acids sequences.

Screening can be performed. In a population of such variants, some engineered SIRPα variants will have increased affinity for the CD47. Any combination of deletions, insertions, and/or combinations can be made to arrive at a variant that has increased binding affinity for the target. The amino acid changes introduced into the variant can also alter or introduce new post-translational modifications into the polypeptide, such as changing (e.g., increasing or decreasing) the number of glycosylation sites, changing the type of glycosylation site (e.g., changing the amino acid sequence such that a different sugar is attached by enzymes present in a cell), or introducing new glycosylation sites.

Engineered SIRPα variants can be derived from any species of animal, including mammals. Non-limiting examples of SIRPα variants include SIRPα variants derived from humans, primates, e.g., monkeys and apes, cows, pigs, horses, sheep, camelids (e.g., camels and llamas), chicken, goats, and rodents (e.g., rats, mice, hamsters and rabbits).

The present disclosure also provides recombinant vectors (e.g., an expression vectors) that include an isolated polynucleotide disclosed herein (e.g., a polynucleotide that encodes a polypeptide disclosed herein), host cells into which are introduced the recombinant vectors (i.e., such that the host cells contain the polynucleotide and/or a vector comprising the polynucleotide), and the production of recombinant polypeptides or fragments thereof by recombinant techniques.

As used herein, a "vector" is any construct capable of delivering one or more polynucleotide(s) of interest to a host cell when the vector is introduced to the host cell. An "expression vector" is capable of delivering and expressing the one or more polynucleotide(s) of interest as an encoded polypeptide in a host cell into which the expression vector has been introduced. Thus, in an expression vector, the polynucleotide of interest is positioned for expression in the vector by being operably linked with regulatory elements such as a promoter, enhancer, and/or a poly-A tail, either within the vector or in the genome of the host cell at or near or flanking the integration site of the polynucleotide of interest such that the polynucleotide of interest will be translated in the host cell introduced with the expression vector.

A vector can be introduced into the host cell by methods known in the art, e.g., electroporation, chemical transfection (e.g., DEAE-dextran), transformation, transfection, and infection and/or transduction (e.g., with recombinant virus). Thus, non-limiting examples of vectors include viral vectors (which can be used to generate recombinant virus), naked DNA or RNA, plasmids, cosmids, phage vectors, and DNA or RNA expression vectors associated with cationic condensing agents.

In some implementations, a polynucleotide disclosed herein (e.g., a polynucleotide that encodes a polypeptide disclosed herein) is introduced using a viral expression system (e.g., vaccinia or other pox virus, retrovirus, or adenovirus), which may involve the use of a non-pathogenic (defective), replication competent virus, or may use a replication defective virus. Techniques for incorporating DNA into such expression systems are well known to those of ordinary skill in the art. The DNA may also be "naked." The uptake of naked DNA may be increased by coating the DNA onto biodegradable beads that are efficiently transported into the cells.

For expression, the DNA insert comprising a polypeptide-encoding polynucleotide disclosed herein can be operatively linked to an appropriate promoter (e.g., a heterologous promoter), such as the phage lambda PL promoter, the *E. coli* lac, trp and tac promoters, the SV40 early and late promoters and promoters of retroviral LTRs, to name a few. Other suitable promoters are known to the skilled artisan. In some embodiments, the promoter is a cytomegalovirus (CMV) promoter. The expression constructs can further contain sites for transcription initiation, termination and, in the transcribed region, a ribosome binding site for translation. The coding portion of the mature transcripts expressed by the constructs may include a translation initiating at the beginning and a termination codon (UAA, UGA, or UAG) appropriately positioned at the end of the polypeptide to be translated.

As indicated, the expression vectors can include at least one selectable marker. Such markers include dihydrofolate reductase or neomycin resistance for eukaryotic cell culture and tetracycline or ampicillin resistance genes for culturing in *E. coli* and other bacteria. Representative examples of appropriate hosts include, but are not limited to, bacterial cells, such as *E. coli, Streptomyces*, and *Salmonella typhimurium* cells; fungal cells, such as yeast cells; insect cells such as *Drosophila* S2 and *Spodoptera* Sf9 cells; animal cells such as CHO, COS, Bowes melanoma, and HK 293 cells; and plant cells. Appropriate culture mediums and conditions for the host cells described herein are known in the art.

Non-limiting vectors for use in bacteria include pQE70, pQE60 and pQE-9, available from Qiagen; pBS vectors, Phagescript vectors, Bluescript vectors, pNH8A, pNH16a, pNH18A, pNH46A, available from Stratagene; and ptrc99a, pKK223-3, pKK233-3, pDR540, pRIT5 available from Pharmacia. Non-limiting eukaryotic vectors include pWLNEO, pSV2CAT, pOG44, pXT1 and pSG available from Stratagene; and pSVK3, pBPV, pMSG and pSVL available from Pharmacia. Other suitable vectors will be readily apparent to the skilled artisan.

Non-limiting bacterial promoters suitable for use include the *E. coli* lacI and lacZ promoters, the T3 and T7 promoters, the gpt promoter, the lambda PR and PL promoters and the trp promoter. Suitable eukaryotic promoters include the CMV immediate early promoter, the HSV thymidine kinase promoter, the early and late SV40 promoters, the promoters of retroviral LTRs, such as those of the Rous sarcoma virus (RSV), and metallothionein promoters, such as the mouse metallothionein-I promoter.

In the yeast *Saccharomyces cerevisiae*, a number of vectors containing constitutive or inducible promoters such as alpha factor, alcohol oxidase, and PGH can be used.

Introduction of the construct into the host cell can be effected by calcium phosphate transfection, DEAE-dextran mediated transfection, cationic lipid-mediated transfection, electroporation, transduction, infection or other methods.

Such methods are described in many standard laboratory manuals, such as Davis et al., Basic Methods In Molecular Biology (1986), which is incorporated herein by reference in its entirety.

Transcription of DNA encoding a polypeptide of the present disclosure by higher eukaryotes may be increased by inserting an enhancer sequence into the vector. Enhancers are cis-acting elements of DNA, usually about from 10 to 300 bp that act to increase transcriptional activity of a promoter in a given host cell-type. Examples of enhancers include the SV40 enhancer, which is located on the late side of the replication origin at base pairs 100 to 270, the cytomegalovirus early promoter enhancer, the polyoma enhancer on the late side of the replication origin, and adenovirus enhancers.

For secretion of the translated protein into the lumen of the endoplasmic reticulum, into the periplasmic space or into the extracellular environment, appropriate secretion signals may be incorporated into the expressed polypeptide. The signals may be endogenous to the polypeptide or they may be heterologous signals.

The polypeptide (e.g., SIRPα variants) can be expressed in a modified form, such as a fusion protein (e.g., a GST-fusion) or with a histidine-tag, and may include not only secretion signals, but also additional heterologous functional regions. For instance, a region of additional amino acids, particularly charged amino acids, may be added to the N-terminus of the polypeptide to improve stability and persistence in the host cell, during purification, or during subsequent handling and storage. Also, peptide moieties can be added to the polypeptide to facilitate purification. Such regions can be removed prior to final preparation of the polypeptide. The addition of peptide moieties to polypeptides to engender secretion or excretion, to improve stability and to facilitate purification, among others, are familiar and routine techniques in the art.

Methods of Treatment

The engineered SIRPα variants and protein constructs of the present disclosure can be used for various therapeutic purposes.

In one aspect, the disclosure provides methods for treating a cancer in a subject, methods of reducing the rate of the increase of volume of a tumor in a subject over time, methods of reducing the risk of developing a metastasis, or methods of reducing the risk of developing an additional metastasis in a subject. In some embodiments, the treatment can halt, slow, retard, or inhibit progression of a cancer. In some embodiments, the treatment can result in the reduction of in the number, severity, and/or duration of one or more symptoms of the cancer in a subject.

In one aspect, the disclosure features methods that include administering a therapeutically effective amount of engineered SIRPα variants and protein constructs disclosed herein to a subject in need thereof (e.g., a subject having, or identified or diagnosed as having, a cancer), e.g., breast cancer (e.g., triple-negative breast cancer), carcinoid cancer, cervical cancer, endometrial cancer, glioma, head and neck cancer, liver cancer, lung cancer, small cell lung cancer, lymphoma, melanoma, ovarian cancer, pancreatic cancer, prostate cancer, renal cancer, colorectal cancer, gastric cancer, testicular cancer, thyroid cancer, bladder cancer, urethral cancer, or hematologic malignancy. In some embodiments, the cancer is unresectable melanoma or metastatic melanoma, non-small cell lung carcinoma (NSCLC), small cell lung cancer (SCLC), bladder cancer, or metastatic hormone-refractory prostate cancer. In some embodiments, the subject has a solid tumor. In some embodiments, the cancer is squamous cell carcinoma of the head and neck (SCCHN), renal cell carcinoma (RCC), triple-negative breast cancer (TNBC), or colorectal carcinoma. In some embodiments, the cancer is melanoma, pancreatic carcinoma, mesothelioma, hematological malignancies, especially Non-Hodgkin's lymphoma, lymphoma, chronic lymphocytic leukemia, or advanced solid tumors.

In some embodiments, the compositions and methods disclosed herein can be used for treatment of patients at risk for a cancer. Patients with cancer can be identified with various methods known in the art.

As used herein, by an "effective amount" is meant an amount or dosage sufficient to effect beneficial or desired results including halting, slowing, retarding, or inhibiting progression of a disease, e.g., a cancer. An effective amount will vary depending upon, e.g., an age and a body weight of a subject to which the engineered SIRPα variants and protein constructs, vector comprising the polynucleotide encoding the engineered SIRPα variants and protein constructs, and/or compositions thereof is to be administered, a severity of symptoms and a route of administration, and thus administration can be determined on an individual basis.

An effective amount can be administered in one or more administrations. By way of example, an effective amount of the engineered SIRPα variants and/or protein constructs is an amount sufficient to ameliorate, stop, stabilize, reverse, inhibit, slow and/or delay progression of a cancer in a patient or is an amount sufficient to ameliorate, stop, stabilize, reverse, slow and/or delay proliferation of a cell (e.g., a biopsied cell, any of the cancer cells described herein, or cell line (e.g., a cancer cell line)) in vitro. As is understood in the art, an effective amount may vary, depending on, inter alia, patient history as well as other factors such as the type (and/or dosage) of the engineered SIRPα variants and protein constructs used.

Effective amounts and schedules for administering the engineered SIRPα variants and protein constructs, the polynucleotides encoding the engineered SIRPα variants and protein constructs, and/or compositions disclosed herein may be determined empirically, and making such determinations is within the skill in the art. Those skilled in the art will understand that the dosage that must be administered will vary depending on, for example, the mammal that will receive the engineered SIRPα variants and protein constructs, the polynucleotides, and/or compositions disclosed herein, the route of administration, the particular type of polynucleotides, and/or compositions disclosed herein used and other drugs being administered to the mammal.

A typical daily dosage of an effective amount of the engineered SIRPα variants and/or protein constructs is 0.1 mg/kg to 100 mg/kg (mg per kg of patient weight). In some embodiments, the dosage can be less than 100 mg/kg, 10 mg/kg, 9 mg/kg, 8 mg/kg, 7 mg/kg, 6 mg/kg, 5 mg/kg, 4 mg/kg, 3 mg/kg, 2 mg/kg, 1 mg/kg, 0.5 mg/kg, or 0.1 mg/kg. In some embodiments, the dosage can be greater than 10 mg/kg, 9 mg/kg, 8 mg/kg, 7 mg/kg, 6 mg/kg, 5 mg/kg, 4 mg/kg, 3 mg/kg, 2 mg/kg, 1 mg/kg, 0.5 mg/kg, or 0.1 mg/kg. In some embodiments, the dosage is about 10 mg/kg, 9 mg/kg, 8 mg/kg, 7 mg/kg, 6 mg/kg, 5 mg/kg, 4 mg/kg, 3 mg/kg, 2 mg/kg, or 1 mg/kg. In some embodiments, the dosage is about 1 to 10 mg/kg, about 1 to 5 mg/kg, or about 2 to 5 mg/kg.

In any of the methods described herein, the engineered SIRPα variants and protein constructs can be administered to the subject at least once a week (e.g., once a week, twice a week, three times a week, four times a week, once a day, twice a day, or three times a day).

In some embodiments, the one or more additional therapeutic agents can be administered to the subject prior to, or after administering the engineered SIRPα variants and protein constructs. In some embodiments, the one or more additional therapeutic agents are administered to the subject such that there is an overlap in the bioactive period of the one or more additional therapeutic agents and the engineered SIRPα variants and protein constructs in the subject.

In some embodiments, one or more additional therapeutic agents can be administered to the subject. The additional therapeutic agent can comprise one or more inhibitors selected from the group consisting of an inhibitor of B-Raf, an EGFR inhibitor, an inhibitor of a MEK, an inhibitor of ERK, an inhibitor of K-Ras, an inhibitor of c-Met, an inhibitor of anaplastic lymphoma kinase (ALK), an inhibitor of a phosphatidylinositol 3-kinase (PI3K), an inhibitor of an Akt, an inhibitor of mTOR, a dual PI3K/mTOR inhibitor, an inhibitor of Bruton's tyrosine kinase (BTK), and an inhibitor of Isocitrate dehydrogenase 1 (IDH1) and/or Isocitrate dehydrogenase 2 (IDH2). In some embodiments, the additional therapeutic agent is an inhibitor of indoleamine 2,3-dioxygenase-1) (IDO1) (e.g., epacadostat).

In some embodiments, the additional therapeutic agent can comprise one or more inhibitors selected from the group consisting of an inhibitor of HER3, an inhibitor of LSD1, an inhibitor of MDM2, an inhibitor of BCL2, an inhibitor of CHK1, an inhibitor of activated hedgehog signaling pathway, and an agent that selectively degrades the estrogen receptor.

In some embodiments, the additional therapeutic agent can comprise one or more therapeutic agents selected from the group consisting of trabectedin, nab-paclitaxel, trebananib, pazopanib, cediranib, palbociclib, everolimus, fluoropyrimidine, IFL, regorafenib, Reolysin® (pelareorep), Alimta® (pemetrexed), Zykadia® (ceritinib), Sutent® (sunitinib malate), temsirolimus, axitinib, everolimus, sorafenib, Votrient® (pazopanib), IMA-901, AGS-003, cabozantinib, vinflunine, an Hsp90 inhibitor, Ad-GM-CSF, temazolomide, IL-2 (interleukin-2), IFNa (interferon alfa), vinblastine, Thalomid® (thalidomide), dacarbazine, cyclophosphamide, lenalidomide, azacytidine, lenalidomide, bortezomid, amrubicin, carfilzomib, pralatrexate, and enzastaurin.

In some embodiments, the additional therapeutic agent can comprise one or more therapeutic agents selected from the group consisting of an adjuvant, a TLR agonist, tumor necrosis factor (TNF) alpha, IL-1, HMGB1, an IL-10 antagonist, an IL-4 antagonist, an IL-13 antagonist, an IL-17 antagonist, an HVEM antagonist, an ICOS agonist, a treatment targeting CX3CL1, a treatment targeting CXCL9, a treatment targeting CXCL10, a treatment targeting CCL5, an LFA-1 agonist, an ICAM1 agonist, and a Selectin agonist.

In some embodiments, carboplatin, nab-paclitaxel, paclitaxel, cisplatin, pemetrexed, gemcitabine, FOLFOX, or FOLFIRI are administered to the subject.

In some embodiments, the additional therapeutic agent is an anti-OX40 antibody, an anti-PD-1 antibody, an anti-PD-L1 antibody, an anti-PD-L2 antibody, an anti-SIRPα antibody, an anti-CD47 antibody, an anti-LAG-3 antibody, an anti-TIGIT antibody, an anti-BTLA antibody, an anti-CTLA-4 antibody, or an anti-GITR antibody. In some embodiments, the additional therapeutic agent is an anti-CD20 antibody (e.g., rituximab) or an anti-EGF receptor antibody (e.g., cetuximab).

Pharmaceutical Compositions and Routes of Administration

Also provided herein are pharmaceutical compositions that contain the engineered SIRPα variants and protein constructs described herein. The pharmaceutical compositions can be formulated in any manner known in the art.

Pharmaceutical compositions are formulated to be compatible with their intended route of administration (e.g., intravenous, intraarterial, intramuscular, intradermal, subcutaneous, or intraperitoneal). The compositions can include a sterile diluent (e.g., sterile water or saline), a fixed oil, polyethylene glycol, glycerine, propylene glycol or other synthetic solvents, antibacterial or antifungal agents, such as benzyl alcohol or methyl parabens, chlorobutanol, phenol, ascorbic acid, thimerosal, and the like, antioxidants, such as ascorbic acid or sodium bisulfite, chelating agents, such as ethylenediaminetetraacetic acid, buffers, such as acetates, citrates, or phosphates, and isotonic agents, such as sugars (e.g., dextrose), polyalcohols (e.g., mannitol or sorbitol), or salts (e.g., sodium chloride), or any combination thereof. Liposomal suspensions can also be used as pharmaceutically acceptable carriers. Preparations of the compositions can be formulated and enclosed in ampules, disposable syringes, or multiple dose vials. Where required (as in, for example, injectable formulations), proper fluidity can be maintained by, for example, the use of a coating, such as lecithin, or a surfactant. Absorption of the agents can be prolonged by including an agent that delays absorption (e.g., aluminum monostearate and gelatin). Alternatively, controlled release can be achieved by implants and microencapsulated delivery systems, which can include biodegradable, biocompatible polymers (e.g., ethylene vinyl acetate, polyanhydrides, polyglycolic acid, collagen, polyorthoesters, and polylactic acid).

Compositions containing the engineered SIRPα variants and protein constructs described herein can be formulated for parenteral (e.g., intravenous, intraarterial, intramuscular, intradermal, subcutaneous, or intraperitoneal) administration in dosage unit form (i.e., physically discrete units containing a predetermined quantity of active compound for ease of administration and uniformity of dosage).

Pharmaceutical compositions for parenteral administration are preferably sterile and substantially isotonic and manufactured under Good Manufacturing Practice (GMP) conditions. Pharmaceutical compositions can be provided in unit dosage form (i.e., the dosage for a single administration). Pharmaceutical compositions can be formulated using one or more physiologically acceptable carriers, diluents, excipients or auxiliaries. The formulation depends on the route of administration chosen. For injection, the engineered SIRPα variants and protein constructs can be formulated in aqueous solutions, preferably in physiologically-compatible buffers to reduce discomfort at the site of injection. The solution can contain formulatory agents such as suspending, stabilizing and/or dispersing agents. Alternatively the engineered SIRPα variants and protein constructs can be in lyophilized form for constitution with a suitable vehicle, e.g., sterile pyrogen-free water, before use.

Toxicity and therapeutic efficacy of compositions can be determined by standard pharmaceutical procedures in cell cultures or experimental animals (e.g., monkeys). One can, for example, determine the LD50 (the dose lethal to 50% of the population) and the ED50 (the dose therapeutically effective in 50% of the population): the therapeutic index being the ratio of LD50:ED50. Agents that exhibit high therapeutic indices are preferred. Where an agent exhibits an undesirable side effect, care should be taken to minimize potential damage (i.e., reduce unwanted side effects). Toxicity and therapeutic efficacy can be determined by other standard pharmaceutical procedures.

Exemplary doses include milligram or microgram amounts of any of the engineered SIRPα variants and protein constructs described herein per kilogram of the subject's weight (e.g., about 1 μg/kg to about 500 mg/kg; about 100 μg/kg to about 500 mg/kg; about 100 μg/kg to about 50 mg/kg; about 10 μg/kg to about 5 mg/kg; about 10 μg/kg to about 0.5 mg/kg; about 1 μg/kg to about 50 μg/kg; about 1 mg/kg to about 10 mg/kg; or about 1 mg/kg to about 5 mg/kg). While these doses cover a broad range, one of ordinary skill in the art will understand that therapeutic agents can vary in their potency, and effective amounts can be determined by methods known in the art. Typically, relatively low doses are administered at first, and the attending health care professional or veterinary professional (in the case of therapeutic application) or a researcher (when still working at the development stage) can subsequently and gradually increase the dose until an appropriate response is obtained. In addition, it is understood that the specific dose level for any particular subject will depend upon a variety of factors including the activity of the specific compound employed, the age, body weight, general health, gender, and diet of the subject, the time of administration, the route of administration, the rate of excretion, and the half-life of the engineered SIRPα variants and protein constructs in vivo.

The pharmaceutical compositions can be included in a container, pack, or dispenser together with instructions for administration. The disclosure also provides methods of manufacturing the engineered SIRPPa variants and protein constructs for various uses as described herein.

EXAMPLES

The invention is further described in the following examples, which do not limit the scope of the invention described in the claims.

Example 1. Design of Engineered IgV Domain of Human SIRPα

The IgV domain of human SIRPα (hSIRPα) belongs to the immunoglobulin superfamily which contains nine β-strands, including A-B-C-C'-D-E-F-G-G2. A helix is located between the E strand and F strand. The 3D structure of the hSIRPα IgV domain is shown in FIG. 1.

A detailed analysis of CD47/hSIRPα complex structure was performed. From the structure, it was determined that Leu30, Gly34, Gln52, Lys53, Glu54, His56, Ser66, Thr67, Arg69, Lys93, Lys96, Gly97, and Asp100 in hSIRPα are involved in the interaction with CD47. These interacting residues were located mainly on the loop structure of hSIRPa including BC loop, C'D loop, DE loop, and FG loop. The results indicated that hSIRPa interacts with CD47 mainly through its loop regions (FIG. 2).

In addition, the structure of hSIRPa-FD6 has been solved (Weiskopf, Kipp, et al. Science 2013 Jul. 5; 341(6141)). It was determined that the interacting residues of hSIRPa-FD6 to CD47 based on CD47/hSIRPα-FD6 complex structure (PDB ID: 4KJY) include Leu30, Gly34, Gln52, Arg53, Glu54, His56, Thr66, Thr67, Arg69, Lys93, Lys96, Gly97, and Asp100. These resides are the same as those showed in CD47/hSIRPa complex. The only two interacting residues, Lys53 and Ser66, in wild type are mutated to Arg53 and Thr66 in hSIRPa-FD6, respectively and resulting in dramatically increase of binding affinity to CD47. Other changed residues from hSIRPa to hSIRPa-FD6 are not involved in CD47 interaction. This finding implied Lys53 and Ser66 can be important for increasing binding affinity of hSIRPa to CD47.

Figures 3A, 3B, 3C, 3D:
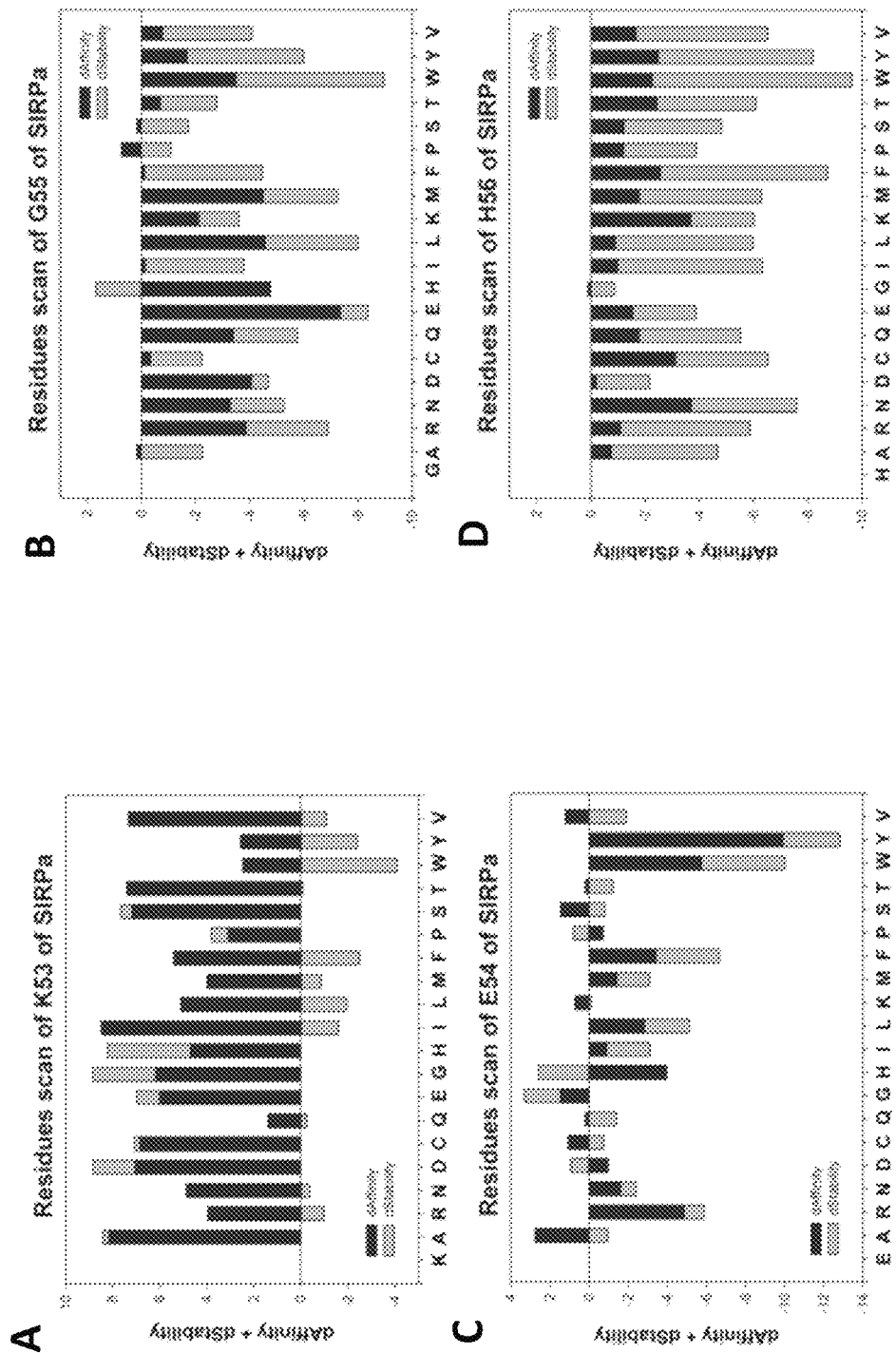
FIGS. 3A-3D show residue scan results for K53, G55, E54, and H56.

In order to find out which residues are good for binding affinity and stable in C'D loop, residues scan for position 53, 54, 55, and 56 were performed by MOE trial version. According to the results from residue scanning, Lys53 can increase stability when it is replaced by an amino acid with long side chain or the side chain with aromatic ring such as Arginine, Leucine, Phenylalanine, Tryptophan, and Tyrosine (FIG. 3A). However, this kind of replacement cannot improve the affinity of hSIRPa. On the other hand, the replacement of Glu54, Gly55, and His56 showed more flexibility (FIGS. 3B, 3C, and 3D), the affinity and stability of hSIRPa can be improved by changing Glu54, Gly55, and His56 to some other amino acids. Thus, mutations were introduced to Glu54, Gly55, and His56 for screening.

In addition, Ile31, Glu54, Gly55, His56, Ser66, and Thr67 were identified as candidate amino acids for hSIRPa mutation screening via structural analysis. Val27, Val63, and Lys68 are involved in maintaining the structure of hSIRPa itself. In order not to negatively affect the structure of hSIRPa, those residues are not suggested to change. Based on the structure of human CD47 (hCD47) in complex with hSIRPα (PDB ID: 2JJT), the interacting residues were analyzed. The analysis results show that multiple interacting residues within the BC loop, C'D loop, and DE loop of the hSIRPα IgV domain are highly conserved. As shown in FIG. 2, amino acid residues within these loop regions are underlined.

In order to screen hSIRPα IgV domain mutants having higher blocking activity than wild-type hSIRPα to hCD47 (e.g., with different binding affinity to hCD47), and lower RBC binding as compared to the anti-CD47 reference antibody Hu5F9-G4, selected residues within the BC loop, C'D loop, and DE loop of hSIRPα IgV domain were mutated. These residues include 10 amino acids of His24-Val33 within the BC loop (e.g., Ile31), 3 amino acids of Glu54-His56 within the C'D loop, and 8 amino acids of Ser66-Asp73 within the DE loop (e.g., Ser66 and Thr67). The amino acid position is based on IgV domain of hSIRPα (SEQ ID NO: 1).

Example 2. Screening and Re-Confirmation

The phagemid expression system was used for screening by phage display. Specifically, CD47 antigens or cell lines expressing CD47 were used for panning. The obtained phages were used to re-infect TG1 electroporation-competent *E. coli* cells, which were then spread onto a LB agar plate and incubated for 16 hours. Single colonies were picked to inoculate 700 μl 2×YT medium supplemented with 10% buffered phosphate. When $OD_{600}$ was close to 1, 1 mM Isopropyl β-d-1-thiogalactopyranoside (IPTG) was added to induce protein expression at 30° C. After 16 hours, the bacteria culture was centrifuged at 3200 g and the supernatant was collected for subsequent experiments.

Determination of Expression Level

To determine the expression level of the hSIRPα IgV domain mutants, ELISA plates coated with 2 μg/ml anti-His antibody (R&D, Cat #: MAB050-500) were prepared. 30 μl of the collected supernatant was added to the ELISA plates and incubated at 25° C. for 1 hour. After the incubation, goat anti-c-Myc HRP (Bethy, Cat #: A190-104P) with a dilution ratio of 1:10000 was added to the plate, and 3,3',5,5'-Tetramethylbenzidine (TMB) (SURMODICS, Cat #: TMBW-0100-01) was added for color development. The absorbance value at 450 nm ($OD_{450}$) was measured using a Varioskan™ LUX plate reader (Thermo).

Determination of Human CD47 Binding Ability

To determine the human CD47 binding ability of the hSIRPα IgV domain mutants, ELISA plates coated with 1 μg/ml human CD47 extracellular domain (ECD) connected with an Fc region (hCD47 ECD Fc) were prepared. 30 μl of the collected supernatant was added to the ELISA plates and incubated at 25° C. for 1 hour. After the incubation, goat anti-c-Myc HRP with a dilution ratio of 1:10000 was added to the plate, and TMB was added for color development. The absorbance value at 450 nm was measured using a Varioskan™ LUX plate reader.

Determination of Mouse CD47 Binding Ability

To determine the mouse CD47 binding ability of the hSIRPα IgV domain mutants, ELISA plates coated with 1 μg/ml mouse CD47 ECD Fc (Sino Bio, Cat #: 57231-M31H) were prepared. 100 μl of the collected supernatant was added to the ELISA plates and incubated at 25° C. for 1 hour. After the incubation, goat anti-c-Myc HRP with a dilution ratio of 1:10000 was added to the plate, and TMB was added for color development. The absorbance value at 450 nm was measured using a Varioskan™ LUX plate reader.

Determination of hCD47 hSIRPα Blocking Ability

To determine the hCD47/hSIRPα blocking ability of hSIRPα IgV domain mutants, ELISA plates coated with 1 μg/ml human CD47 ECD Fc were prepared. 150 μl of the collected supernatant and 20 μl biotin-labeled SIRPα ECD His protein (final concentration: 2.5 μg/ml) were added to the ELISA plates and incubated at 25° C. for 1 hour. After the incubation, avidin HRP (BioLegend, Cat #: 79004) with a dilution ratio of 1:1000 was added to the plate, and TMB was added for color development. The absorbance value at 450 nm was measured using a Varioskan™ LUX plate reader.

Determination of Protein Thermostability

100 μl of the collected supernatant was transferred to a PCR tube, which was heated in a PCR machine at 65° C. or 70° C. for 90 minutes. The human CD47 binding assays were performed using the heated and unheated supernatants simultaneously. Specifically, ELISA plates coated with 1 μg/ml human CD47 ECD Fc were prepared. 30 μl of the heated or unheated supernatant was added to the ELISA plates and incubated at 25° C. for 1 hour. After the incubation, goat anti-c-Myc HRP with a dilution ratio of 1:10000 was added to the plate, and TMB was added for color development. The absorbance value at 450 nm was measured using a Varioskan™ LUX plate reader.

Determination of the Whole Cell Binding Ability to CD47 tf CHO-S, RBC, and Platelet $3 \times 10^4$ CD47 tf CHO-S cells (transfected CHO-S cells expressing human CD47), $1 \times 10^5$ human red blood cells (RBCs), or $3 \times 10^5$ human platelets were incubated with the collected supernatant at 4° C. for 30 minutes. Anti-His PE (Abcam, Cat #: ab72467) with a dilution ratio of 1:100 was then added, and a flow cytometer (Beckman Coulter, Cat #: CytoFlex) was used to detect the MFI (mean fluorescence intensity) values.

Figure 5:
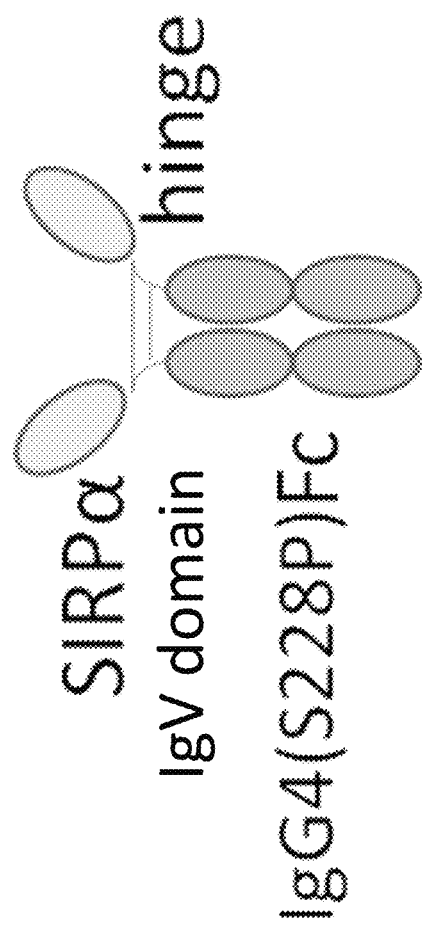
FIG. 5 shows a schematic structure of hSIRPα-Fc proteins. Two SIRPα IgV domains are connected to the N-terminus of human IgG4 hinge and Fc regions.

Clones with a higher hCD47/hSIRPα blocking ability than wild-type hSIRPα were isolated and grouped based on their human CD47 binding $OD_{450}$ (B)/expression $OD_{450}$ (E) ratio. Specifically, 12 clones had a hCD47 binding B/E ratio over 2; 5 clones had this ratio between 1.75 and 2; 5 clones had this ratio between 1.5 and 1.75; 7 clones had this ratio between 1.25 and 1.5; and 2 clones had this ratio between 1 and 1.25. 7 clones with the B/E ratio less than wild-type hSIRPα IgV domain were also selected. Because human SIRPα does not have cross-reactivity to mouse CD47, 18 clones with their mouse CD47 binding ability over expression ratio above 0.4 were also selected through this screening. Thus, a total of 56 candidate clones were selected with detailed expression, hCD47/hSIRPα blocking, and CD47 binding results shown in FIGS. 4A-4B.

Next, the selected clones were further screened by determining the whole cell binding ability to CD47 tf CHO-S, RBC and platelet, as well as the protein thermostability at high temperatures (e.g., 65° C. and 70° C.). Based on the results of the whole cell binding assays, clones with platelet and RBC binding ability less than that of wild-type hSIRPα IgV domain, and clones that can bind to CD47 tf CHO-S with different binding abilities were selected. The protein thermostability of the selected clones were verified and no significant difference was observed as compared to that of the wild-type SIRPα IgV domain. Finally, 21 clones were selected, including mt3-mt15 (SEQ ID NOs: 2-14) and mt16-mt23 (SEQ ID NOs: 33-40). 5 additional clones were also generated, including mt31-mt35 (SEQ ID NOs: 41-45). Plasmids were constructed to express wild-type SIRPPα IgV domain or engineered SIRPα IgV domain mutants connected to human IgG4 hinge and Fc regions (SEQ ID NO: 29). The schematic structure of the expressed proteins are shown in FIG. 5. Specific amino acid mutations within the BC loop region, C'D loop region, and DE loop region of the wild-type SIRPα IgV domain and 26 clones are shown in FIG. 6.

Example 3. Purification and Binding Affinity Determination of hSIRPα-Fc to CD47-ECD-His by Octet The expressed proteins were purified by a protein A column, followed by HPLC-SEC (high-performance liquid chromatography coupled with size exclusion chromatography; Agilent), and the percentage of high molecular weight peaks (HMW %), the percentage of the main peak (Main %), and the percentage of low molecular weight peaks (LMW %) were measured. As shown in FIG. 7, the hSIRPα-Fc mutant proteins can be harvested using the method above with high purity. The amino acid sequences of hSIRPα-Fc-wt and the 13 hSIRPα-Fc mutant proteins (mt3-mt15) were analyzed using the deimmunization tool (Immune Epitope Database And Analysis Resource; Dhanda et al. "Development of a strategy and computational application to select candidate protein analogues with reduced HLA binding and immunogenicity." Immunology 153.1 (2018): 118-132) to identify immunogenic regions. No immunogenicity was identified.

The binding affinity of the hSIRPα-Fc proteins to CD47-ECD-His was also determined by an Octet® system. As shown in FIG. 8, two sets of experiments were performed with hSIRPα-Fc-wt as a negative control and the anti-CD47 reference antibody Hu5F9-G4 as a positive control. The relative binding affinity of each protein was also deduced from the respective KD value in comparison with the KD value of hSIRPα-Fc-wt. The results indicate that most of engineered SIRPα IgV domain mutants exhibited a stronger binding to CD47 as compared to the wild-type SIRPα IgV domain.

Example 4. Whole Cell Bind Assays to CD47 tf CHO-S and CD47-Expressing Tumor Cells To determine the whole cell binding ability of the hSIRPα-Fc mutant proteins to CD47, the hSIRPα-Fc mutant proteins were purified by protein A chromatography, and serially diluted (5-fold) from 500 nM to 100 nM, 20 nM, 4 nM, 0.8 nM, 0.16 nM, 0.032 nM, and 0.064 nM. PD1-Fc-wt (two human PD1 extracellular domains connected to the N-terminus of human IgG4 with a schematic structure shown in FIG. 5) was used as a negative control. Hu5F9-G4 was used as a positive control. The diluted proteins were incubated with $5 \times 10^4$ CD47 tf CHO-S cells, Jurkat cells, or Raji cells. After the incubation, anti-hFcr-PE (1:100, Invitrogen, Cat #: 109-115-098) was added and MFI values were measured by flow cytometry.

As shown in FIGS. 9A-9C, hSIRPα-Fc-mt4, hSIRPα-Fc-mt8, hSIRPα-Fc-mt10, hSIRPα-Fc-mt11, hSIRPα-Fc-mt12, hSIRPα-Fc-mt13, and hSIRPα-Fc-15 exhibited a similar whole cell binding ability against CD47 tf CHO-S, Jurkat, and Raji cells, as compared to the anti-CD47 antibody Hu5F9-G4.

As shown in FIG. 9D, hSIRPα-Fc-mt10, hSIRPα-Fc-mt15, hSIRPα-Fc-mt16, hSIRPα-Fc-mt19, and hSIRPα-Fc-mt22 exhibited a higher CD47 tf CHO-S cell binding ability than hSIRPα-Fc-mt17, hSIRPα-Fc-mt18, hSIRPα-Fc-mt19, and Hu5F9-G4. In addition, all tested hSIRPα-Fc mutant proteins showed a significantly higher CD47 tf CHO-S cell binding ability than hSIRPα-Fc-wt. EC50 values for the tested hSIRPα-Fc proteins are listed in the table below.

TABLE 1

EC50 values for CD47 tf CHO-S cell binding

| Protein | EC50 (nM) |
|---|---|
| Hu5F9-G4 | ~2.387 |
| hSIRPα-Fc-wt (Trillium) | 3.351 |
| hSIRPα-Fc-mt10 | 1.458 |
| hSIRPα-Fc-mt15 | 1.556 |
| hSIRPα-Fc-mt16 | 1.918 |
| hSIRPα-Fc-mt17 | 2.111 |
| hSIRPα-Fc-mt18 | 2.374 |
| hSIRPα-Fc-mt19 | 1.679 |
| hSIRPα-Fc-mt21 | 2.078 |
| hSIRPα-Fc-mt22 | 1.914 |

As shown in FIG. 9E, hSIRPα-Fc-mt10 and hSIRPα-Fc-mt15 exhibited a higher Raji cell binding ability than hSIRPα-Fc-mt21, hSIRPα-Fc-mt16, and hSIRPα-Fc-mt23. All tested hSIRPα-Fc mutant proteins exhibited a similar Raji cell binding ability as compared to Hu5F9-G4 and a significantly higher Raji cell binding ability as compared to hSIRPα-Fc-wt.

Example 5. RBC Binding Assays

To determine the RBC binding ability of the hSIRPα-Fc mutant proteins, the hSIRPα-Fc mutant proteins were purified by protein A chromatography, and serially diluted (5-fold) from 500 nM to 100 nM, 20 nM, 4 nM, 0.8 nM, 0.16 nM, 0.032 nM, and 0.064 nM. PD1-Fc-wt was used as a negative control. Hu5F9-G4 was used as a positive control. The diluted proteins were incubated with $1 \times 10^5$ human RBC cells from two donors. After the incubation, anti-hFcr-PE (1:100, Invitrogen) was added and MFI values were measured by flow cytometry.

Figure 10A:
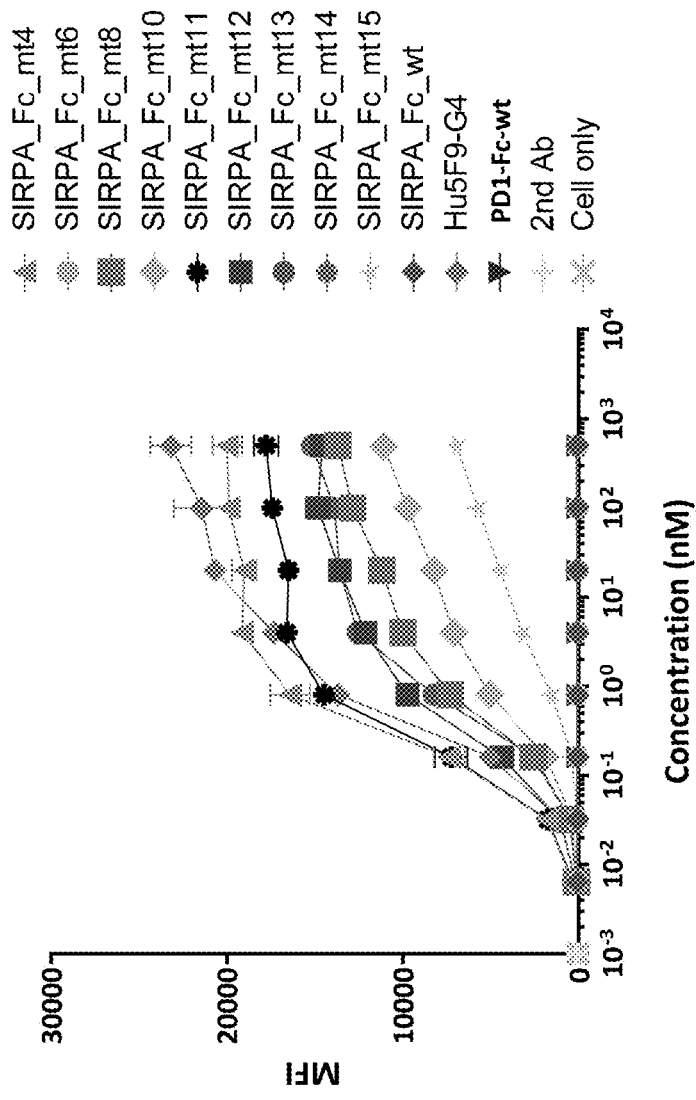
Figure 10B:
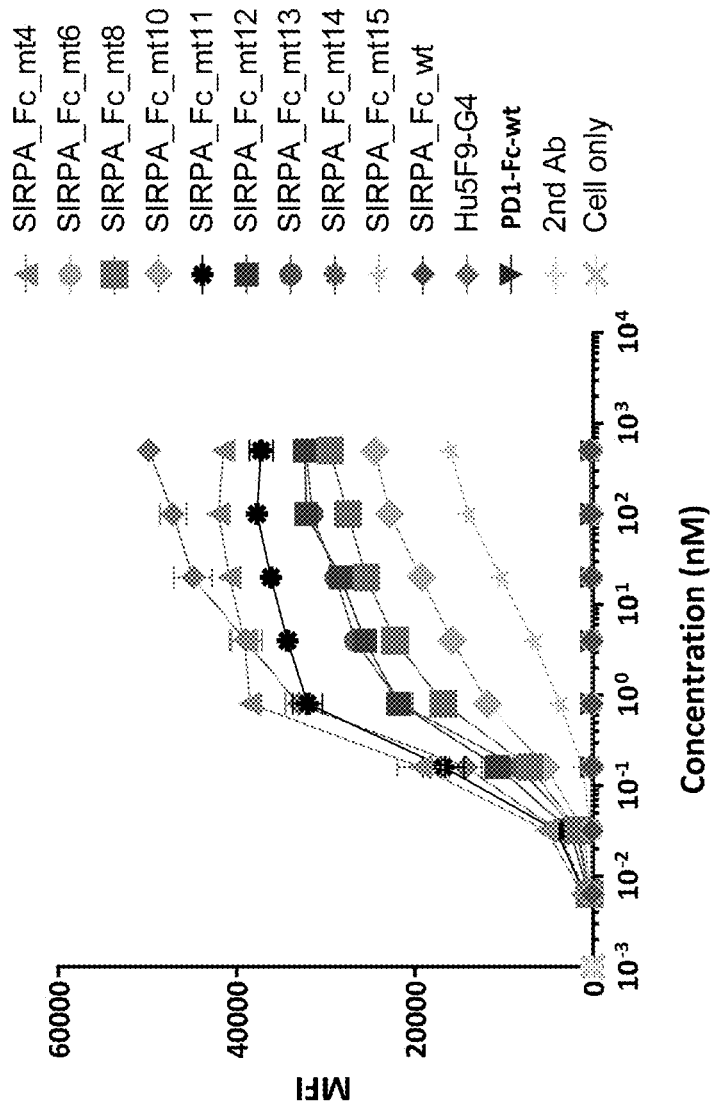

As shown in FIGS. 10A-10B, hSIRPα-Fc-mt12, hSIRPα-Fc-mt13, hSIRPα-Fc-mt8, hSIRPα-Fc-mt10, and hSIRPα-Fc-mt15 exhibited a weaker RBC binding ability as compared to the anti-CD47 antibody Hu5F9-G4. In particular, hSIRPα-Fc-mt6, hSIRPα-Fc-mt14, and hSIRPα-Fc-wt did not show any binding to RBC.

Figure 10C:
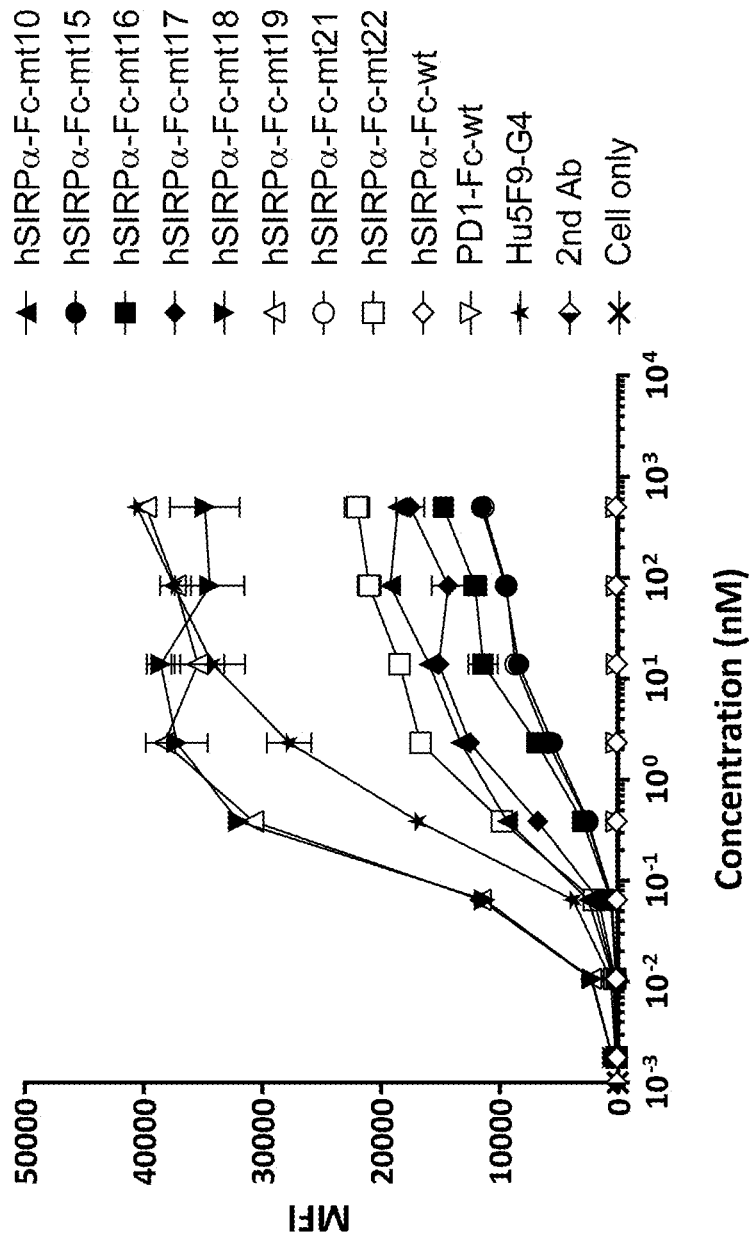

As shown in FIG. 10C, hSIRPα-Fc-mt18 and hSIRPα-Fc-mt19 exhibited a higher RBC (from donor 1) binding ability than Hu5F9-G4, whereas hSIRPα-Fc-mt22, hSIRPα-Fc-mt10, hSIRPα-Fc-mt17, hSIRPα-Fc-mt16, hSIRPα-Fc-mt15, and hSIRPα-Fc-mt21 exhibited a lower RBC binding ability than Hu5F9-G4. No RBC cell binding was detected by hSIRPα-Fc-wt. EC50 values for the tested hSIRPα-Fc proteins are listed in the table below.

TABLE 2

EC50 values for RBC binding

| Protein | EC50 (nM) |
|---|---|
| Hu5F9-G4 | 0.6414 |
| hSIRPα-Fc-wt (Trillium) | — |
| hSIRPα-Fc-mt10 | 0.4939 |
| hSIRPα-Fc-mt15 | 2.908 |
| hSIRPα-Fc-mt16 | 2.556 |
| hSIRPα-Fc-mt17 | 0.5624 |
| hSIRPα-Fc-mt18 | 0.1107 |
| hSIRPα-Fc-mt19 | 0.125 |
| hSIRPα-Fc-mt21 | 2.074 |
| hSIRPα-Fc-mt22 | 0.4952 |

Figure 10D:
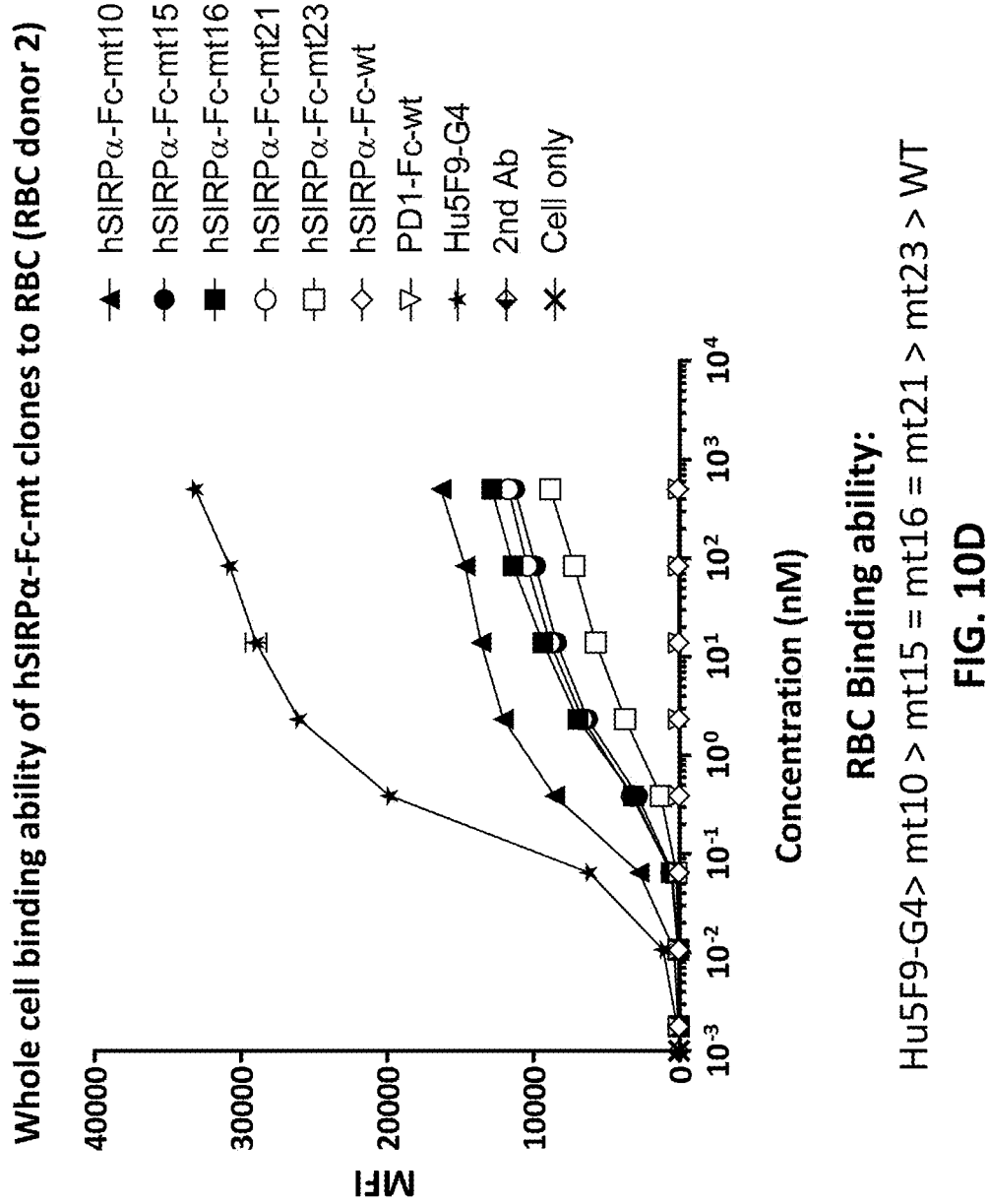

As shown in FIG. 10D, hSIRPα-Fc-mt10, hSIRPα-Fc-mt15, hSIRPα-Fc-mt16, hSIRPα-Fc-mt21, hSIRPα-Fc-mt23 exhibited a significantly lower RBC (from donor 2) binding ability than Hu5F9-G4. No RBC cell binding was detected by hSIRPα-Fc-wt.

Example 6. Platelet Binding Assays

To determine the platelet binding ability of the hSIRPα-Fc mutant proteins, the hSIRPα-Fc mutant proteins were purified by protein A beads, and serially diluted (5-fold) from 500 nM to 100 nM, 20 nM, 4 nM, 0.8 nM, 0.16 nM, 0.032 nM, and 0.064 nM. PD1-Fc-wt was used as a negative control. Hu5F9-G4 was used as a positive control. The diluted proteins were incubated with $5 \times 10^5$ human platelets from two donors. After the incubation, anti-hFcr-PE (1:100; Invitrogen) was added and MFI values were measured by flow cytometry.

Figure 11A:
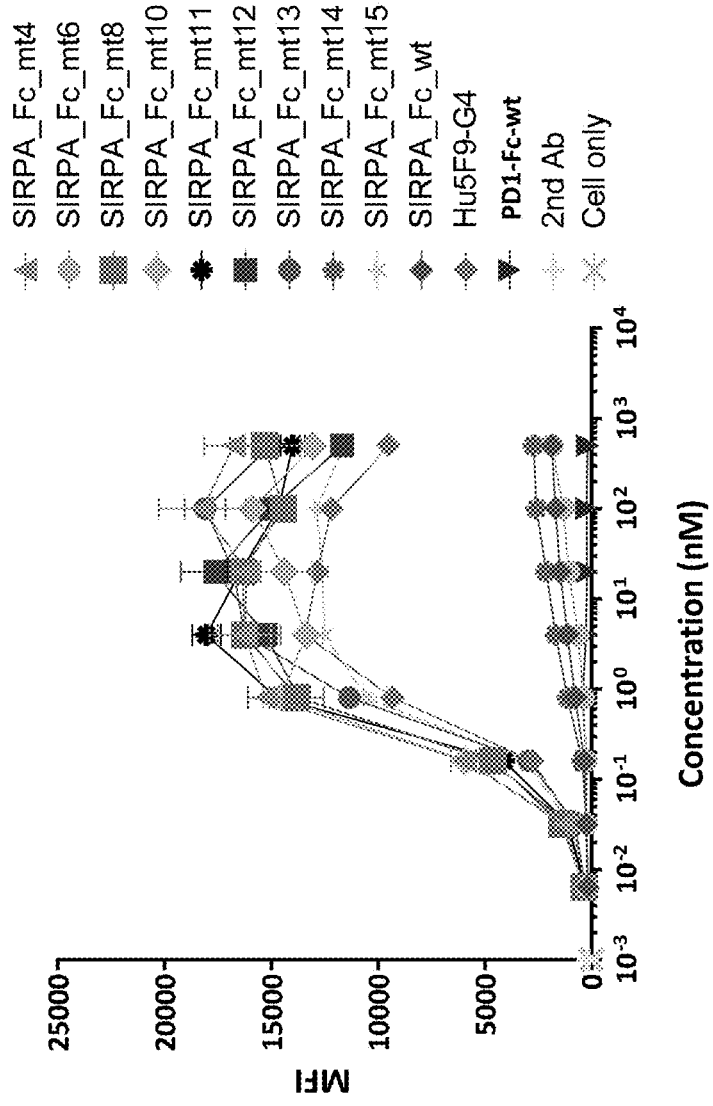
Figure 11B:
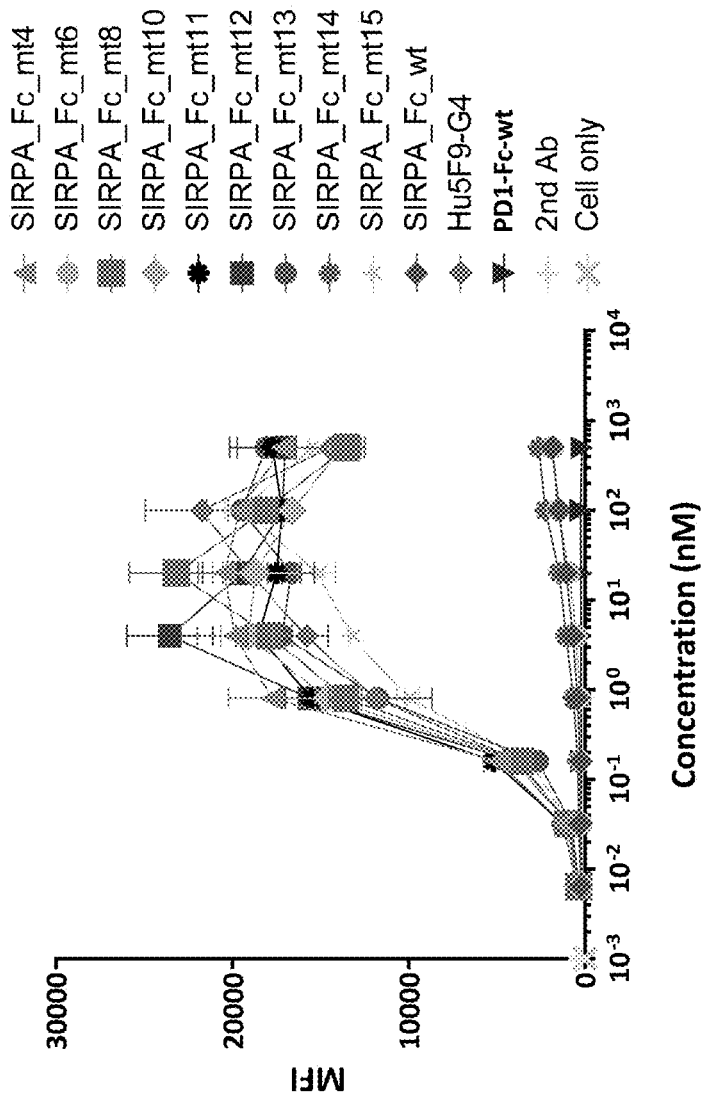

As shown in FIGS. 11A-11B, hSIRPα-Fc-mt4, hSIRPα-Fc-mt10, hSIRPα-Fc-mt8, hSIRPα-Fc-mt11, hSIRPα-Fc-mt12, hSIRPα-Fc-mt13, and hSIRPα-Fc-mt15 exhibited a stronger platelet binding ability as compared to the anti-CD47 antibody Hu5F9-G4, while hSIRPα-Fc-mt14, hSIRPα-Fc-wt, and hSIRPα-Fc-mt6 exhibited a significantly low platelet binding ability.

Figure 11C:
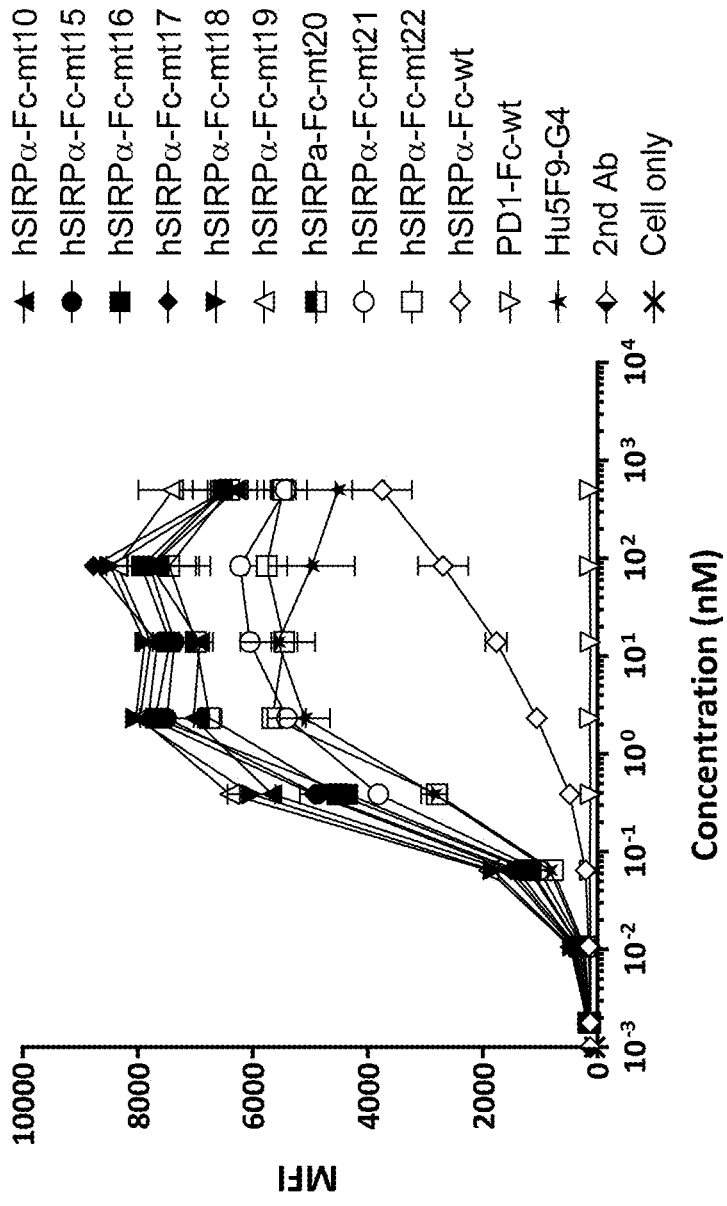

As shown in FIG. 11C, hSIRPα-Fc-mt19, hSIRPα-Fc-mt18, hSIRPα-Fc-mt10, hSIRPα-Fc-mt15, hSIRPα-Fc-mt21, hSIRPα-Fc-mt20, hSIRPα-Fc-mt17, and hSIRPα-Fc-mt22 exhibited a stronger or similar platelet (from donor 1) binding ability as compared to Hu5F9-G4. EC50 values for the tested hSIRPα-Fc proteins are listed in the table below.

TABLE 3

EC50 values for platelet binding

| Protein | EC50 (nM) |
|---|---|
| Hu5F9-G4 | 0.3334 |
| hSIRPα-Fc-wt (Trillium) | 95.95 |
| hSIRPα-Fc-mt10 | 0.1572 |
| hSIRPα-Fc-mt15 | 0.2297 |
| hSIRPα-Fc-mt16 | 0.3098 |
| hSIRPα-Fc-mt17 | 0.2429 |
| hSIRPα-Fc-mt18 | 0.1593 |

TABLE 3-continued

EC50 values for platelet binding

| Protein | EC50 (nM) |
|---|---|
| hSIRPα-Fc-mt19 | 0.1505 |
| hSIRPα-Fc-mt20 | 0.2472 |
| hSIRPα-Fc-mt21 | 0.2469 |
| hSIRPα-Fc-mt22 | 0.3996 |

Figure 11D:
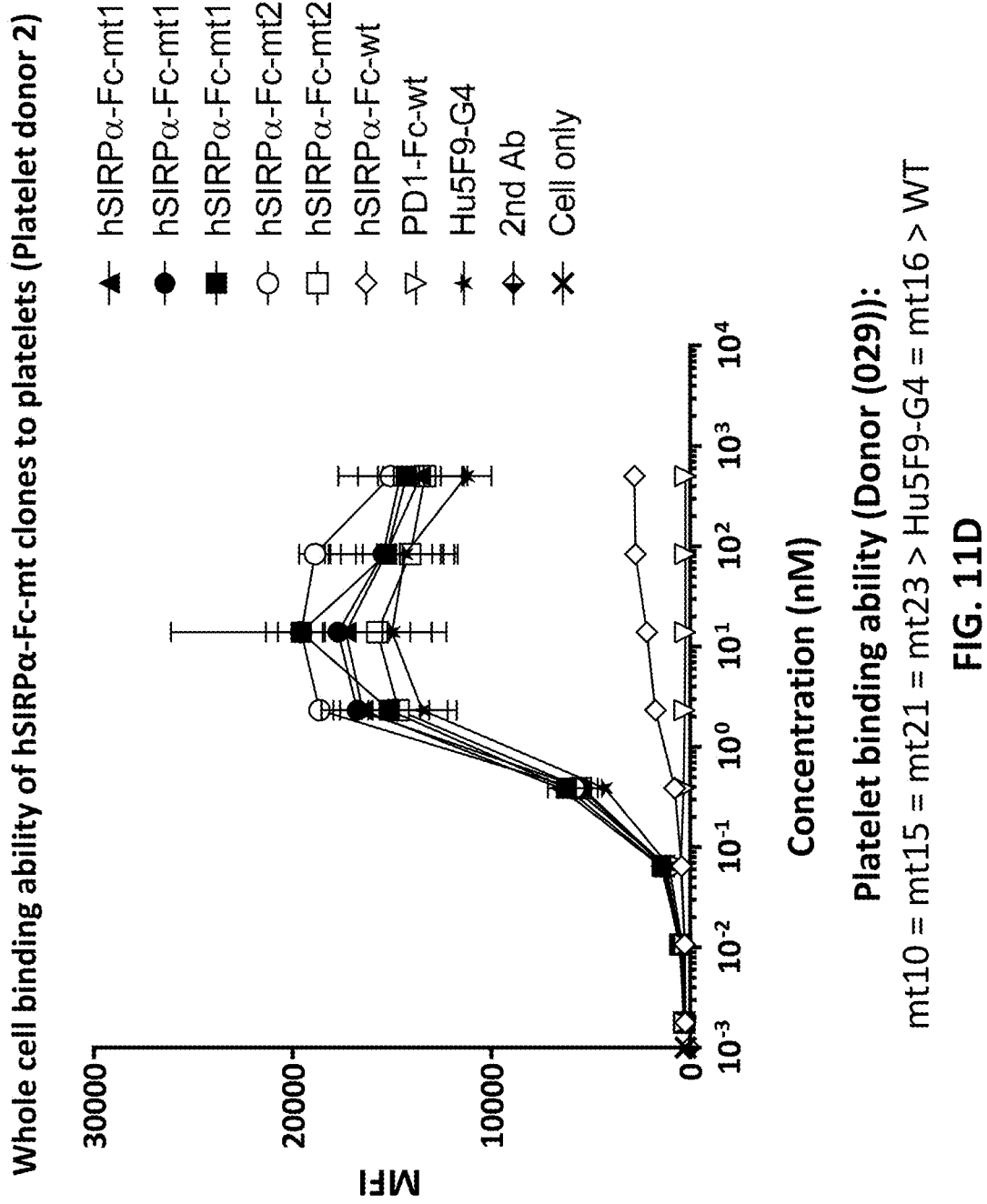

As shown in FIG. 11D, hSIRPα-Fc-mt10, hSIRPα-Fc-mt15, hSIRPα-Fc-mt21, hSIRPα-Fc-mt23, and hSIRPα-Fc-mt16 exhibited a stronger or similar platelet binding ability as compared to Hu5F9-G4. EC50 values for the tested hSIRPα-Fc proteins are listed in the table below.

TABLE 4

EC50 values for platelet binding

| Protein | EC50 (nM) |
|---|---|
| Hu5F9-G4 | 0.5207 |
| hSIRPα-Fc-wt (Trillium) | 1.939 |
| hSIRPα-Fc-mt10 | ~0.4110 |
| hSIRPα-Fc-mt15 | ~0.4341 |
| hSIRPα-Fc-mt16 | 0.5317 |
| hSIRPα-Fc-mt21 | ~0.4287 |
| hSIRPα-Fc-mt23 | ~0.4343 |

Example 7. Whole Cell Bind Assays to Cells Expressing Monkey CD47

To determine the whole cell binding ability of the hSIRPα-Fc mutant proteins to monkey CD47, the hSIRPα-Fc mutant proteins were purified by protein A beads, and serially diluted (5-fold) from 500 nM to 100 nM, 20 nM, 4 nM, 0.8 nM, 0.16 nM, 0.032 nM, and 0.064 nM. PD1-Fc-wt was used as a negative control. Hu5F9-G4 was used as a positive control. The diluted proteins were incubated with 1×10$^5$ transfected CHO-S cells expressing cynomolgus CD47 (cynoCD47 tf CHO-S) or 1×10$^5$ rhesus monkey kidney epithelial cell line LLC-MK2. After the incubation, anti-hFcr-PE (1:100; Invitrogen) was added and MFI values were measured by flow cytometry. As shown in FIGS. 12A-12B, all hSIRPα-Fc mutant proteins can bind to monkey CD47.

As shown in FIG. 12C, Hu5F9-G4 exhibited a stronger LLC-MK2 binding ability than hSIRPα-Fc-mt10, hSIRPα-Fc-mt15, hSIRPα-Fc-mt16, hSIRPα-Fc-mt21, and hSIRPα-Fc-mt23.

Example 8. Whole Cell Bind Assays to Cells Expressing Mouse CD47

To determine the whole cell binding ability of the hSIRPα-Fc mutant proteins to mouse CD47, the hSIRPα-Fc mutant proteins were purified by protein A beads, and serially diluted (5-fold) from 1000 nM to 200 nM, 40 nM, 8 nM, 1.6 nM, 0.32 nM, 0.064 nM, and 0.0128 nM. PD1-Fc-wt was used as a negative control. MIAP410 (an anti-human, mouse CD47 antibody) was used as a positive control. The diluted proteins were incubated with 3×10$^4$ EMT-6 cells. After the incubation, anti-hFcr-PE (1:100; Invitrogen) was added and MFI values were measured by flow cytometry. For MIAP410, anti-mouse (H+L)-FITC (1:100) was used. As shown in FIGS. 13A-13B, hSIRPα-Fc-mt13, hSIRPα-Fc-mt11, hSIRPα-Fc-mt4, hSIRPα-Fc-mt12, hSIRPα-Fc-mt8, and hSIRPα-Fc-mt10 can bind to cells expressing mouse CD47. However, hSIRPα-Fc-wt, hSIRPα-Fc-mt6, hSIRPα-Fc-mt14, and hSIRPα-Fc-mt15 did not bind to the EMT-6 cells.

Example 9. Determination of Hemagglutination (HA) Activity

To determine the HA activity induced by the hSIRPα-Fc mutant proteins, a 10% RBC solution was prepared from whole blood of two healthy donors by washing with 0.9% sodium chloride buffer twice, and then diluted by 10 folds in a 0.9% sodium chloride buffer. The hSIRPα-Fc mutant proteins were serially diluted (3-fold) to a final concentrations of 500 nM, 166.7 nM, 55.6 nM, 18.5 nM, 6.2 nM, 2.1 nM, 685.8 pM, 228.6 pM, 76.2 pM, 25.4 pM, or 8.4 pM, and were incubated in a round-bottom 96-well plate with the 12 µl of 10% RBC solution at room temperature (RT) overnight. After the incubation, agglutinated RBCs coated wells evenly, whereas non-agglutinated cells formed a distinct red dot at the bottom of the well. Hu5F9-G4 was used a positive control. hSIRPα-Fc-wt and PD1-Fc-wt, were used as negative controls. As shown in FIGS. 14A-14C, none of the tested hSIRPα-Fc mutant proteins induced hemagglutination.

Example 10. Determination of the Blocking Ability to CD47 tf CHO-S, FaDu and Raji Cells To determine the blocking ability of the hSIRPα-Fc mutant proteins to human CD47, the hSIRPα-Fc mutant proteins were purified by protein A beads, and serially diluted (8-fold) from 1000 nM to 125 nM, 15.63 nM, 1.95 nM, 0.24 nM, 0.03 nM, 0.0038 nM, and 0.0004 nM. PD1-Fc-wt was used as a negative control. Hu5F9-G4 was used as a positive control. The diluted proteins were incubated with 3×10$^4$ CD47 tf CHO-S cells (transfected CHO-S cells expressing human CD47), FaDu cells, or Raji cells, together with 1 µg/ml biotin labeled hSIRPα-Fc-wt. After the incubation, streptavidin-PE (0.3 µl per well, eBioscience, Cat #: EBS12-4317-87) was added and MFI values were measured by flow cytometry.

As shown in FIGS. 15A-15C, all tested hSIRPα-Fc mutant proteins can block the interaction between hSIRPα and CD47 tf CHO-S cells or CD47-expressing tumor cells (FaDu and Raji). In particular, hSIRPα-Fc-mt4, hSIRPα-Fc-mt8, hSIRPα-Fc-mt10, hSIRPα-Fc-mt11, hSIRPα-Fc-mt12, hSIRPα-Fc-mt13, hSIRPα-Fc-mt15, and hSIRPα-Fc-wt exhibited a comparable blocking ability as Hu5F9-G4.

As shown in FIG. 15D, all tested hSIRPα-Fc mutant proteins exhibited a similar whole cell blocking ability as compared to Hu5F9-G4. hSIRPα-Fc-wt exhibited the lowest CD47/SIRPα blocking ability. IC50 values for the tested hSIRPα-Fc proteins are listed in the table below.

TABLE 5

IC50 values for whole cell blocking

| Protein | IC50 (nM) |
|---|---|
| Hu5F9-G4 | 0.6765 |
| hSIRPα-Fc-wt (Trillium) | 6.122 |
| hSIRPα-Fc-mt10 | 0.3282 |
| hSIRPα-Fc-mt15 | 0.3758 |
| hSIRPα-Fc-mt16 | 0.5815 |
| hSIRPα-Fc-m17 | 0.4449 |
| hSIRPα-Fc-mt18 | 0.1529 |

TABLE 5-continued

IC50 values for whole cell blocking

| Protein | IC50 (nM) |
| --- | --- |
| hSIRPα-Fc-mt19 | 0.2129 |
| hSIRPα-Fc-mt21 | 0.1975 |
| hSIRPα-Fc-mt22 | 0.2757 |

As shown in FIG. 15E, hSIRPα-Fc-mt21 exhibited the strongest whole cell blocking ability. hSIRPα-Fc-mt15, hSIRPα-Fc-mt16, and hSIRPα-Fc-mt23 exhibited a similar whole cell blocking ability as compared to Hu5F9-G4. hSIRPα-Fc-wt exhibited the lowest CD47/SIRPα blocking ability. IC50 values for the tested hSIRPα-Fc proteins are listed in the table below.

TABLE 6

IC50 values for whole cell blocking

| Protein | IC50 (nM) |
| --- | --- |
| Hu5F9-G4 | 0.1035 |
| hSIRPα-Fc-wt (Trillium) | 11.56 |
| hSIRPα-Fc-mt15 | 0.1132 |
| hSIRPα-Fc-mt16 | 0.1199 |
| hSIRPα-Fc-mt21 | 0.04067 |
| hSIRPα-Fc-mt22 | 0.1125 |

Example 11. Induction of Phagocytosis of CD47-Expressing Tumor Cells by Mouse Macrophages Phagocytosis of human CD47-expressing tumor cells (Jurkat, FaDu, or Raji) were determined by incubating the tumor cells with Raw264.7 mouse macrophages in the presence of the hSIRPα-Fc mutant proteins. Experiments were performed as follows. Jurkat, FaDu, or Raji cells were labeled with 5 nM CellTrace™ CFSE (Thermo, Cat #: C34554) at 37° C. for 10 minutes, and then washed by complete DMEM medium containing 10% FBS (fetal bovine serum). The hSIRPα-Fc mutant proteins were then serially diluted (10-fold) to final concentrations of 1 μM, 100 nM, 10 nM, 1 nM, 100 pM, and 10 pM. Hu5F9-G4 and hSIRPα-Fc-wt (Trillium) were used as positive controls. PD1-Fc-wt was used as a negative control. 1×10⁵ cells/well CFSE-labeled Jurkat, FaDu, or Raji cells (target cells) were incubated with the diluted hSIRPα-Fc mutant proteins in a low-binding 96-well U-shaped plate at 37° C. for 30 minutes. Afterwards, 5×10⁴ Raw264.7 cells were added to each well and the plate was incubated at 37° C. for 2 hours. The Raw264.7 cells were stained with PE-Cyanine 7 conjugated F4/80 antibody (eBioscience, Cat #: 25-4801-82). The ability of the hSIRPα-Fc mutant proteins to induce phagocytosis was evaluated by calculating the percentage of CFSE+F4/80+ from macrophages (indicating macrophages phagocytosed CFSE-labeled Jurkat, FaDu, or Raji cells) over the total F4/80 signals from macrophages by flow cytometry.

As shown in FIGS. 16A-16C, hSIRPα-Fc-mt4, hSIRPα-Fc-mt8, hSIRPα-Fc-mt10, hSIRPα-Fc-mt13, and hSIRPα-Fc-mt15 exhibited comparable or even higher ability to induce phagocytosis of CD47-expressing tumor cells as compared to Hu5F9-G4. EC50 values were also calculated with respect to each tumor cells, as shown in the tables below.

TABLE 7

EC50 values for phagocytosis of Jurkat cells

| Protein | EC50 (nM) |
| --- | --- |
| Hu5F9-G4 | 0.17 |
| SIRPα-Fc (Trillium, G4) | 23.28 |
| hSIRPα-Fc-mt4 | 0.28 |
| hSIRPα-Fc-mt6 | 18.69 |
| hSIRPα-Fc-mt8 | 0.43 |
| hSIRPα-Fc-mt11 | 0.24 |
| hSIRPα-Fc-mt12 | 0.48 |
| hSIRPα-Fc-mt13 | 0.61 |
| hSIRPα-Fc-mt14 | 22.06 |
| hSIRPα-Fc-mt15 | 1.22 |

TABLE 8

EC50 values for phagocytosis of FaDu cells

| Protein | EC50 (nM) |
| --- | --- |
| Hu5F9-G4 | 0.19 |
| SIRPα-Fc (Trillium, G4) | 26.78 |
| hSIRPα-Fc-mt4 | 0.09 |
| hSIRPα-Fc-mt6 | 18.25 |
| hSIRPα-Fc-mt8 | 0.22 |
| hSIRPα-Fc-mt10 | 0.19 |
| hSIRPα-Fc-mt13 | 0.26 |
| hSIRPα-Fc-mt15 | 0.56 |

TABLE 9

EC50 values for phagocytosis of Raji cells

| Protein | EC50 (nM) |
| --- | --- |
| Hu5F9-G4 | 0.05 |
| SIRPα-Fc (Trillium, G4) | 23.06 |
| hSIRPα-Fc-mt4 | 0.06 |
| hSIRPα-Fc-mt6 | 15.87 |
| hSIRPα-Fc-mt8 | 0.08 |
| hSIRPα-Fc-mt10 | 0.07 |
| hSIRPα-Fc-mt13 | 0.09 |
| hSIRPα-Fc-mt15 | 0.13 |

As shown in FIG. 16D, hSIRPα-Fc-mt15, hSIRPα-Fc-mt16, hSIRPα-Fc-mt21, and hSIRPα-Fc-mt23 exhibited comparable ability to induce phagocytosis of DLD1 cells as compared to Hu5F9-G4. As shown in FIG. 16E, hSIRPα-Fc-mt10, hSIRPα-Fc-mt15, hSIRPα-Fc-mt16, hSIRPα-Fc-mt20, hSIRPα-Fc-mt21, and hSIRPα-Fc-mt23 exhibited comparable ability to induce phagocytosis of DLD1 cells as compared to Hu5F9-G4.

Example 12. Induction of RBC Phagocytosis by Mouse Microphages

Phagocytosis of human RBCs were determined by incubating RBCs with Raw264.7 mouse macrophages in the presence of the hSIRPα-Fc mutant proteins. Experiments were performed as follows. RBCs were labeled with 5 nM CellTrace™ CFSE (Thermo) at 37° C. for 10 minutes, and then washed by complete DMEM medium containing 10% FBS. The hSIRPα-Fc mutant proteins were then serially diluted (10-fold) to final concentrations of 1 μM, 100 nM, 10 nM, 1 nM, 100 pM, and 10 pM. Hu5F9-G4 and hSIRPα-Fc-wt (Trillium) were used as positive controls. PD1-Fc-wt was used as a negative control. 1×10⁶ cells/well CFSE-labeled RBCs (target cells) were incubated with the diluted hSIRPα-Fc mutant proteins in a low-binding 96-well U-shaped plate at 37° C. for 30 minutes. Afterwards, 5×10⁴ Raw264.7 cells were added to each well and the plate was incubated at 37° C. for 2 hours. The Raw264.7 cells were stained with PE-Cyanine 7 conjugated F4/80 antibody (eBioscience). The ability of the hSIRPα-Fc mutant proteins to induce RBC phagocytosis was evaluated by calculating the percentage of CFSE+F4/80+ from macrophages (indicating macrophages phagocytosed CFSE-labeled RBC cells) over the total F4/80 signals from macrophages by flow cytometry.

As shown in FIG. 17A, all tested hSIRPα-Fc mutant proteins exhibited weaker ability to induce macrophages (Raw264.7) to phagocytose RBCs.

Example 13. Induction of Platelet Phagocytosis by Mouse Microphages

Phagocytosis of human platelets were determined by incubating platelets with Raw264.7 mouse macrophages in the presence of the hSIRPα-Fc mutant proteins. Experiments were performed as follows. platelets were labeled with 5 nM CellTrace™ CFSE (Thermo) at 37° C. for 10 minutes, and then washed by complete DMEM medium containing 10% FBS. The hSIRPα-Fc mutant proteins were then serially diluted (10-fold) to final concentrations of 500 nM, 50 nM, 5 nM, 0.5 nM, 50 pM, 5 pM, and 0.5 pM. Hu5F9-G4 and hSIRPα-Fc-wt (Trillium) were used as positive controls. PD1-Fc-wt was used as a negative control. 5×10⁵ cells/well CFSE-labeled platelets (target cells) were incubated with the diluted hSIRPα-Fc mutant proteins in a low-binding 96-well U-shaped plate at 37° C. for 30 minutes. Afterwards, 5×10⁴ Raw264.7 cells were added to each well and the plate was incubated at 37° C. for 2 hours. The Raw264.7 cells were stained with PE-Cyanine 7 conjugated F4/80 antibody (eBioscience). The ability of the hSIRPα-Fc mutant proteins to induce platelet phagocytosis was evaluated by calculating the percentage of CFSE+F4/80+ from macrophages (indicating macrophages phagocytosed CFSE-labeled RBC cells) over the total F4/80 signals from macrophages by flow cytometry.

As shown in FIG. 17B, hSIRPα-Fc-mt15, hSIRPα-Fc-mt16, hSIRPα-Fc-mt21, and hSIRPα-Fc-mt23 exhibited weaker ability to induce macrophages (Raw264.7) to phagocytose platelets.

Example 14. Induction of Phagocytosis of CD47-Expressing Tumor Cells by Human Macrophages Phagocytosis of CD47-expressing tumor cells (Raji, DLD1, or Jurkat) by human microphages were determined as follows. PBMCs were isolated from human blood, and monocytes were differentiated into macrophages by incubating them in complete RPMI medium containing 10% FBS, 1× streptomycin/penicillin, and 200 U/ml GM-CSF (BioLegend, Cat #: 576304) for 10-14 days. Monocyte-derived macrophages (MDMs) became adherent and non-attached cells were washed away. The MDMs were detached from plate by incubating with Accutase® (eBioscience, Cat #: EBS00-4555-56) and scraping. Human CD47-expressing tumor cells (Raji, DLD1, or Jurkat) were labeled with 5 nM CellTrace™ CFSE (Thermo) at 37° C. for 10 minutes, and then washed by complete RPMI medium containing 10% FBS. The candidate clones were then serially diluted (10-fold) to final concentrations of 200 nM, 20 nM, 2 nM, 200 pM, 20 pM, and 2 pM. Hu5F9-G4 and hSIRPα-Fc-wt (Trillium) were used as positive controls. PD1-Fc-wt was used as a negative control. 2.4×10⁴-6×10⁴ cells/well CFSE-labeled Raji, DLD1, or Jurkat cells (target cells) were incubated with the diluted hSIRPα-Fc mutant proteins in a low-binding 96-well U-shaped plate at 37° C. for 30 minutes. Afterwards, 1.2×10⁴-3×10⁴ cells/well MDM cells (half of the number of target cells) were added to each well, and the plate was incubated at 37° C. for 2 hours. The MDM cells were stained with PE-Cyanine 7 conjugated CD14 antibody (eBioscience, Cat #: 25-0149-42). The ability of the hSIRPα-Fc mutant proteins to induce phagocytosis was evaluated by calculating the percentage of CFSE+CD14+ from macrophages (indicating macrophages phagocytosed CFSE-labeled RBC cells) over the total CD14 signals from macrophages by flow cytometry.

As shown in FIGS. 18A-18C, hSIRPα-Fc-mt10, hSIRPα-Fc-mt15, and Hu5F9-G4 exhibited better ability to induce phagocytosis of CD47-expressing tumor cells by MDM cells as compared to that of hSIRPα-Fc-wt (hSIRPα-Fc).

As shown in FIG. 18D, hSIRPα-Fc-mt15, hSIRPα-Fc-mt16, hSIRPα-Fc-mt21, and hSIRPα-Fc-mt23 exhibited better ability to induce phagocytosis of DLD1 cells by MDM cells as compared to that of hSIRPα-Fc-wt. Hu5F9 exhibited the highest ability to induce phagocytosis by MDM cells.

Example 15. Induction of RBC Phagocytosis by Human Microphages

Phagocytosis of RBCs by human microphages were determined as follows. PBMCs were isolated from human blood, and the monocytes were differentiated into macrophages by incubating them in complete RPMI medium containing 10% FBS, 1× streptomycin/penicillin and 200 U/ml GM-CSF (Biolegend) for 10-14 days. MDMs became adherent and non-attached cells were washed away. The MDMs were detached from plate by incubating with Accutase® (eBioscience) and scraping. RBC were labeled with 5 nM CellTrace™ CFSE (Thermo) at 37° C. for 10 minutes, washed by complete RPMI medium containing 10% FBS. The candidate clones were then serially diluted (10-fold) to final concentrations of 200 nM, 20 nM, 2 nM, 200 pM, 20 pM, and 2 pM. Hu5F9-G4 and hSIRPα-Fc-wt (Trillium) were used as positive controls. PD1-Fc-wt was used as a negative control. 4×10⁵ cells/well CFSE-labeled RBCs (target cells) were incubated with the diluted hSIRPα-Fc mutant proteins in a low-binding 96-well U-shaped plate at 37° C. for 30 minutes. Afterwards, 4×10⁴ MDM cells were added to each well, and the plate was incubated at 37° C. for 2 hours. The MDM cells were stained with PE-Cyanine 7 conjugated CD14 antibody (eBioscience). The ability of the hSIRPα-Fc mutant proteins to induce phagocytosis was evaluated by calculating the percentage of CFSE+CD14+ from macrophages (indicating macrophages phagocytosed CFSE-labeled RBC cells) over the total CD14 signals from macrophages flow cytometry.

As shown in FIGS. 19A-19B, hSIRPα-Fc-mt10, hSIRPα-Fc-mt13, and hSIRPα-Fc-mt15 did not induce human MDMs to phagocytose RBCs. As shown in FIG. 19C, hSIRPα-Fc-mt15, hSIRPα-Fc-mt16, hSIRPα-Fc-mt21, and hSIRPα-Fc-mt23 did not induce human MDMs to phagocytose RBCs.

Example 16. Determination of In Vivo Anti-Tumor Efficacy

The in vivo anti-tumor efficacy of the hSIRPα-Fc mutant proteins was determined using Raji cells. Specifically, NOD/

SCID mice were inoculated with Raji cells on Day 0. On Day 4, the mice were placed in a control group and four treatment groups. For the treatment group mice, hSIRPα-Fc-mt10 (G1), hSIRPα-Fc-mt15 (G2), hSIRPα-Fc-wt (Trillium; G3), or Hu5F9-G4 (G4) were administered by intraperitoneal injection on Day 7 and Day 14 after inoculation. The control group mice were administered with an equal volume of placebo. The tumor volume of mice in each group was measured on Day 4, Day 7, Day 11, Day 14, and Day 18 after inoculation. The average tumor volume of mice in each group is shown in the table below. Tumor growth inhibition (TGI) and p value were also determined.

TABLE 10

| Day 18 after inoculation | Dose level | Mean ± SEM | TGI (%) | P value |
| --- | --- | --- | --- | --- |
| hSIRPα-Fc-mt10 | 3.2 mg/kg | 289 ± 147 | 81 | 0.0002(***) |
| hSIRPα-Fc-mt15 | 3.2 mg/kg | 288 ± 110 | 80 | <0.0001(****) |
| hSIRPα-Fc-wt (Trillium) | 3.2 mg/kg | 772 ± 181 | 42 | 0.0295(*) |
| Hu5F9-G4 | 6 mg/kg | 243 ± 86 | 82 | <0.0001(****) |
| Placebo | — | 1303 ± 116 | — | — |

Note:
*: $p < 0.05$,
**: $p < 0.01$,
***: $p < 0.001$,
****: $p < 0.0001$

As shown in FIGS. 20A-20B, hSIRPα-Fc-mt10 and hSIRPα-Fc-mt15 exhibited comparable anti-tumor efficacy as compared to the anti-CD47 antibody Hu5F9-G4. In addition, both hSIRPα-Fc-mt10 and hSIRPα-Fc-mt15 were more efficacious than hSIRPα-Fc-wt in inhibiting tumor growth. The survival curves of mice in each group were also determined, as shown in FIG. 20C, which indicate that administration of hSIRPα-Fc-mt10 and hSIRPα-Fc-mt15 could significantly prolong the percentage of survived mice as compared to the placebo control.

In a different experiment, the in vivo anti-tumor efficacy of the hSIRPα-Fc mutant proteins were determined using NCI-H82 cells. Specifically, NOD/SCID mice were inoculated with NCI-H82 cells on Day 0. On Day 4, the mice were placed in a control group and four treatment groups. For the treatment group mice, hSIRPα-Fc-mt10 (G1), hSIRPα-Fc-mt15 (G2), hSIRPα-Fc-wt (Trillium; G3), or Hu5F9-G4 (G4) were administered by intraperitoneal injection on Day 4, Day 7, Day 14, Day 11, Day 14, Day 18, Day 21, Day 25, and Day 28 after inoculation. The control group mice were administered with an equal volume of placebo. The tumor volume of mice in each group was measured on Day 4, Day 7, Day 14, Day 11, Day 14, Day 18, Day 21, Day 25, Day 28, and Day 32 after inoculation. The average tumor volume of mice in each group is shown in the table below. Tumor growth inhibition (TGI) and p value were also determined.

TABLE 11

| Day 25 after inoculation | Dose level | Mean ± SEM | TGI (%) | P value |
| --- | --- | --- | --- | --- |
| hSIRPα-Fc-mt10 | 2.7 mg/kg | 95.36 ± 4.912 | 105 | <0.0001(***) |
| hSIRPα-Fc-mt15 | 2.7 mg/kg | 90.73 ± 3.312 | 105 | <0.0001(***) |
| hSIRPα-Fc-wt (Trillium) | 2.7 mg/kg | 1002 ± 189.9 | 23 | 0.30 |
| Hu5F9-G4 | 5 mg/kg | 144.3 ± 28.14 | 101 | <0.0001(****) |
| Placebo | — | 1262 ± 42.6 | — | — |

Note:
*: $p < 0.05$,
**: $p < 0.01$,
***: $p < 0.001$,
****: $p < 0.0001$

As shown in FIGS. 21A-21B, hSIRPα-Fc-mt10 and hSIRPα-Fc-mt15 exhibited comparable anti-tumor efficacy as compared to the anti-CD47 antibody Hu5F9-G4. In addition, both hSIRPα-Fc-mt10 and hSIRPα-Fc-mt15 were more efficacious than hSIRPα-Fc-wt in inhibiting tumor growth. The survival curves of mice in each group were also determined, as shown in FIG. 21C, which indicate that administration of hSIRPα-Fc-mt10 and hSIRPα-Fc-mt15 could significantly prolong the percentage of survived mice as compared to the placebo control.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An engineered SIRPα polypeptide comprising SEQ ID NO: 9.

2. The engineered SIRPα polypeptide of claim 1, wherein the engineered SIRPα polypeptide further comprises a CH2 domain, a CH3 domain, and optionally a hinge region.

3. The engineered SIRPα polypeptide of claim 1, wherein the engineered SIRPα polypeptide comprises SEQ ID NO: 23.

4. A method of treating a human subject having cancer that comprises cancer cells that express CD47, the method comprising administering a therapeutically effective amount of a composition comprising the engineered SIRPα polypeptide of claim 3, to the human subject.

* * * * *

SEQUENCE LISTING

```
Sequence total quantity: 62
SEQ ID NO: 1            moltype = AA  length = 118
FEATURE                 Location/Qualifiers
source                  1..118
                        mol_type = protein
                        organism = Homo sapiens
SEQUENCE: 1
EEELQVIQPD KSVSVAAGES AILHCTVTSL IPVGPIQWFR GAGPARELIY NQKEGHFPRV   60
TTVSESTKRE NMDFSISISN ITPADAGTYY CVKFRKGSPD TEFKSGAGTE LSVRAKPS    118

SEQ ID NO: 2            moltype = AA  length = 118
FEATURE                 Location/Qualifiers
source                  1..118
                        mol_type = protein
                        organism = synthetic construct
SEQUENCE: 2
EEELQVIQPD KSVSVAAGES AILHCTVTSL WPVGPIQWFR GAGPARELIY NQKAWPFPRV   60
TTVSESTKRE NMDFSISISN ITPADAGTYY CVKFRKGSPD TEFKSGAGTE LSVRAKPS    118
```

```
SEQ ID NO: 3              moltype = AA  length = 118
FEATURE                   Location/Qualifiers
source                    1..118
                          mol_type = protein
                          organism = synthetic construct
SEQUENCE: 3
EEELQVIQPD KSVSVAAGES AILRCTVTSL WPVGPIQWFR GAGPARELIY NQKAFIFPRV    60
TTVSESTKRG NMDFSISISN ITPADAGTYY CVKFRKGSPD TEFKSGAGTE LSVRAKPS     118

SEQ ID NO: 4              moltype = AA  length = 118
FEATURE                   Location/Qualifiers
source                    1..118
                          mol_type = protein
                          organism = synthetic construct
SEQUENCE: 4
EEELQVIQPD KSVSVAAGES AILNCTVTSL IPVGPIQWFR GAGPARELIY NQKHQTFPRV    60
TTVSEQTKRE NRDFSISISN ITPADAGTYY CVKFRKGSPD TEFKSGAGTE LSVRAKPS     118

SEQ ID NO: 5              moltype = AA  length = 118
FEATURE                   Location/Qualifiers
source                    1..118
                          mol_type = protein
                          organism = synthetic construct
SEQUENCE: 5
EEELQVIQPD KSVSVAAGES AILHCTVTSL IPVGPIQWFR GAGPARELIY NQKNLIFPRV    60
TTVSESGKRE NMDFSISISN ITPADAGTYY CVKFRKGSPD TEFKSGAGTE LSVRAKPS     118

SEQ ID NO: 6              moltype = AA  length = 118
FEATURE                   Location/Qualifiers
source                    1..118
                          mol_type = protein
                          organism = synthetic construct
SEQUENCE: 6
EEELQVIQPD KSVSVAAGES AILHCIVTSL IPVGPIQWFR GAGPARELIY NQKILTFPRV    60
TTVSESTKRE NYDFSISISN ITPADAGTYY CVKFRKGSPD TEFKSGAGTE LSVRAKPS     118

SEQ ID NO: 7              moltype = AA  length = 118
FEATURE                   Location/Qualifiers
source                    1..118
                          mol_type = protein
                          organism = synthetic construct
SEQUENCE: 7
EEELQVIQPD KSVSVAAGES AILHCTVTSL KPVGPIQWFR GAGPARELIY NQKRDTFPRV    60
TTVSESTKRE NRDFSISISN ITPADAGTYY CVKFRKGSPD TEFKSGAGTE LSVRAKPS     118

SEQ ID NO: 8              moltype = AA  length = 118
FEATURE                   Location/Qualifiers
source                    1..118
                          mol_type = protein
                          organism = synthetic construct
SEQUENCE: 8
EEELQVIQPD KSVSVAAGES AILTCTVTSL WPVGPIQWFR GAGPARELIY NQKGQNFPRV    60
TTVSESTKRF NMDFSISISN ITPADAGTYY CVKFRKGSPD TEFKSGAGTE LSVRAKPS     118

SEQ ID NO: 9              moltype = AA  length = 118
FEATURE                   Location/Qualifiers
source                    1..118
                          mol_type = protein
                          organism = synthetic construct
SEQUENCE: 9
EEELQVIQPD KSVSVAAGES AILTCTVTSL YPVGPIQWFR GAGPARELIY NQKRQTFPRV    60
TTVSESTKRF NMDFSISISN ITPADAGTYY CVKFRKGSPD TEFKSGAGTE LSVRAKPS     118

SEQ ID NO: 10             moltype = AA  length = 118
FEATURE                   Location/Qualifiers
source                    1..118
                          mol_type = protein
                          organism = synthetic construct
SEQUENCE: 10
EEELQVIQPD KSVSVAAGES AILHCTVTSL LPVGPIQWFR GAGPARELIY NQKSKVFPRV    60
TTVSESTKRR NMDFSISISN ITPADAGTYY CVKFRKGSPD TEFKSGAGTE LSVRAKPS     118

SEQ ID NO: 11             moltype = AA  length = 118
FEATURE                   Location/Qualifiers
source                    1..118
                          mol_type = protein
                          organism = synthetic construct
SEQUENCE: 11
EEELQVIQPD KSVSVAAGES AILHCTVTSL YPVGPIQWFR GAGPARELIY NQKGRRFPRV    60
```

```
TTVSESTKRA NMDFSISISN ITPADAGTYY CVKFRKGSPD TEFKSGAGTE LSVRAKPS      118

SEQ ID NO: 12              moltype = AA  length = 118
FEATURE                    Location/Qualifiers
source                     1..118
                           mol_type = protein
                           organism = synthetic construct
SEQUENCE: 12
EEELQVIQPD KSVSVAAGES AILHCTVTSL LPVGPIQWFR GAGPARELIY NQKDFLFPRV     60
TTVSESTKRE NRDFSISISN ITPADAGTYY CVKFRKGSPD TEFKSGAGTE LSVRAKPS      118

SEQ ID NO: 13              moltype = AA  length = 118
FEATURE                    Location/Qualifiers
source                     1..118
                           mol_type = protein
                           organism = synthetic construct
SEQUENCE: 13
EEELQVIQPD KSVSVAAGES AILHCTVTSL APVGPIQWFR GAGPARELIY NQKLDSFPRV     60
TTVSESTKRE SMDFSISISN ITPADAGTYY CVKFRKGSPD TEFKSGAGTE LSVRAKPS      118

SEQ ID NO: 14              moltype = AA  length = 118
FEATURE                    Location/Qualifiers
source                     1..118
                           mol_type = protein
                           organism = synthetic construct
SEQUENCE: 14
EEELQVIQPD KSVSVAAGES AILRCTVTSL TPVGPIQWFR GAGPARELIY NQKAKQFPRV     60
TTVSESTKRE NMIFSISISN ITPADAGTYY CVKFRKGSPD TEFKSGAGTE LSVRAKPS      118

SEQ ID NO: 15              moltype = AA  length = 347
FEATURE                    Location/Qualifiers
source                     1..347
                           mol_type = protein
                           organism = synthetic construct
SEQUENCE: 15
EEELQVIQPD KSVSVAAGES AILHCTVTSL IPVGPIQWFR GAGPARELIY NQKEGHFPRV     60
TTVSESTKRE NMDFSISISN ITPADAGTYY CVKFRKGSPD TEFKSGAGTE LSVRAKPSES   120
KYGPPCPPCP APEFLGGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
DGSFFLYSRL TVDKSRWQEG NVFSCSVMHE ALHNHYTQKS LSLSLGK                347

SEQ ID NO: 16              moltype = AA  length = 347
FEATURE                    Location/Qualifiers
source                     1..347
                           mol_type = protein
                           organism = synthetic construct
SEQUENCE: 16
EEELQVIQPD KSVSVAAGES AILHCTVTSL WPVGPIQWFR GAGPARELIY NQKAWPFPRV     60
TTVSESTKRE NMDFSISISN ITPADAGTYY CVKFRKGSPD TEFKSGAGTE LSVRAKPSES   120
KYGPPCPPCP APEFLGGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
DGSFFLYSRL TVDKSRWQEG NVFSCSVMHE ALHNHYTQKS LSLSLGK                347

SEQ ID NO: 17              moltype = AA  length = 347
FEATURE                    Location/Qualifiers
source                     1..347
                           mol_type = protein
                           organism = synthetic construct
SEQUENCE: 17
EEELQVIQPD KSVSVAAGES AILRCTVTSL WPVGPIQWFR GAGPARELIY NQKAFIFPRV     60
TTVSESTKRG NMDFSISISN ITPADAGTYY CVKFRKGSPD TEFKSGAGTE LSVRAKPSES   120
KYGPPCPPCP APEFLGGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
DGSFFLYSRL TVDKSRWQEG NVFSCSVMHE ALHNHYTQKS LSLSLGK                347

SEQ ID NO: 18              moltype = AA  length = 347
FEATURE                    Location/Qualifiers
source                     1..347
                           mol_type = protein
                           organism = synthetic construct
SEQUENCE: 18
EEELQVIQPD KSVSVAAGES AILNCTVTSL IPVGPIQWFR GAGPARELIY NQKHQTFPRV     60
TTVSEQTKRE NRDFSISISN ITPADAGTYY CVKFRKGSPD TEFKSGAGTE LSVRAKPSES   120
KYGPPCPPCP APEFLGGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
```

```
DGSFFLYSRL TVDKSRWQEG NVFSCSVMHE ALHNHYTQKS LSLSLGK            347

SEQ ID NO: 19           moltype = AA   length = 347
FEATURE                 Location/Qualifiers
source                  1..347
                        mol_type = protein
                        organism = synthetic construct
SEQUENCE: 19
EEELQVIQPD KSVSVAAGES AILHCTVTSL IPVGPIQWFR GAGPARELIY NQKNLIFPRV   60
TTVSESGKRE NMDFSISISN ITPADAGTYY CVKFRKGSPD TEFKSGAGTE LSVRAKPSES  120
KYGPPCPPCP APEFLGGPSV FLFPPKPKDT LMISRTPEVT CVVVDVSQED PEVQFNWYVD  180
GVEVHNAKTK PREEQFNSTY RVVSVLTVLH QDWLNGKEYK CKVSNKGLPS SIEKTISKAK  240
GQPREPQVYT LPPSQEEMTK NQVSLTCLVK GFYPSDIAVE WESNGQPENN YKTTPPVLDS  300
DGSFFLYSRL TVDKSRWQEG NVFSCSVMHE ALHNHYTQKS LSLSLGK               347

SEQ ID NO: 20           moltype = AA   length = 347
FEATURE                 Location/Qualifiers
source                  1..347
                        mol_type = protein
                        organism = synthetic construct
SEQUENCE: 20
EEELQVIQPD KSVSVAAGES AILHCIVTSL IPVGPIQWFR GAGPARELIY NQKILTFPRV   60
TTVSESTKRE NYDFSISISN ITPADAGTYY CVKFRKGSPD TEFKSGAGTE LSVRAKPSES  120
KYGPPCPPCP APEFLGGPSV FLFPPKPKDT LMISRTPEVT CVVVDVSQED PEVQFNWYVD  180
GVEVHNAKTK PREEQFNSTY RVVSVLTVLH QDWLNGKEYK CKVSNKGLPS SIEKTISKAK  240
GQPREPQVYT LPPSQEEMTK NQVSLTCLVK GFYPSDIAVE WESNGQPENN YKTTPPVLDS  300
DGSFFLYSRL TVDKSRWQEG NVFSCSVMHE ALHNHYTQKS LSLSLGK               347

SEQ ID NO: 21           moltype = AA   length = 347
FEATURE                 Location/Qualifiers
source                  1..347
                        mol_type = protein
                        organism = synthetic construct
SEQUENCE: 21
EEELQVIQPD KSVSVAAGES AILHCTVTSL KPVGPIQWFR GAGPARELIY NQKRDTFPRV   60
TTVSESTKRE NRDFSISISN ITPADAGTYY CVKFRKGSPD TEFKSGAGTE LSVRAKPSES  120
KYGPPCPPCP APEFLGGPSV FLFPPKPKDT LMISRTPEVT CVVVDVSQED PEVQFNWYVD  180
GVEVHNAKTK PREEQFNSTY RVVSVLTVLH QDWLNGKEYK CKVSNKGLPS SIEKTISKAK  240
GQPREPQVYT LPPSQEEMTK NQVSLTCLVK GFYPSDIAVE WESNGQPENN YKTTPPVLDS  300
DGSFFLYSRL TVDKSRWQEG NVFSCSVMHE ALHNHYTQKS LSLSLGK               347

SEQ ID NO: 22           moltype = AA   length = 347
FEATURE                 Location/Qualifiers
source                  1..347
                        mol_type = protein
                        organism = synthetic construct
SEQUENCE: 22
EEELQVIQPD KSVSVAAGES AILTCTVTSL WPVGPIQWFR GAGPARELIY NQKGQNFPRV   60
TTVSESTKRF NMDFSISISN ITPADAGTYY CVKFRKGSPD TEFKSGAGTE LSVRAKPSES  120
KYGPPCPPCP APEFLGGPSV FLFPPKPKDT LMISRTPEVT CVVVDVSQED PEVQFNWYVD  180
GVEVHNAKTK PREEQFNSTY RVVSVLTVLH QDWLNGKEYK CKVSNKGLPS SIEKTISKAK  240
GQPREPQVYT LPPSQEEMTK NQVSLTCLVK GFYPSDIAVE WESNGQPENN YKTTPPVLDS  300
DGSFFLYSRL TVDKSRWQEG NVFSCSVMHE ALHNHYTQKS LSLSLGK               347

SEQ ID NO: 23           moltype = AA   length = 347
FEATURE                 Location/Qualifiers
source                  1..347
                        mol_type = protein
                        organism = synthetic construct
SEQUENCE: 23
EEELQVIQPD KSVSVAAGES AILTCTVTSL YPVGPIQWFR GAGPARELIY NQKRQTFPRV   60
TTVSESTKRF NMDFSISISN ITPADAGTYY CVKFRKGSPD TEFKSGAGTE LSVRAKPSES  120
KYGPPCPPCP APEFLGGPSV FLFPPKPKDT LMISRTPEVT CVVVDVSQED PEVQFNWYVD  180
GVEVHNAKTK PREEQFNSTY RVVSVLTVLH QDWLNGKEYK CKVSNKGLPS SIEKTISKAK  240
GQPREPQVYT LPPSQEEMTK NQVSLTCLVK GFYPSDIAVE WESNGQPENN YKTTPPVLDS  300
DGSFFLYSRL TVDKSRWQEG NVFSCSVMHE ALHNHYTQKS LSLSLGK               347

SEQ ID NO: 24           moltype = AA   length = 347
FEATURE                 Location/Qualifiers
source                  1..347
                        mol_type = protein
                        organism = synthetic construct
SEQUENCE: 24
EEELQVIQPD KSVSVAAGES AILHCTVTSL LPVGPIQWFR GAGPARELIY NQKSKVFPRV   60
TTVSESTKRR NMDFSISISN ITPADAGTYY CVKFRKGSPD TEFKSGAGTE LSVRAKPSES  120
KYGPPCPPCP APEFLGGPSV FLFPPKPKDT LMISRTPEVT CVVVDVSQED PEVQFNWYVD  180
GVEVHNAKTK PREEQFNSTY RVVSVLTVLH QDWLNGKEYK CKVSNKGLPS SIEKTISKAK  240
GQPREPQVYT LPPSQEEMTK NQVSLTCLVK GFYPSDIAVE WESNGQPENN YKTTPPVLDS  300
DGSFFLYSRL TVDKSRWQEG NVFSCSVMHE ALHNHYTQKS LSLSLGK               347
```

```
SEQ ID NO: 25              moltype = AA  length = 347
FEATURE                    Location/Qualifiers
source                     1..347
                           mol_type = protein
                           organism = synthetic construct
SEQUENCE: 25
EEELQVIQPD KSVSVAAGES AILHCTVTSL YPVGPIQWFR GAGPARELIY NQKGRRFPRV   60
TTVSESTKRA NMDFSISISN ITPADAGTYY CVKFRKGSPD TEFKSGAGTE LSVRAKPSES  120
KYGPPCPPCP APEFLGGPSV FLFPPKPKDT LMISRTPEVT CVVVDVSQED PEVQFNWYVD  180
GVEVHNAKTK PREEQFNSTY RVVSVLTVLH QDWLNGKEYK CKVSNKGLPS SIEKTISKAK  240
GQPREPQVYT LPPSQEEMTK NQVSLTCLVK GFYPSDIAVE WESNGQPENN YKTTPPVLDS  300
DGSFFLYSRL TVDKSRWQEG NVFSCSVMHE ALHNHYTQKS LSLSLGK                347

SEQ ID NO: 26              moltype = AA  length = 347
FEATURE                    Location/Qualifiers
source                     1..347
                           mol_type = protein
                           organism = synthetic construct
SEQUENCE: 26
EEELQVIQPD KSVSVAAGES AILHCTVTSL LPVGPIQWFR GAGPARELIY NQKDFLFPRV   60
TTVSESTKRE NRDFSISISN ITPADAGTYY CVKFRKGSPD TEFKSGAGTE LSVRAKPSES  120
KYGPPCPPCP APEFLGGPSV FLFPPKPKDT LMISRTPEVT CVVVDVSQED PEVQFNWYVD  180
GVEVHNAKTK PREEQFNSTY RVVSVLTVLH QDWLNGKEYK CKVSNKGLPS SIEKTISKAK  240
GQPREPQVYT LPPSQEEMTK NQVSLTCLVK GFYPSDIAVE WESNGQPENN YKTTPPVLDS  300
DGSFFLYSRL TVDKSRWQEG NVFSCSVMHE ALHNHYTQKS LSLSLGK                347

SEQ ID NO: 27              moltype = AA  length = 347
FEATURE                    Location/Qualifiers
source                     1..347
                           mol_type = protein
                           organism = synthetic construct
SEQUENCE: 27
EEELQVIQPD KSVSVAAGES AILHCTVTSL APVGPIQWFR GAGPARELIY NQKLDSFPRV   60
TTVSESTKRE SMDFSISISN ITPADAGTYY CVKFRKGSPD TEFKSGAGTE LSVRAKPSES  120
KYGPPCPPCP APEFLGGPSV FLFPPKPKDT LMISRTPEVT CVVVDVSQED PEVQFNWYVD  180
GVEVHNAKTK PREEQFNSTY RVVSVLTVLH QDWLNGKEYK CKVSNKGLPS SIEKTISKAK  240
GQPREPQVYT LPPSQEEMTK NQVSLTCLVK GFYPSDIAVE WESNGQPENN YKTTPPVLDS  300
DGSFFLYSRL TVDKSRWQEG NVFSCSVMHE ALHNHYTQKS LSLSLGK                347

SEQ ID NO: 28              moltype = AA  length = 347
FEATURE                    Location/Qualifiers
source                     1..347
                           mol_type = protein
                           organism = synthetic construct
SEQUENCE: 28
EEELQVIQPD KSVSVAAGES AILRCTVTSL TPVGPIQWFR GAGPARELIY NQKAKQFPRV   60
TTVSESTKRE NMIFSISISN ITPADAGTYY CVKFRKGSPD TEFKSGAGTE LSVRAKPSES  120
KYGPPCPPCP APEFLGGPSV FLFPPKPKDT LMISRTPEVT CVVVDVSQED PEVQFNWYVD  180
GVEVHNAKTK PREEQFNSTY RVVSVLTVLH QDWLNGKEYK CKVSNKGLPS SIEKTISKAK  240
GQPREPQVYT LPPSQEEMTK NQVSLTCLVK GFYPSDIAVE WESNGQPENN YKTTPPVLDS  300
DGSFFLYSRL TVDKSRWQEG NVFSCSVMHE ALHNHYTQKS LSLSLGK                347

SEQ ID NO: 29              moltype = AA  length = 229
FEATURE                    Location/Qualifiers
source                     1..229
                           mol_type = protein
                           organism = synthetic construct
SEQUENCE: 29
ESKYGPPCPP CPAPEFLGGP SVFLFPPKPK DTLMISRTPE VTCVVVDVSQ EDPEVQFNWY   60
VDGVEVHNAK TKPREEQFNS TYRVVSVLTV LHQDWLNGKE YKCKVSNKGL PSSIEKTISK  120
AKGQPREPQV YTLPPSQEEM TKNQVSLTCL VKGFYPSDIA VEWESNGQPE NNYKTTPPVL  180
DSDGSFFLYS RLTVDKSRWQ EGNVFSCSVM HEALHNHYTQ KSLSLSLGK              229

SEQ ID NO: 30              moltype = AA  length = 503
FEATURE                    Location/Qualifiers
source                     1..503
                           mol_type = protein
                           organism = Homo sapiens
SEQUENCE: 30
MEPAGPAPGR LGPLLCLLLA ASCAWSGVAG EEELQVIQPD KSVSVAAGES AILHCTVTSL   60
IPVGPIQWFR GAGPARELIY NQKEGHFPRV TTVSESTKRE NMDFSISISN ITPADAGTYY  120
CVKFRKGSPD TEFKSGAGTE LSVRAKPSAP VVSGPAARAT PQHTVSFTCE SHGFSPRDIT  180
LKWFKNGNEL SDFQTNVDPV GESVSYSIHS TAKVVLTRED VHSQVICEVA HVTLQGDPLR  240
GTANLSETIR VPPTLEVTQQ PVRAENQVNV TCQVRKFYPQ RLQLTWLENG NVSRTETAST  300
VTENKDGTYN WMSWLLVNVS AHRDDVKLTC QVEHDGQPAV SKSHDLKVSA HPKEQGSNTA  360
AENTGSNERN IYIVVGVVCT LLVALLMAAL YLVRIRQKKA QGSTSSRTLH EPEKNAREIT  420
QDTNDITYAD LNLPKGKKPA PQAAEPNNHT EYASIQTSPQ PASEDTLTYA DLDMVHLNRT  480
PKQPAPKPEP SFSEYASVQV PRK                                          503
```

```
SEQ ID NO: 31              moltype = AA  length = 504
FEATURE                    Location/Qualifiers
source                     1..504
                           mol_type = protein
                           organism = Homo sapiens
SEQUENCE: 31
MEPAGPAPGR LGPLLCLLLA ASCAWSGVAG EEELQVIQPD KSVLVAAGET ATLRCTATSL    60
IPVGPIQWFR GAGPGRELIY NQKEGHFPRV TTVSDLTKRN NMDFSIRIGN ITPADAGTYY   120
CVKFRKGSPD DVEFKSGAGT ELSVRAKPSA PVVSGPAARA TPQHTVSFTC ESHGFSPRDI   180
TLKWFKNGNE LSDFQTNVDP VGESVSYSIH STAKVVLTRE DVHSQVICEV AHVTLQGDPL   240
RGTANLSETI RVPPTLEVTQ QPVRAENQVN VTCQVRKFYP QRLQLTWLEN GNVSRTETAS   300
TVTENKDGTY NWMSWLLVNV SAHRDDVKLT CQVEHDGQPA VSKSHDLKVS AHPKEQGSNT   360
AAENTGSNER NIYIVVGVVC TLLVALLMAA LYLVRIRQKK AQGSTSSTRL HEPEKNAREI   420
TQDTNDITYA DLNLPKGKKP APQAAEPNNH TEYASIQTSP QPASEDTLTY ADLDMVHLNR   480
TPKQPAPKPE PSFSEYASVQ VPRK                                         504

SEQ ID NO: 32              moltype = AA  length = 507
FEATURE                    Location/Qualifiers
source                     1..507
                           mol_type = protein
                           organism = Homo sapiens
SEQUENCE: 32
MEPAGPAPGR LGPLLCLLLA ASCAWSGVAG EEELQVIQPD KSVSVAAGES AILHCTVTSL    60
IPVGPIQWFR GAGPARELIY NQKEGHFPRV TTVSESTKRE NMDFSISISN ITPADAGTYY   120
CVKFRKGSPD TEFKSGAGTE LSVRAKPSAP VVSGPAARAT PQHTVSFTCE SHGFSPRDIT   180
LKWFKNGNEL SDFQTNVDPV GESVSYSIHS TAKVVLTRED VHSQVICEVA HVTLQGDPLR   240
GTANLSETIR VPPTLEVTQQ PVRAENQVNV TCQVRKFYPQ RLQLTWLENG NVSRTETAST   300
VTENKDGTYN WMSWLLVNVS AHRDDVKLTC QVEHDGQPAV SKSHDLKVSA HPKEQGSNTA   360
AENTGSNERN IYIVVGVVCT LLVALLMAAL YLVRIRQKKA QGSTSSTRLH EPEKNAREIT   420
QVQSLDTNDI TYADLNLPKG KKPAPQAAEP NNHTEYASIQ TSPQPASEDT LTYADLDMVH   480
LNRTPKQPAP KPEPSFSEYA SVQVPRK                                      507

SEQ ID NO: 33              moltype = AA  length = 118
FEATURE                    Location/Qualifiers
source                     1..118
                           mol_type = protein
                           organism = synthetic construct
SEQUENCE: 33
EEELQVIQPD KSVSVAAGES AILTCTVTSL IPVGPIQWFR GAGPARELIY NQKRAPFPRV    60
TTVSESTKRE NMDFSISISN ITPADAGTYY CVKFRKGSPD TEFKSGAGTE LSVRAKPS    118

SEQ ID NO: 34              moltype = AA  length = 118
FEATURE                    Location/Qualifiers
source                     1..118
                           mol_type = protein
                           organism = synthetic construct
SEQUENCE: 34
EEELQVIQPD KSVSVAAGES AILHCTVTSL IPVGPIQWFR GAGPARELIY NQKSPPFPRV    60
TTVSESTKRL NMDFSISISN ITPADAGTYY CVKFRKGSPD TEFKSGAGTE LSVRAKPS    118

SEQ ID NO: 35              moltype = AA  length = 118
FEATURE                    Location/Qualifiers
source                     1..118
                           mol_type = protein
                           organism = synthetic construct
SEQUENCE: 35
EEELQVIQPD KSVSVAAGES AILTCTVTSL WPVGPIQWFR GAGPARELIY NQKSGPFPRV    60
TTVSESTKRR NMDFSISISN ITPADAGTYY CVKFRKGSPD TEFKSGAGTE LSVRAKPS    118

SEQ ID NO: 36              moltype = AA  length = 118
FEATURE                    Location/Qualifiers
source                     1..118
                           mol_type = protein
                           organism = synthetic construct
SEQUENCE: 36
EEELQVIQPD KSVSVAAGES AILHCTVTSL WPVGPIQWFR GAGPARELIY NQKRAGFPRV    60
TTVSESTKRT NMDFSISISN ITPADAGTYY CVKFRKGSPD TEFKSGAGTE LSVRAKPS    118

SEQ ID NO: 37              moltype = AA  length = 118
FEATURE                    Location/Qualifiers
source                     1..118
                           mol_type = protein
                           organism = synthetic construct
SEQUENCE: 37
EEELQVIQPD KSVSVAAGES AILHCTVTQL IPVGPIQWFR GAGPARELIY NQKHRTFPRV    60
TTVSENTKRE NMDFSISISN ITPADAGTYY CVKFRKGSPD TEFKSGAGTE LSVRAKPS    118

SEQ ID NO: 38              moltype = AA  length = 118
```

```
FEATURE              Location/Qualifiers
source               1..118
                     mol_type = protein
                     organism = synthetic construct
SEQUENCE: 38
EEELQVIQPD KSVSVAAGES AILHCTVTSL IPVGPIQWFR GAGPARELIY NQKSPRFPRV    60
TTVSESTKRL NMDFSISISN ITPADAGTYY CVKFRKGSPD TEFKSGAGTE LSVRAKPS     118

SEQ ID NO: 39        moltype = AA   length = 118
FEATURE              Location/Qualifiers
source               1..118
                     mol_type = protein
                     organism = synthetic construct
SEQUENCE: 39
EEELQVIQPD KSVSVAAGES AILHCTLTSL IPVGPIQWFR GAGPARELIY NQKEDRFPRV    60
TTVSESTKRE NRDFSISISN ITPADAGTYY CVKFRKGSPD TEFKSGAGTE LSVRAKPS     118

SEQ ID NO: 40        moltype = AA   length = 118
FEATURE              Location/Qualifiers
source               1..118
                     mol_type = protein
                     organism = synthetic construct
SEQUENCE: 40
EEELQVIQPD KSVSVAAGES AILHCTLTSL TPVGPIQWFR GAGPARELIY NQKEGPFPRV    60
TTVSESTKRG NMDFSISISN ITPADAGTYY CVKFRKGSPD TEFKSGAGTE LSVRAKPS     118

SEQ ID NO: 41        moltype = AA   length = 118
FEATURE              Location/Qualifiers
source               1..118
                     mol_type = protein
                     organism = synthetic construct
SEQUENCE: 41
EEELQVIQPD KSVSVAAGES AILTCTVTSL YPVGPIQWFR GAGPARELIY NQKRQTFPRV    60
TTVSESTKRE NMDFSISISN ITPADAGTYY CVKFRKGSPD TEFKSGAGTE LSVRAKPS     118

SEQ ID NO: 42        moltype = AA   length = 118
FEATURE              Location/Qualifiers
source               1..118
                     mol_type = protein
                     organism = synthetic construct
SEQUENCE: 42
EEELQVIQPD KSVSVAAGES AILTCTVTSL NPVGPIQWFR GAGPARELIY NQKRQTFPRV    60
TTVSESTKRE NMDFSISISN ITPADAGTYY CVKFRKGSPD TEFKSGAGTE LSVRAKPS     118

SEQ ID NO: 43        moltype = AA   length = 118
FEATURE              Location/Qualifiers
source               1..118
                     mol_type = protein
                     organism = synthetic construct
SEQUENCE: 43
EEELQVIQPD KSVSVAAGES AILRCTVTSL YPVGPIQWFR GAGPARELIY NQKAKQFPRV    60
TTVSESTKRE NMDFSISISN ITPADAGTYY CVKFRKGSPD TEFKSGAGTE LSVRAKPS     118

SEQ ID NO: 44        moltype = AA   length = 118
FEATURE              Location/Qualifiers
source               1..118
                     mol_type = protein
                     organism = synthetic construct
SEQUENCE: 44
EEELQVIQPD KSVSVAAGES AILRCTVTSL NPVGPIQWFR GAGPARELIY NQKAKQFPRV    60
TTVSESTKRE NMDFSISISN ITPADAGTYY CVKFRKGSPD TEFKSGAGTE LSVRAKPS     118

SEQ ID NO: 45        moltype = AA   length = 118
FEATURE              Location/Qualifiers
source               1..118
                     mol_type = protein
                     organism = synthetic construct
SEQUENCE: 45
EEELQVIQPD KSVSVAAGES AILRCTVTSL IPVGPIQWFR GAGPARELIY NQKAKQFPRV    60
TTVSESTKRE NMDFSISISN ITPADAGTYY CVKFRKGSPD TEFKSGAGTE LSVRAKPS     118

SEQ ID NO: 46        moltype = AA   length = 347
FEATURE              Location/Qualifiers
source               1..347
                     mol_type = protein
                     organism = synthetic construct
SEQUENCE: 46
EEELQVIQPD KSVSVAAGES AILTCTVTSL IPVGPIQWFR GAGPARELIY NQKRAPFPRV    60
TTVSESTKRE NMDFSISISN ITPADAGTYY CVKFRKGSPD TEFKSGAGTE LSVRAKPSES  120
```

```
KYGPPCPPCP APEFLGGPSV FLFPPKPKDT LMISRTPEVT CVVVDVSQED PEVQFNWYVD    180
GVEVHNAKTK PREEQFNSTY RVVSVLTVLH QDWLNGKEYK CKVSNKGLPS SIEKTISKAK    240
GQPREPQVYT LPPSQEEMTK NQVSLTCLVK GFYPSDIAVE WESNGQPENN YKTTPPVLDS    300
DGSFFLYSRL TVDKSRWQEG NVFSCSVMHE ALHNHYTQKS LSLSLGK                  347

SEQ ID NO: 47            moltype = AA   length = 347
FEATURE                  Location/Qualifiers
source                   1..347
                         mol_type = protein
                         organism = synthetic construct
SEQUENCE: 47
EEELQVIQPD KSVSVAAGES AILHCTVTSL IPVGPIQWFR GAGPARELIY NQKSPPFPRV     60
TTVSESTKRL NMDFSISISN ITPADAGTYY CVKFRKGSPD TEFKSGAGTE LSVRAKPSES    120
KYGPPCPPCP APEFLGGPSV FLFPPKPKDT LMISRTPEVT CVVVDVSQED PEVQFNWYVD    180
GVEVHNAKTK PREEQFNSTY RVVSVLTVLH QDWLNGKEYK CKVSNKGLPS SIEKTISKAK    240
GQPREPQVYT LPPSQEEMTK NQVSLTCLVK GFYPSDIAVE WESNGQPENN YKTTPPVLDS    300
DGSFFLYSRL TVDKSRWQEG NVFSCSVMHE ALHNHYTQKS LSLSLGK                  347

SEQ ID NO: 48            moltype = AA   length = 347
FEATURE                  Location/Qualifiers
source                   1..347
                         mol_type = protein
                         organism = synthetic construct
SEQUENCE: 48
EEELQVIQPD KSVSVAAGES AILTCTVTSL WPVGPIQWFR GAGPARELIY NQKSGPFPRV     60
TTVSESTKRR NMDFSISISN ITPADAGTYY CVKFRKGSPD TEFKSGAGTE LSVRAKPSES    120
KYGPPCPPCP APEFLGGPSV FLFPPKPKDT LMISRTPEVT CVVVDVSQED PEVQFNWYVD    180
GVEVHNAKTK PREEQFNSTY RVVSVLTVLH QDWLNGKEYK CKVSNKGLPS SIEKTISKAK    240
GQPREPQVYT LPPSQEEMTK NQVSLTCLVK GFYPSDIAVE WESNGQPENN YKTTPPVLDS    300
DGSFFLYSRL TVDKSRWQEG NVFSCSVMHE ALHNHYTQKS LSLSLGK                  347

SEQ ID NO: 49            moltype = AA   length = 347
FEATURE                  Location/Qualifiers
source                   1..347
                         mol_type = protein
                         organism = synthetic construct
SEQUENCE: 49
EEELQVIQPD KSVSVAAGES AILHCTVTSL WPVGPIQWFR GAGPARELIY NQKRAGFPRV     60
TTVSESTKRT NMDFSISISN ITPADAGTYY CVKFRKGSPD TEFKSGAGTE LSVRAKPSES    120
KYGPPCPPCP APEFLGGPSV FLFPPKPKDT LMISRTPEVT CVVVDVSQED PEVQFNWYVD    180
GVEVHNAKTK PREEQFNSTY RVVSVLTVLH QDWLNGKEYK CKVSNKGLPS SIEKTISKAK    240
GQPREPQVYT LPPSQEEMTK NQVSLTCLVK GFYPSDIAVE WESNGQPENN YKTTPPVLDS    300
DGSFFLYSRL TVDKSRWQEG NVFSCSVMHE ALHNHYTQKS LSLSLGK                  347

SEQ ID NO: 50            moltype = AA   length = 347
FEATURE                  Location/Qualifiers
source                   1..347
                         mol_type = protein
                         organism = synthetic construct
SEQUENCE: 50
EEELQVIQPD KSVSVAAGES AILHCTVTQL IPVGPIQWFR GAGPARELIY NQKHRTFPRV     60
TTVSENTKRE NMDFSISISN ITPADAGTYY CVKFRKGSPD TEFKSGAGTE LSVRAKPSES    120
KYGPPCPPCP APEFLGGPSV FLFPPKPKDT LMISRTPEVT CVVVDVSQED PEVQFNWYVD    180
GVEVHNAKTK PREEQFNSTY RVVSVLTVLH QDWLNGKEYK CKVSNKGLPS SIEKTISKAK    240
GQPREPQVYT LPPSQEEMTK NQVSLTCLVK GFYPSDIAVE WESNGQPENN YKTTPPVLDS    300
DGSFFLYSRL TVDKSRWQEG NVFSCSVMHE ALHNHYTQKS LSLSLGK                  347

SEQ ID NO: 51            moltype = AA   length = 347
FEATURE                  Location/Qualifiers
source                   1..347
                         mol_type = protein
                         organism = synthetic construct
SEQUENCE: 51
EEELQVIQPD KSVSVAAGES AILHCTVTSL IPVGPIQWFR GAGPARELIY NQKSPRFPRV     60
TTVSESTKRL NMDFSISISN ITPADAGTYY CVKFRKGSPD TEFKSGAGTE LSVRAKPSES    120
KYGPPCPPCP APEFLGGPSV FLFPPKPKDT LMISRTPEVT CVVVDVSQED PEVQFNWYVD    180
GVEVHNAKTK PREEQFNSTY RVVSVLTVLH QDWLNGKEYK CKVSNKGLPS SIEKTISKAK    240
GQPREPQVYT LPPSQEEMTK NQVSLTCLVK GFYPSDIAVE WESNGQPENN YKTTPPVLDS    300
DGSFFLYSRL TVDKSRWQEG NVFSCSVMHE ALHNHYTQKS LSLSLGK                  347

SEQ ID NO: 52            moltype = AA   length = 347
FEATURE                  Location/Qualifiers
source                   1..347
                         mol_type = protein
                         organism = synthetic construct
SEQUENCE: 52
EEELQVIQPD KSVSVAAGES AILHCTLTSL IPVGPIQWFR GAGPARELIY NQKEDRFPRV     60
TTVSESTKRE NRDFSISISN ITPADAGTYY CVKFRKGSPD TEFKSGAGTE LSVRAKPSES    120
KYGPPCPPCP APEFLGGPSV FLFPPKPKDT LMISRTPEVT CVVVDVSQED PEVQFNWYVD    180
```

```
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
DGSFFLYSRL TVDKSRWQEG NVFSCSVMHE ALHNHYTQKS LSLSLGK                347

SEQ ID NO: 53            moltype = AA  length = 347
FEATURE                  Location/Qualifiers
source                   1..347
                         mol_type = protein
                         organism = synthetic construct
SEQUENCE: 53
EEELQVIQPD KSVSVAAGES AILHCTLTSL TPVGPIQWFR GAGPARELIY NQKEGPFPRV    60
TTVSESTKRG NMDFSISISN ITPADAGTYY CVKFRKGSPD TEFKSGAGTE LSVRAKPSES   120
KYGPPCPPCP APEFLGGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
DGSFFLYSRL TVDKSRWQEG NVFSCSVMHE ALHNHYTQKS LSLSLGK                347

SEQ ID NO: 54            moltype = AA  length = 347
FEATURE                  Location/Qualifiers
source                   1..347
                         mol_type = protein
                         organism = synthetic construct
SEQUENCE: 54
EEELQVIQPD KSVSVAAGES AILTCTVTSL YPVGPIQWFR GAGPARELIY NQKRQTFPRV    60
TTVSESTKRE NMDFSISISN ITPADAGTYY CVKFRKGSPD TEFKSGAGTE LSVRAKPSES   120
KYGPPCPPCP APEFLGGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
DGSFFLYSRL TVDKSRWQEG NVFSCSVMHE ALHNHYTQKS LSLSLGK                347

SEQ ID NO: 55            moltype = AA  length = 347
FEATURE                  Location/Qualifiers
source                   1..347
                         mol_type = protein
                         organism = synthetic construct
SEQUENCE: 55
EEELQVIQPD KSVSVAAGES AILTCTVTSL NPVGPIQWFR GAGPARELIY NQKRQTFPRV    60
TTVSESTKRE NMDFSISISN ITPADAGTYY CVKFRKGSPD TEFKSGAGTE LSVRAKPSES   120
KYGPPCPPCP APEFLGGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
DGSFFLYSRL TVDKSRWQEG NVFSCSVMHE ALHNHYTQKS LSLSLGK                347

SEQ ID NO: 56            moltype = AA  length = 347
FEATURE                  Location/Qualifiers
source                   1..347
                         mol_type = protein
                         organism = synthetic construct
SEQUENCE: 56
EEELQVIQPD KSVSVAAGES AILRCTVTSL YPVGPIQWFR GAGPARELIY NQKAKQFPRV    60
TTVSESTKRE NMDFSISISN ITPADAGTYY CVKFRKGSPD TEFKSGAGTE LSVRAKPSES   120
KYGPPCPPCP APEFLGGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
DGSFFLYSRL TVDKSRWQEG NVFSCSVMHE ALHNHYTQKS LSLSLGK                347

SEQ ID NO: 57            moltype = AA  length = 347
FEATURE                  Location/Qualifiers
source                   1..347
                         mol_type = protein
                         organism = synthetic construct
SEQUENCE: 57
EEELQVIQPD KSVSVAAGES AILRCTVTSL NPVGPIQWFR GAGPARELIY NQKAKQFPRV    60
TTVSESTKRE NMDFSISISN ITPADAGTYY CVKFRKGSPD TEFKSGAGTE LSVRAKPSES   120
KYGPPCPPCP APEFLGGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
GQPREPQVYT LPPSQEEMTK NQVSLTCLVK GFYPSDIAVE WESNGQPENN YKTTPPVLDS   300
DGSFFLYSRL TVDKSRWQEG NVFSCSVMHE ALHNHYTQKS LSLSLGK                347

SEQ ID NO: 58            moltype = AA  length = 347
FEATURE                  Location/Qualifiers
source                   1..347
                         mol_type = protein
                         organism = synthetic construct
SEQUENCE: 58
EEELQVIQPD KSVSVAAGES AILRCTVTSL IPVGPIQWFR GAGPARELIY NQKAKQFPRV    60
TTVSESTKRE NMDFSISISN ITPADAGTYY CVKFRKGSPD TEFKSGAGTE LSVRAKPSES   120
KYGPPCPPCP APEFLGGPSV FLFPPKPKDT LMISRTPEVT CVVVDVSQED PEVQFNWYVD   180
GVEVHNAKTK PREEQFNSTY RVVSVLTVLH QDWLNGKEYK CKVSNKGLPS SIEKTISKAK   240
```

```
GQPREPQVYT LPPSQEEMTK NQVSLTCLVK GFYPSDIAVE WESNGQPENN YKTTPPVLDS    300
DGSFFLYSRL TVDKSRWQEG NVFSCSVMHE ALHNHYTQKS LSLSLGK                 347

SEQ ID NO: 59              moltype = AA   length = 10
FEATURE                    Location/Qualifiers
source                     1..10
                           mol_type = protein
                           organism = synthetic construct
SEQUENCE: 59
HCTVTSLIPV                                                          10

SEQ ID NO: 60              moltype = DNA  length = 30
FEATURE                    Location/Qualifiers
source                     1..30
                           mol_type = other DNA
                           organism = synthetic construct
SEQUENCE: 60
cactgcactg tgacctccct gatccctgtg                                    30

SEQ ID NO: 61              moltype = AA   length = 8
FEATURE                    Location/Qualifiers
source                     1..8
                           mol_type = protein
                           organism = synthetic construct
SEQUENCE: 61
STKRENMD                                                             8

SEQ ID NO: 62              moltype = DNA  length = 24
FEATURE                    Location/Qualifiers
source                     1..24
                           mol_type = other DNA
                           organism = synthetic construct
SEQUENCE: 62
tccacaaaga gagaaaacat ggac                                          24
```